US 10,974,591 B2

(12) United States Patent
Ling et al.

(10) Patent No.: US 10,974,591 B2
(45) Date of Patent: Apr. 13, 2021

(54) POWER TRANSMISSION SYSTEM AND VEHICLE HAVING SAME

(71) Applicant: BYD COMPANY LIMITED, Guangdong (CN)

(72) Inventors: Heping Ling, Shenzhen (CN); Zhen Zhai, Shenzhen (CN); Wei Huang, Shenzhen (CN); Youbin Xu, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 0 days.

(21) Appl. No.: 16/346,499

(22) PCT Filed: Oct. 30, 2017

(86) PCT No.: PCT/CN2017/108362
§ 371 (c)(1),
(2) Date: Apr. 30, 2019

(87) PCT Pub. No.: WO2018/077269
PCT Pub. Date: May 3, 2018

(65) Prior Publication Data
US 2019/0255942 A1 Aug. 22, 2019

(30) Foreign Application Priority Data

Oct. 31, 2016 (CN) .......................... 201610979258.X

(51) Int. Cl.
*B60K 17/02* (2006.01)
*B60K 6/24* (2007.10)
(Continued)

(52) U.S. Cl.
CPC ................ *B60K 17/02* (2013.01); *B60K 6/24* (2013.01); *B60K 6/26* (2013.01); *B60K 6/36* (2013.01);
(Continued)

(58) Field of Classification Search
CPC ... B60K 6/24; B60K 6/26; B60K 6/36; B60K 6/42; B60K 17/02; B60K 17/08;
(Continued)

(56) References Cited

U.S. PATENT DOCUMENTS 5,577,973 A * 11/1996 Schmidt ................. B60K 6/365
475/5
6,155,364 A * 12/2000 Nagano ................... B60K 6/365
180/65.235
(Continued)

FOREIGN PATENT DOCUMENTS

CN 1853999 A 11/2006
CN 103174815 A 6/2013
(Continued)

OTHER PUBLICATIONS

English Translation of International Search Report from PCT/CN2017/108362 dated Jan. 25, 2018 (2 pages).

*Primary Examiner* — Leslie A Nicholson, III
(74) *Attorney, Agent, or Firm* — Calfee, Halter & Griswold LLP

(57) ABSTRACT

The power transmission system includes: a power source; a first motor generator unit; a system power output portion; and a mode conversion device, where the mode conversion device includes: an input portion, a first conversion portion, a second conversion portion and an output portion, the output portion is connected to an input end of the system power output portion, the input portion is suitable for outputting power from at least one of the power source and the first motor generator unit, the input portion is selectively connected to one of the first conversion portion and the second conversion portion, and each of the first conversion portion and the second conversion portion cooperates with the output portion to perform transmission; and the input portion is connected to the second conversion portion, so (Continued)

that a rotational speed output by the input portion is reduced and then output to the input end of the system power output portion.

20 Claims, 54 Drawing Sheets

(51) Int. Cl.
    *B60K 6/26*     (2007.10)
    *B60K 6/36*     (2007.10)
    *B60K 6/42*     (2007.10)
    *B60K 17/08*     (2006.01)
    *B60K 17/16*     (2006.01)
    *B60W 20/00*     (2016.01)
    *B60W 20/15*     (2016.01)

(52) U.S. Cl.
    CPC ............... B60K 6/42 (2013.01); B60K 17/08 (2013.01); B60K 17/16 (2013.01); B60W 20/00 (2013.01); B60W 20/15 (2016.01); *Y02T 10/62* (2013.01)

(58) Field of Classification Search
    CPC ....... B60K 17/16; B60W 20/00; B60W 20/15; Y02T 10/6295
    USPC .............................................................. 475/5
    See application file for complete search history.

(56) References Cited

U.S. PATENT DOCUMENTS 7,896,114 B2 * 3/2011 Colvin ..................... B60K 6/48
                                          180/65.28
9,849,771 B2 * 12/2017 Zhang ..................... F16H 3/006

FOREIGN PATENT DOCUMENTS

| | | |
|---|---|---|
| CN | 104455236 A | 3/2015 |
| CN | 104773063 A | 7/2015 |
| CN | 204472568 U | 7/2015 |
| CN | 104842772 A | 8/2015 |
| CN | 102874089 A | 1/2016 |
| CN | 105459813 A | 4/2016 |
| CN | 105465296 A | 4/2016 |
| EP | 2141385 A2 | 1/2010 |
| JP | 2015101205 A | 1/2015 |

\* cited by examiner

US 10,974,591 B2

POWER TRANSMISSION SYSTEM AND VEHICLE HAVING SAME

CROSS-REFERENCE TO RELATED APPLICATIONS

This application is the U.S. national phase entry of PCT Application No. PCT/CN2017/108362, filed Oct. 30, 2017, which is based on and claims priority to Chinese Patent Application No. 201610979258.X, filed on Oct. 31, 2016, which are incorporated herein by reference in their entireties.

FIELD

The present invention relates to the field of vehicle technologies, and in particular, to a power transmission system for a vehicle and a vehicle having the power transmission system.

BACKGROUND

With continuous consumption of energy sources, development and use of new energy vehicle models have gradually become a trend. A hybrid power automobile as one of new energy vehicle models is driven through an engine and/or a motor, has a plurality of modes, and may improve transmission efficiency and fuel economy.

However, in related technologies understood by the inventor, some hybrid power automobiles have a small quantity of driving modes and relatively low driving transmission efficiency, and therefore cannot satisfy a requirement of adaptability of vehicles to various road conditions. Particularly, after a hybrid power automobile is fed (when a power level of a battery is insufficient), the power performance and the passing-through capability of the entire vehicle are insufficient. Moreover, to implement a stationary power generation working condition, a transmission mechanism needs to be additionally added. As a result, the integration level is low, and the power generation efficiency is low.

SUMMARY

An objective of the present invention is to at least resolve one of the technical problems in the related art to some extent. In view of this, the present invention provides a power transmission system for a vehicle. The power transmission system has a large quantity of driving modes, and can effectively adjust power output to wheels, thereby enabling the vehicle to adapt to various road conditions.

The present invention further provides a vehicle.

The power transmission system for a vehicle according to the present invention includes: a power source; a first motor generator unit; a system power output portion; and a mode conversion device, where the mode conversion device includes: a conversion device input portion, a first conversion portion, a second conversion portion and a conversion device output portion, the conversion device output portion is connected to an input end of the system power output portion, the conversion device input portion is suitable for outputting power from at least one of the power source and the first motor generator unit, the conversion device input portion is selectively connected to one of the first conversion portion and the second conversion portion, and each of the first conversion portion and the second conversion portion cooperates with the conversion device output portion to perform transmission; and the conversion device input portion is connected to the second conversion portion, so that a rotational speed output by the conversion device input portion is reduced and then output to the input end of the system power output portion.

Based on the power transmission system for a vehicle according to the present invention, by adjusting an output rotational speed transferred by the conversion device input portion to the conversion device output portion, driving modes of the vehicle can be enriched, and economy and power performance of the vehicle can be improved. Moreover, the vehicle can adapt to different road conditions, the passing-through performance and the de-trapping capability of the vehicle can be notably improved, and driving experience of a driver can be improved. Moreover, the mode conversion device not only can adjust the rotational speed and the torque of the conversion device output portion, but also can implement a function of stationary power generation. It is ensured that when the first motor generator performs driving and feedback, power is transmitted directly, and transmission efficiency is high, and it is also ensured that switching of stationary power generation modes is simple and reliable. Moreover, because the power of the engine and the power of the first motor generator are coupled at the mode conversion device, a transmission of an original conventional fuel vehicle may be completely used as the speed change unit applied to the engine and does not need to be changed, and power output of the first motor generator is implemented completely in dependence on switching of the mode conversion device. Design of such a power transmission system enables control of the driving modes independent of each other, and the structure is compact and is easily implemented.

The vehicle according to the present invention includes the foregoing power transmission system for a vehicle.

DETAILED DESCRIPTION

Figure 1:
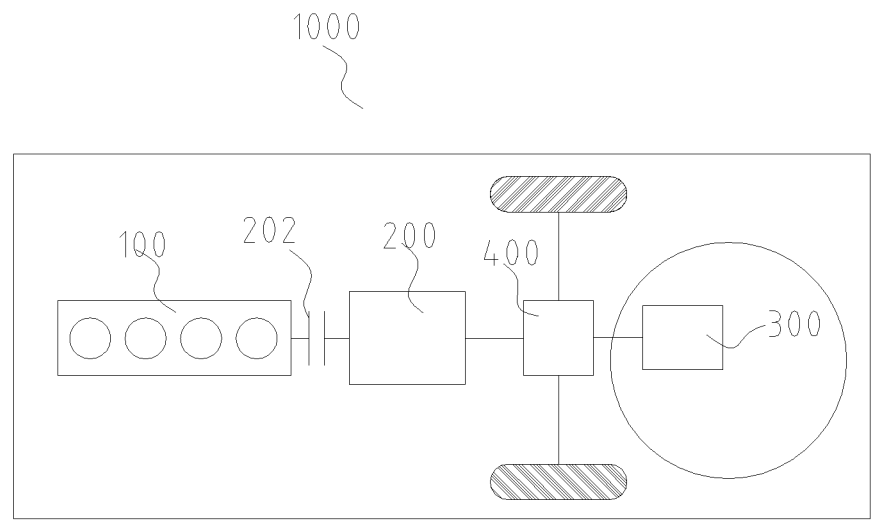
FIG. 1 to FIG. 6 are schematic diagrams of a power transmission system for a vehicle according to an embodiment of the present invention.

The following describes embodiments of the present invention in detail. Examples of the embodiments are shown in the accompanying drawings. The following embodiments described with reference to the accompanying drawings are exemplary, and are intended to describe the present invention and cannot be construed as a limitation to the present invention.

A plurality of systems, for example, a power transmission system 1000 can be arranged on a hybrid power vehicle. The power transmission system 1000 may be configured to drive front wheels or rear wheels of the vehicle. Detailed description is made below through an example in which the power transmission system 1000 drives the front wheels of the vehicle. Certainly, the power transmission system 1000 may further drive the rear wheels of the vehicle to rotate in combination with another driving system, so that the vehicle is a four-wheel drive vehicle, and the another system may be an electric driving system 700.

A power transmission system 1000 according to an embodiment of the present invention is described in detail below with reference to accompanying drawings.

As shown in FIG. 1 to FIG. 6, the power transmission system 1000 may include: a power source 100, a speed change unit 200, a first motor generator unit 300, and a system power output portion assembly 400. The system power output portion assembly 400 includes a system power output portion 401 and a mode conversion device 402. Certainly, the power transmission system 1000 may further include other mechanical components, for example, a second motor generator 600, a first clutch device 202 and a second clutch device L2. The system power output portion 401 may be a differential.

The power source 100 may be an engine, and the speed change unit 200 is suitable for being selectively coupled to the power source 100. As shown in FIG. 1 to FIG. 6, the power source 100 may be axially connected to the speed change unit 200, where the first clutch device 202 may be disposed between the power source 100 and the speed change unit 200, and the first clutch device 202 may control a state of connection or disconnection between the power source 100 and the speed change unit 200.

The speed change unit 200 may be a transmission. Certainly, the present invention is not limited thereto. The speed change unit 200 may be further another speed change mechanism, for example, a gear speed reduction transmission mechanism. Detailed description is made below through an example in which the speed change unit 200 is a transmission.

The speed change unit 200 may have a plurality of arrangement forms, and a change in each of an input shaft, an output shaft, and a gear may form a new speed change unit 200. Detailed description is made below through the speed change unit 200 in the power transmission system 1000 shown in FIG. 7 as an example.

Figure 7:
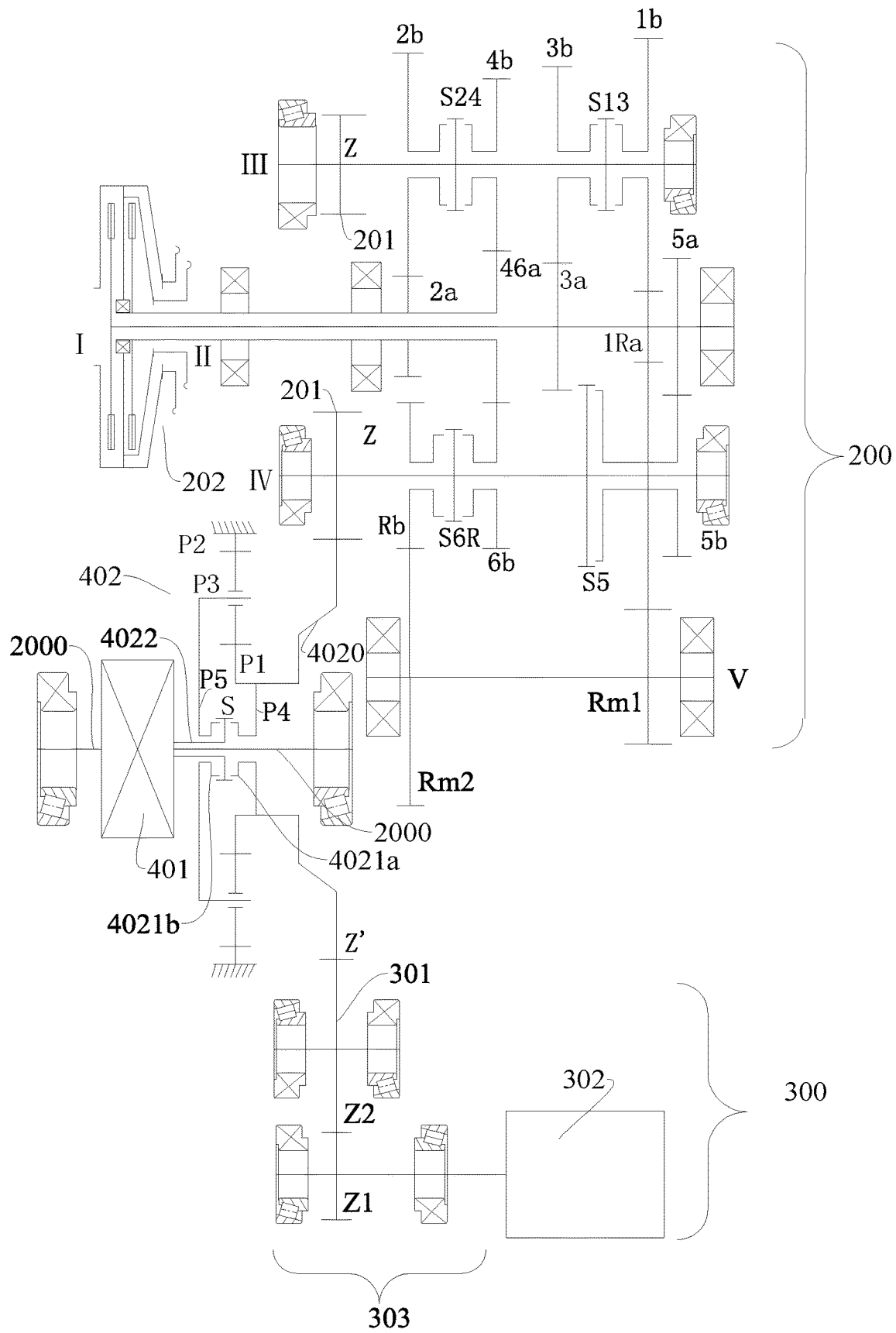
FIG. 7 to FIG. 20 are schematic structural diagrams of a power transmission system for a vehicle according to an embodiment of the present invention.

As shown in FIG. 7, the speed change unit 200 may include: a speed change power input portion, a speed change power output portion and a speed change unit output portion 201, and the speed change power input portion may be selectively connected to the power source 100, so as to transmit power generated by the power source 100. The first clutch device 202 may include an input end and an output end, the input end is connected to the power source 100, the output end is connected to the speed change power input portion, and when the input end is connected to the output end, the power source 100 is connected to the speed change power input portion to transfer power.

The speed change power output portion is constructed to be suitable for outputting power from the speed change power input portion to the speed change unit output portion 201 through synchronization of a speed change unit synchronizer, and the speed change unit output portion 201 is power-coupled to a conversion device input portion 4020 of the mode conversion device 402.

Specifically, as shown in FIG. 7, the speed change power input portion may include at least one input shaft, each input shaft may be selectively connected to the power source 100, and at least one driving gear is disposed on each input shaft.

The speed change power output portion includes: at least one output shaft, at least one driven gear is disposed on each output shaft, the driven gear is meshed with the corresponding driving gear, the speed change unit output portion 201 is at least one main reducer driving gear Z, and the at least one main reducer driving gear Z is fixed on the at least one output shaft in a one-to-one correspondence. To be specific, the speed change unit output portion 201 may be an output gear on the output shaft, the output gear may be fixed on the corresponding output shaft, and the output gear is meshed with a main reducer driven gear to perform power transfer.

There may be a plurality of input shafts, and the plurality of input shafts is sequentially coaxially nested. When the power source 100 transfers power to an input shaft, the power source 100 may be selectively connected to one of the plurality of input shafts. The plurality of input shafts is coaxially nested, so that the speed change unit 200 may be arranged compactly, the axial length is small, and the radial size is small, thereby improving structure compactness of the speed change unit 200.

For example, as shown in FIG. 7, the speed change unit 200 may be a six-gear speed change unit, the speed change power input portion may include: a first input shaft I and a second input shaft II, the second input shaft II is sleeved on the first input shaft I, the first clutch device 202 may be a double clutch, the double clutch has an input end, a first output end and a second output end, and the input end may be selectively connected to at least one of the first output end and the second output end. To be specific, the input end may be connected to the first output end, or the input end may be connected to the second output end, or the input end may be connected to both the first output end and the second output end. The first output end is connected to the first input shaft I, and the second output end is connected to the second input shaft II.

Each of the first input shaft I and the second input shaft II is fixedly provided with at least one driving gear. Specifically, as shown in FIG. 7, a first-gear driving gear 1Ra, a third-gear driving gear 3a and a fifth-gear driving gear 5a are disposed on the first input shaft I, and a second-gear driving gear 2a and a fourth-sixth-gear driving gear 46a are disposed on the second input shaft II. The second input shaft II is sleeved on the first input shaft I. In this way, the axial length of the power transmission system 1000 may be effectively shortened, thereby reducing space of the vehicle occupied by the power transmission system 1000. The foregoing fourth-sixth-gear driving gear 46a means that the gear may be used as both a fourth-gear driving gear and a sixth-gear driving gear. In this way, the axial length of the second input shaft II may be shortened, thereby better reducing the volume of the power transmission system 1000.

According to distances from the engine, an arrangement order of a plurality of gearshift driving gears is the second-gear driving gear 2a, the fourth-sixth-gear driving gear 46a, the third-gear driving gear 3a, the first-gear driving gear 1Ra and the fifth-gear driving gear 5a. Locations of the plurality of gearshift driving gears are properly arranged, so that locations of a plurality of gearshift driven gears and a plurality of output shafts may be arranged properly. Therefore, the power transmission system 1000 may have a simple structure and a small volume.

The output shafts include: a first output shaft III and a second output shaft IV, at least one driven gear is freely sleeved on each of the first output shaft III and the second output shaft IV, a first-gear driven gear 1b, a second-gear driven gear 2b, a third-gear driven gear 3b and a fourth-gear driven gear 4b are freely sleeved on the first output shaft III, and a fifth-gear driven gear 5b and a sixth-gear driven gear 6b are freely sleeved on the second output shaft IV. The first-gear driving gear 1Ra is meshed with the first-gear driven gear 1b, the second-gear driving gear 2a is meshed with the second-gear driven gear 2b, the third-gear driving gear 3a is meshed with the third-gear driven gear 3b, the fourth-sixth-gear driving gear 46a is meshed with the fourth-gear driven gear 4b, the fifth-gear driving gear 5a is meshed with the fifth-gear driven gear 5b, and the fourth-sixth-gear driving gear 46a is meshed with the sixth-gear driven gear 6b.

A first-third-gear synchronizer S13 is disposed between the first-gear driven gear 1b and the third-gear driven gear 3b, and the first-third-gear synchronizer S13 may be configured to synchronize the first-gear driven gear 1b with the first output shaft III, and may be configured to synchronize the third-gear driven gear 3b with the first output shaft III.

A second-fourth-gear synchronizer S24 is disposed between the second-gear driven gear 2b and the fourth-gear driven gear 4b, and the second-fourth-gear synchronizer S24 may be configured to synchronize the second-gear driven gear 2b with the first output shaft III, and may be configured to synchronize the fourth-gear driven gear 4b with the first output shaft III.

One side of the fifth-gear driven gear 5b is provided with a fifth-gear synchronizer S5, and the fifth-gear synchronizer S5 may be configured to synchronize the fifth-gear driven gear 5b with the second output shaft IV. One side of the sixth-gear driven gear 6b is provided with a sixth-gear synchronizer S6R, and the sixth-gear synchronizer S6R may be configured to synchronize the sixth-gear driven gear 6b with the second output shaft IV.

A reverse-gear driven gear Rb is freely sleeved on one of the plurality of output shafts, and a reverse-gear synchronizer configured to connect to the reverse-gear driven gear Rb is further disposed on the corresponding one output shaft. To be specific, a reverse-gear driven gear Rb is freely sleeved on one of the first output shaft III and the second output shaft IV. As shown in FIG. 7, a reverse-gear driven gear Rb is disposed on the second output shaft IV, and a reverse-gear synchronizer on the second output shaft IV may be configured to synchronize the reverse-gear driven gear Rb with the second output shaft IV.

Further, as shown in FIG. 7, the power transmission system 1000 may further include: a reverse-gear intermediate shaft V. The first reverse-gear intermediate gear Rm1 and the second reverse-gear intermediate gear Rm2 is fixedly disposed on the reverse-gear intermediate shaft V, the first reverse-gear intermediate gear Rm1 is meshed with one of the gearshift driving gears (that is, driving gear), and the second reverse-gear intermediate gear Rm2 is meshed with the reverse-gear driven gear Rb. The one of the gearshift driving gears may be the first-gear driving gear 1Ra, power transferred to the first-gear driving gear 1Ra may be transferred to the reverse-gear intermediate shaft V through the first reverse-gear intermediate gear Rm1, the reverse-gear intermediate shaft V may transfer power to the reverse-gear driven gear Rb through the second reverse-gear intermediate gear Rm2, the reverse-gear driven gear Rb may transfer power to the second output shaft IV through the reverse-gear synchronizer, the second output shaft IV may transfer power to a main reducer driven gear Z' through the output gear of the second output shaft IV, and the main reducer driven gear Z' may transfer power to wheels on two sides through the system power output portion 401 to drive the vehicle to move. To be specific, each of the first output gear and the second output gear may be a main reducer driving gear Z, and the main reducer driving gear Z is meshed with the main reducer driven gear Z'.

Because the reverse-gear driven gear Rb is sleeved on the second output shaft IV, the reverse-gear driven gear Rb may share the reverse-gear synchronizer with another neighboring gearshift driven gear. In this way, a quantity of synchronizers arranged on the second output shaft IV may be reduced, thereby shortening the axial length of the second output shaft IV, and reducing costs of the power transmission system 1000. For example, the another neighboring gearshift driven gear may be the sixth-gear driven gear 6b. In other words, the reverse-gear synchronizer may form the sixth-gear synchronizer S6R. The reverse-gear synchronizer may be disposed between the sixth-gear driven gear 6b and the reverse-gear driven gear Rb.

Certainly, a specific arrangement form of the speed change unit 200 is not limited thereto. An arrangement form of another speed change unit 200 is described in detail below with reference to FIG. 33 to FIG. 35.

Figure 33:
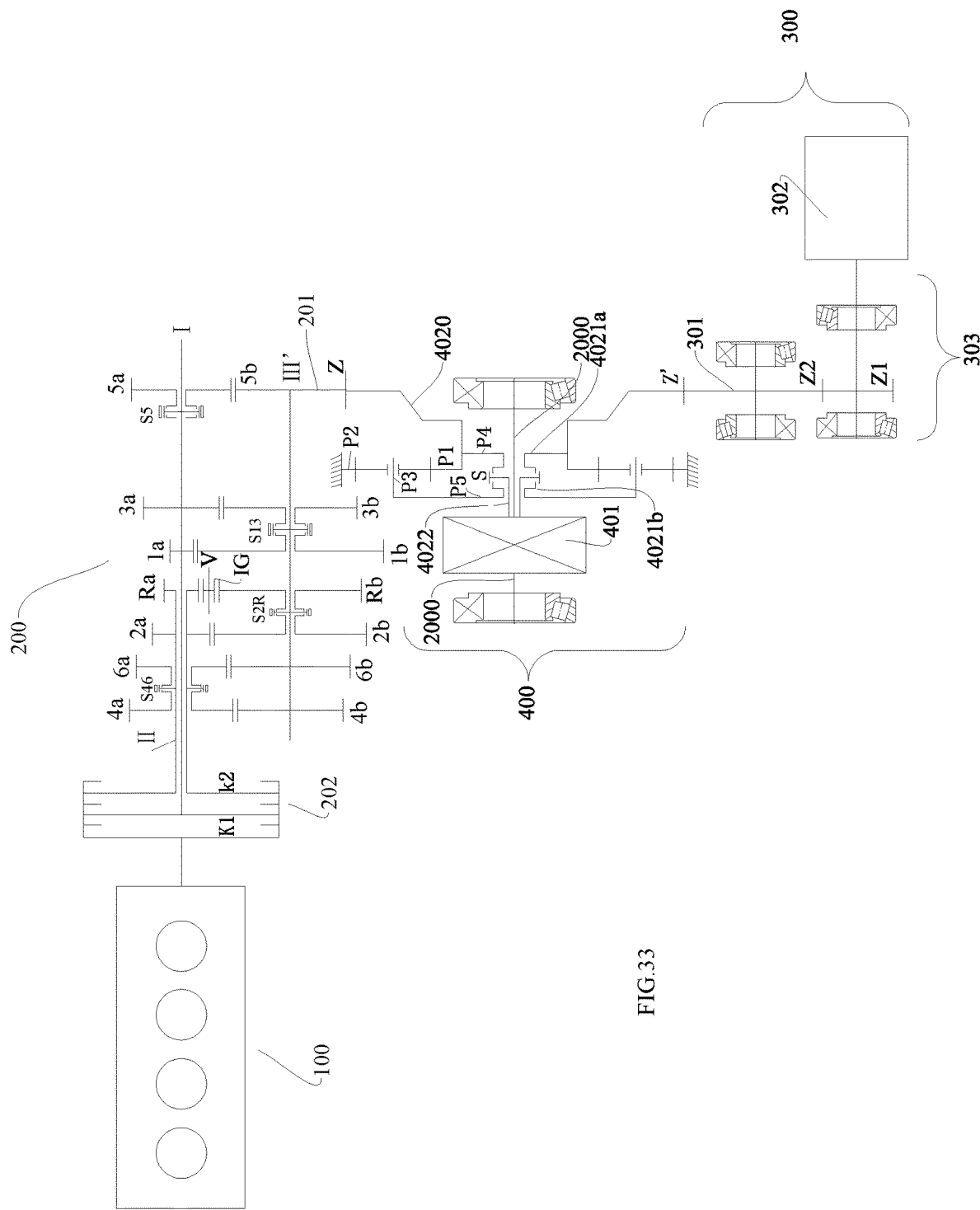
FIG. 33 to FIG. 64 are schematic structural diagrams of a power transmission system for a vehicle according to an embodiment of the present invention.
Figure 34:
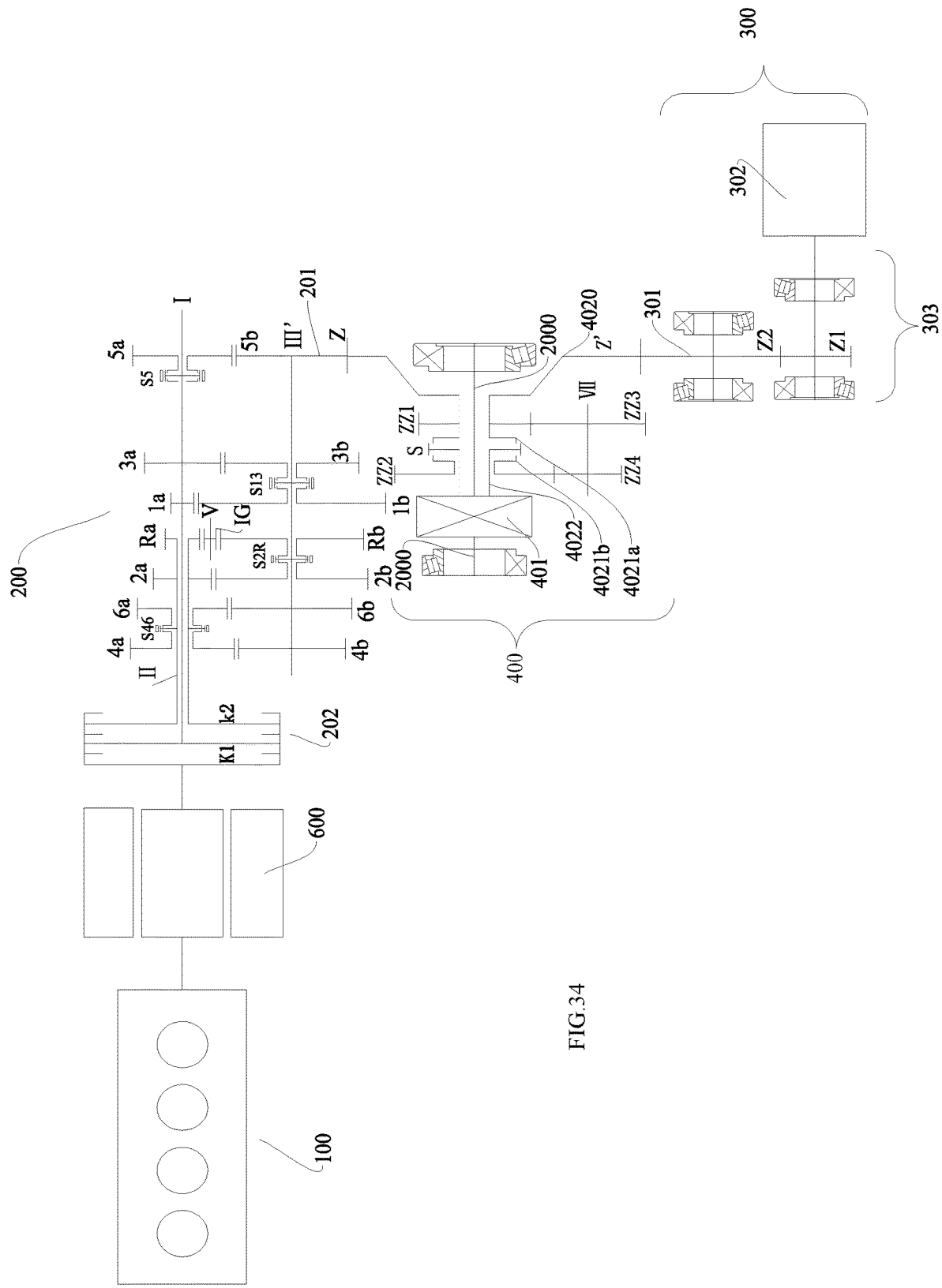
Figure 35:
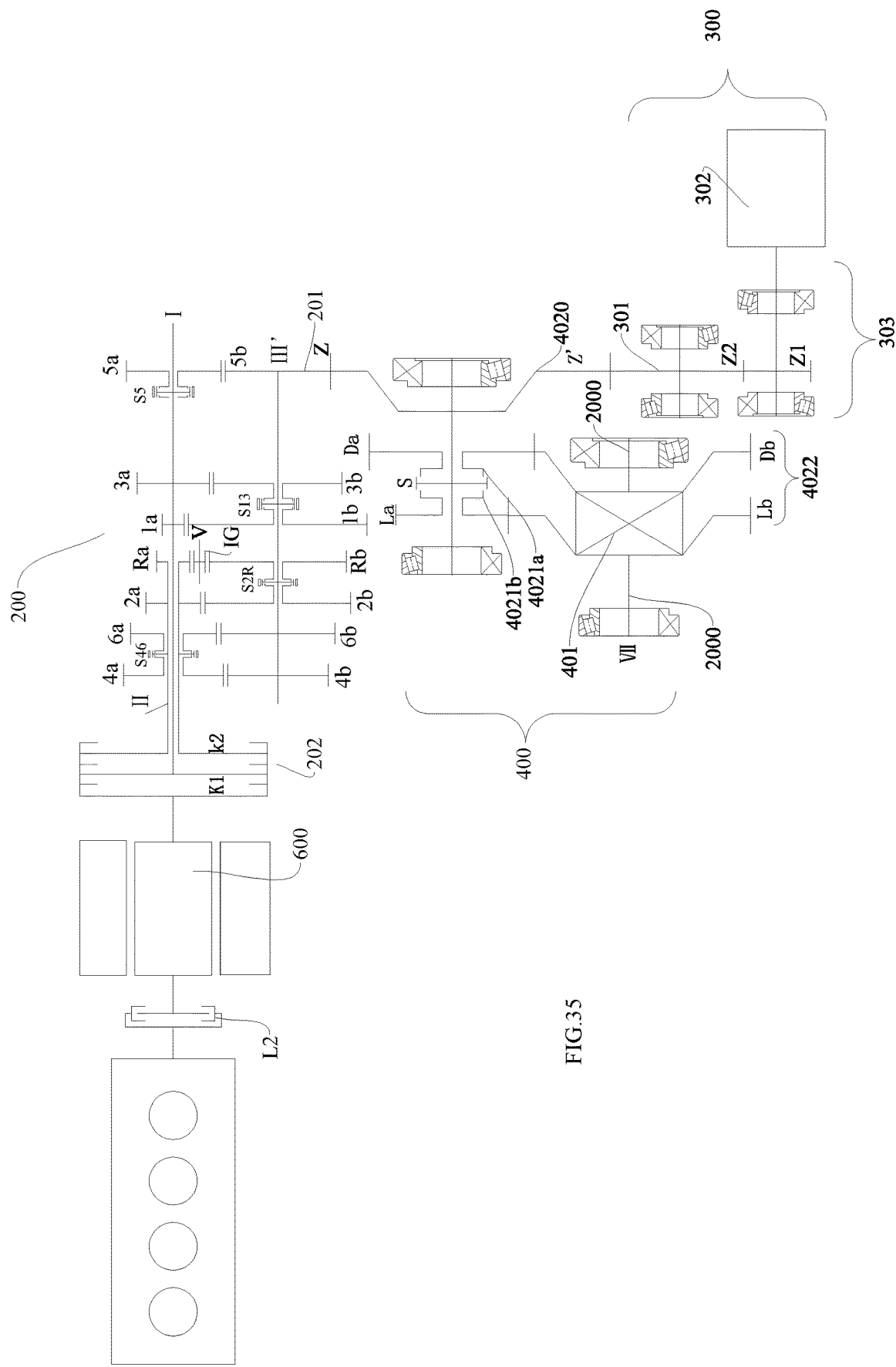

As shown in FIG. 33 to FIG. 35, the speed change unit 200 may be a six-gear speed change unit, the speed change power input portion may include: a first input shaft I and a second input shaft II, the second input shaft II is sleeved on the first input shaft I, the first clutch device 202 may be a double clutch, the double clutch has an input end, a first output end K1 and a second output end k2, and the input end may be selectively connected to at least one of the first output end and the second output end. To be specific, the input end may be connected to the first output end, or the input end may be connected to the second output end, or the input end may be connected to both the first output end and the second output end. The first output end is connected to the first input shaft I, and the second output end is connected to the second input shaft II.

At least one first driving gear is fixed on each of the first input shaft I and the second input shaft II, and at least one second driving gear is freely sleeved on each of the first input shaft I and the second input shaft II.

As shown in FIG. 33 to FIG. 35, a first-gear driving gear 1Ra and a third-gear driving gear 3a are fixedly disposed on the first input shaft I, a fifth-gear driving gear 5a is freely sleeved on the first input shaft I, a second-gear driving gear 2a is fixedly disposed on the second input shaft II, and a fourth-gear driving gear 4a and a sixth-gear driving gear 6a are freely sleeved on the second input shaft II, where a fourth-sixth-gear synchronizer S6R may be disposed between the fourth-gear driving gear 4a and the sixth-gear driving gear 6a. The second input shaft II is sleeved on the first input shaft I. In this way, the axial length of the power transmission system 1000 may be effectively shortened, thereby reducing space of the vehicle occupied by the power transmission system 1000.

There is one output shaft, that is, power output shaft. The reverse-gear driven gear Rb and at least one first driven gear are freely sleeved on the power output shaft, the at least one first driven gear is correspondingly meshed with the at least one first driving gear, at least one second driven gear is fixedly disposed on the power output shaft, the at least one second driven gear is correspondingly meshed with the at least one second driving gear, and the reverse-gear driven gear Rb and the at least one first driven gear are selectively connected to the power output shaft.

The first output shaft III' is fixedly provided with the fourth-gear driven gear 4b, the fifth-gear driven gear 5b, the sixth-gear driven gear 6b, and the first-gear driven gear 1b, the second-gear driven gear 2b, the third-gear driven gear 3b and the reverse-gear driven gear Rb are further sleeved on the first output shaft III', a first-third-gear synchronizer S13 is disposed between the first-gear driven gear 1b and the third-gear driven gear 3b, and a second-reverse-gear synchronizer S2R is disposed between the second-gear driven gear 2b and the reverse-gear driven gear Rb.

A reverse-gear driving gear Ra is further fixedly disposed on the second input shaft II, the reverse-gear driven gear Rb is freely sleeved on the first output shaft III', an idle gear IG is disposed between the reverse-gear driving gear Ra and the reverse-gear driven gear Rb, the idle gear IG is meshed between the reverse-gear driving gear Ra and the reverse-gear driven gear Rb, the idle gear IG is fixed on the reverse-gear intermediate shaft V, and the idle gear IG may ensure that the reverse-gear driving gear Ra and the reverse-gear driven gear Rb are linked in a same direction.

The output gear on the power output shaft may be a main reducer driving gear Z, and the main reducer driving gear Z is meshed with the main reducer driven gear Z'.

The mode conversion device 402 includes a conversion device input portion 4020 and a conversion device output portion 4022, the conversion device input portion 4020 is suitable for outputting power from at least one of the power source 100 and the first motor generator unit 300, the conversion device output portion 4022 is connected to an input end of the system power output portion 401, and the conversion device input portion 4020 is selectively power-coupled to the conversion device output portion 4022.

The conversion device input portion 4020 may be the main reducer driven gear Z', the speed change unit output portion 201 of the foregoing speed change unit 200 may be the main reducer driving gear Z, and the main reducer driving gear Z is meshed with the main reducer driven gear Z'. Therefore, the power source 100 may transfer power to the conversion device input portion 4020 of the mode conversion device 402 through the speed change unit 200, and when the conversion device input portion 4020 is connected to the conversion device output portion 4022, the power source 100 transfers power to the system power output portion 401 to drive front wheels of the vehicle to rotate.

Moreover, the first motor generator unit 300 may further perform transmission with the conversion device input portion 4020. For example, the first motor generator unit 300 is linked with the conversion device input portion 4020.

It should be noted that, the foregoing "linkage" may be understood as associated movement between a plurality of components (for example, two). Using linkage between two components as an example, when one component moves, the other component also moves accordingly.

For example, in some embodiments of the present invention, linkage between a gear and a shaft may be understood as that when the gear rotates, the shaft linked with the gear also rotates, or when the shaft rotates, the gear linked with the shaft also rotates.

For another example, linkage between shafts may be understood as that when one shaft rotates, the other shaft linked with the one shaft also rotates.

For still another example, linkage between gears may be understood as that when one gear rotates, the other gear linked with the one gear also rotates.

In the following "linkage" related description of the present invention, such understanding is made unless otherwise specified.

As shown in FIG. 7 to FIG. 20, the first motor generator unit 300 may include a first motor generator 302 and a first motor generator unit coupling portion 301, the first motor generator 302 is power-coupled to the first motor generator unit coupling portion 301, the first motor generator unit coupling portion 301 may be the main reducer driving gear Z, and the first motor generator unit coupling portion 301 is power-coupled to the conversion device input portion 4020. It may be understood that, there may be a plurality of main reducer driving gears Z, and each of the speed change unit output portion 201 of the speed change unit 200 and the first motor generator unit coupling portion 301 of the first motor generator unit 300 may be a main reducer driving gear Z.

Further, as shown in FIG. 7 to FIG. 20, the first motor generator unit 300 may further include a speed reduction chain 303, the first motor generator 302 is power-coupled to the first motor generator unit coupling portion 301 through the speed reduction chain 303, and the first motor generator unit coupling portion 301 is power-coupled to the conversion device input portion 4020. To be specific, when the first motor generator 302 is used as an electric motor, power generated by the first motor generator 302 may be transferred to the conversion device input portion 4020 of the mode conversion device 402 through the speed reduction chain 303 and the first motor generator unit coupling portion 301. The speed reduction chain 303 may play a role of speed reduction and torque increase.

The speed reduction chain 303 may include two gears, a gear 1 Z1 may be fixed on the motor output shaft of the first motor generator 302, a gear 2 Z2 is meshed between the gear 1 and the main reducer driven gear Z', and the diameter and the quantity of teeth of the gear 2 Z2 are both greater than the diameter and the quantity of teeth of the gear 1 Z1.

Figure 36:
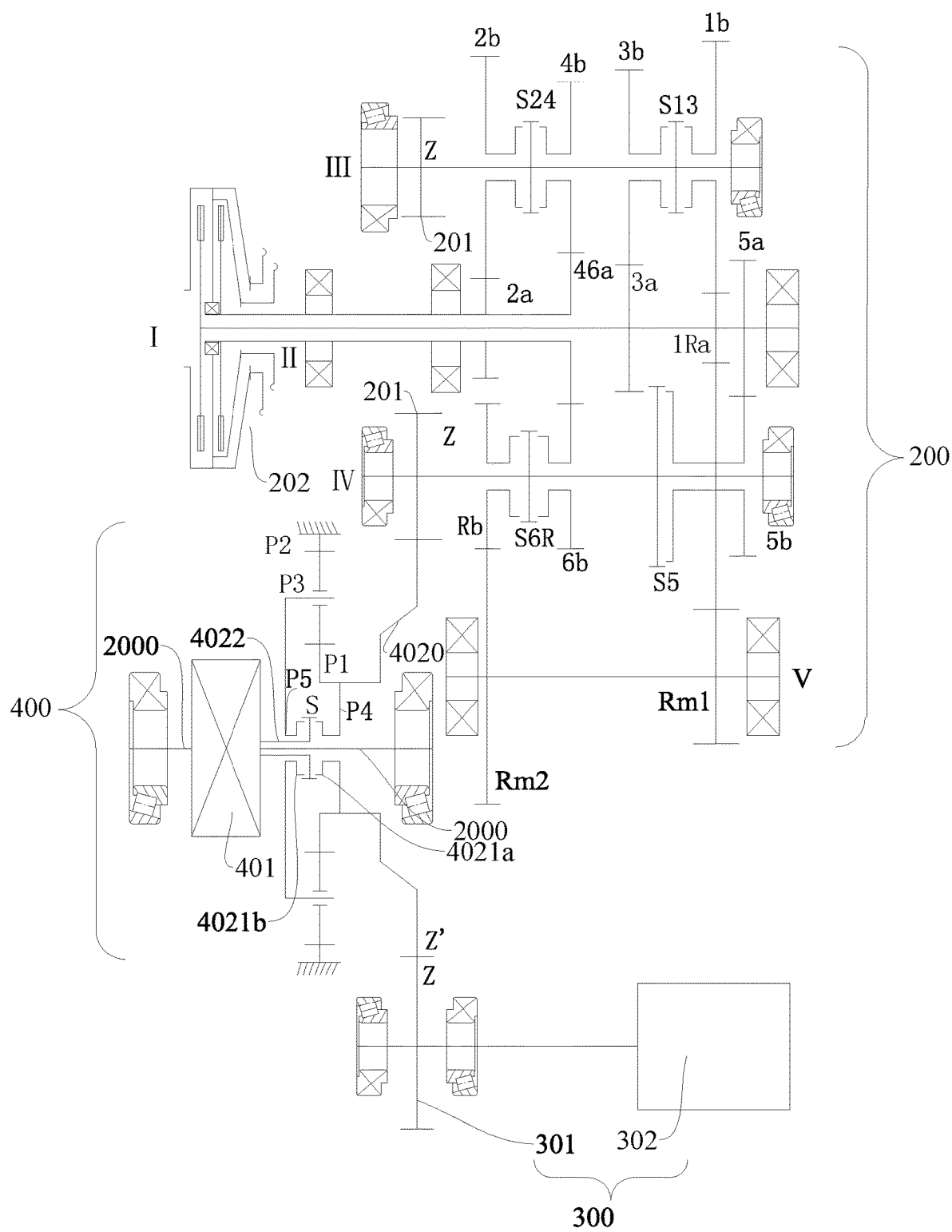
Figure 37:
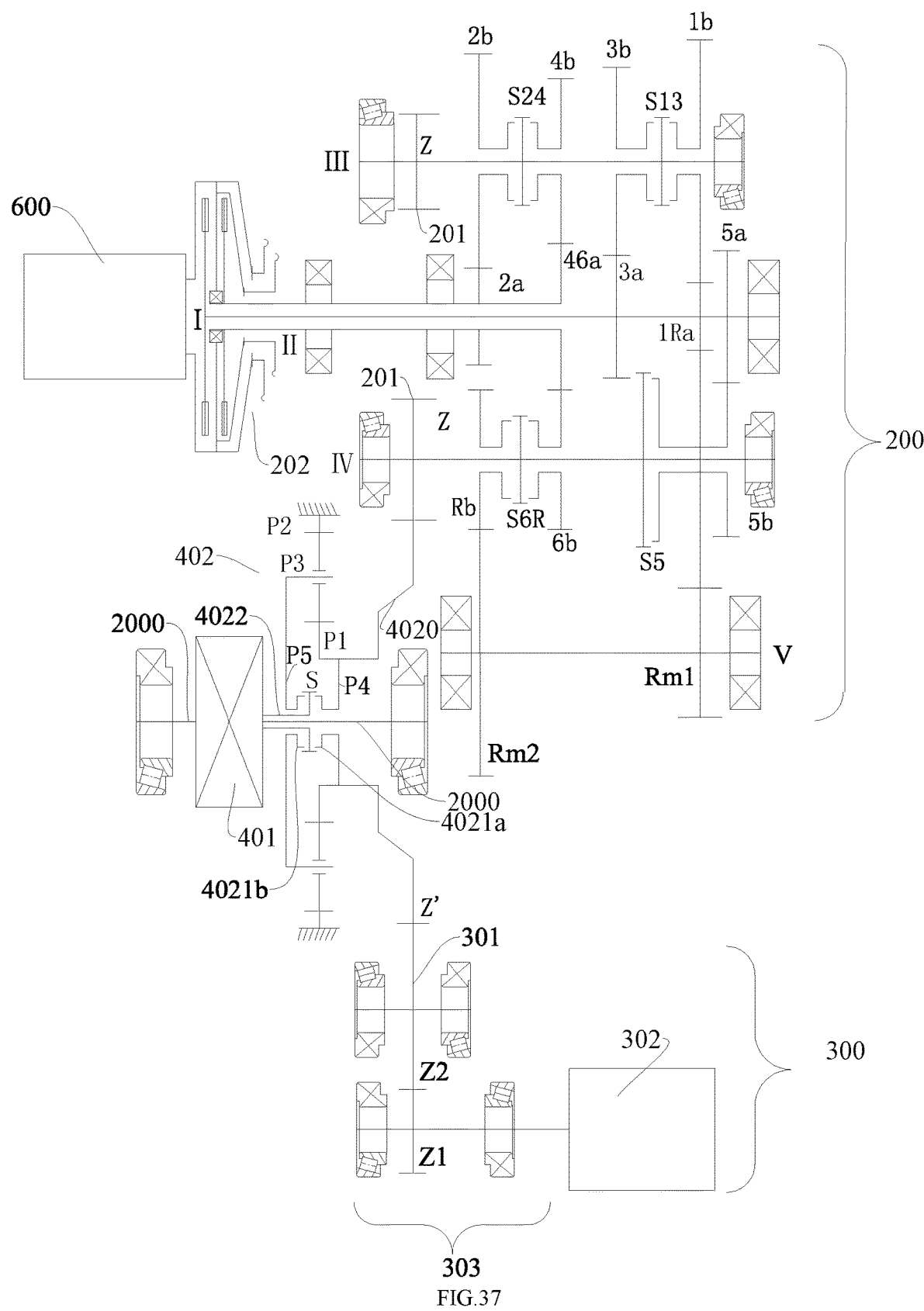
Figure 38:
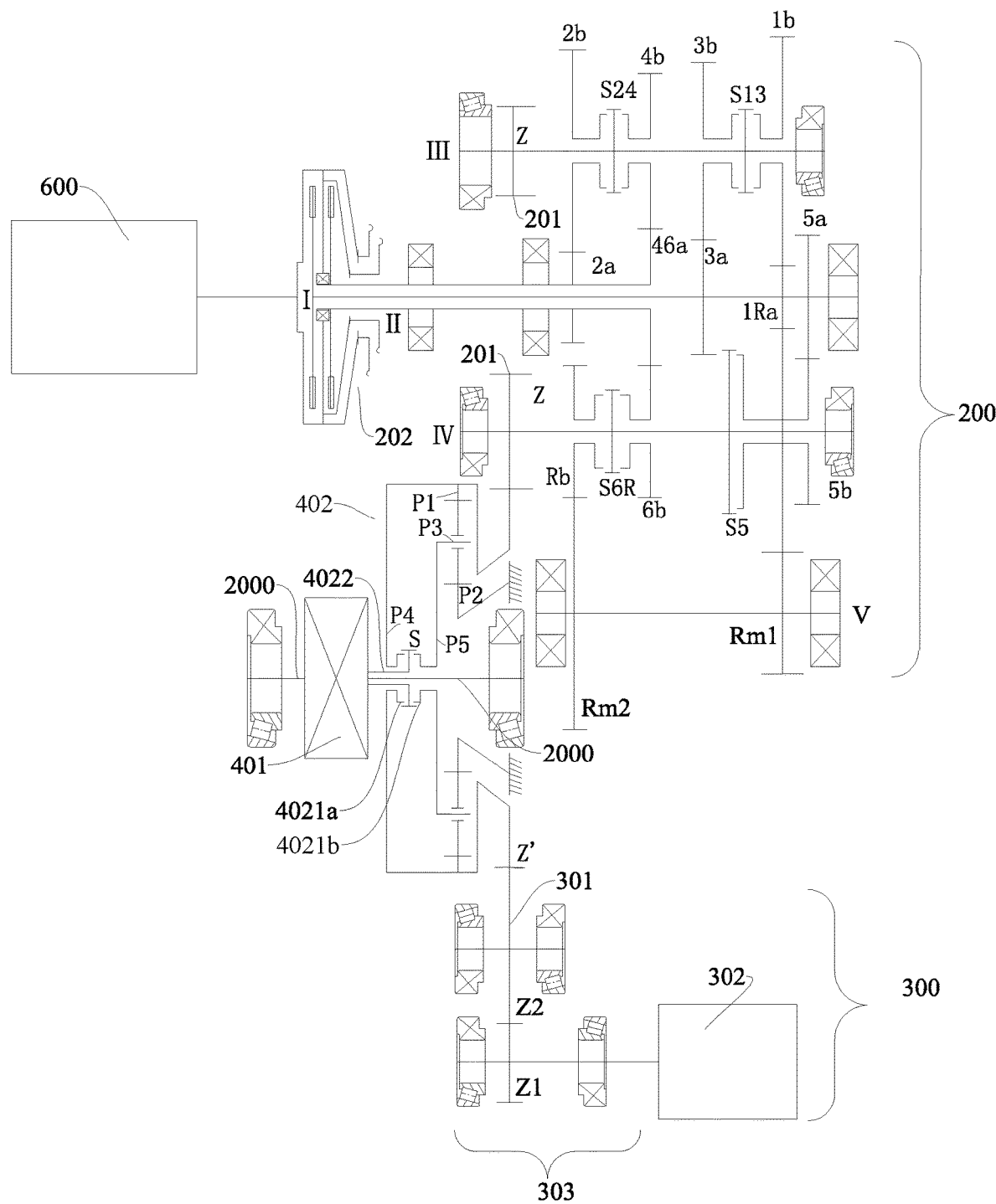
Figure 39:
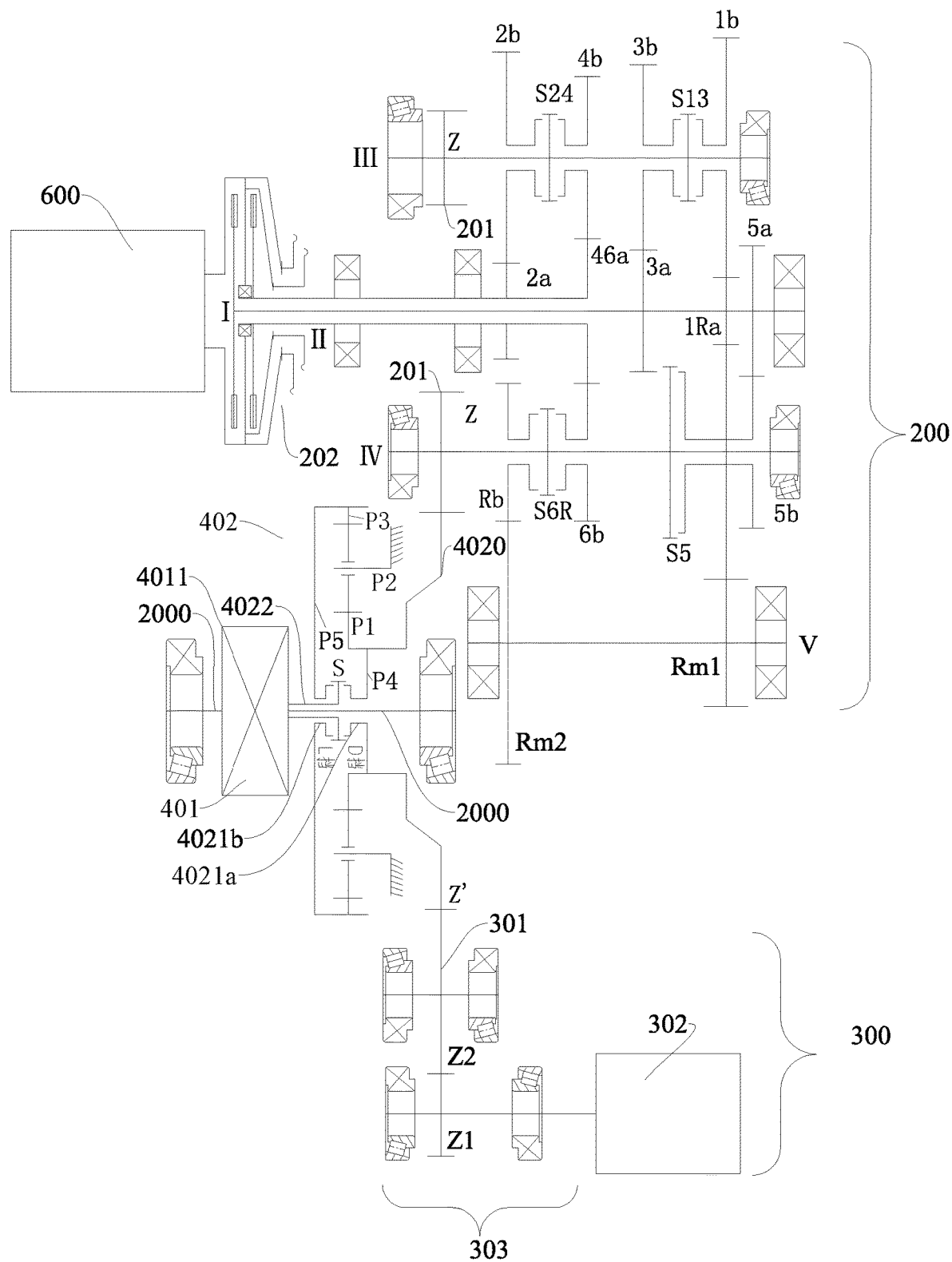
Figure 40:
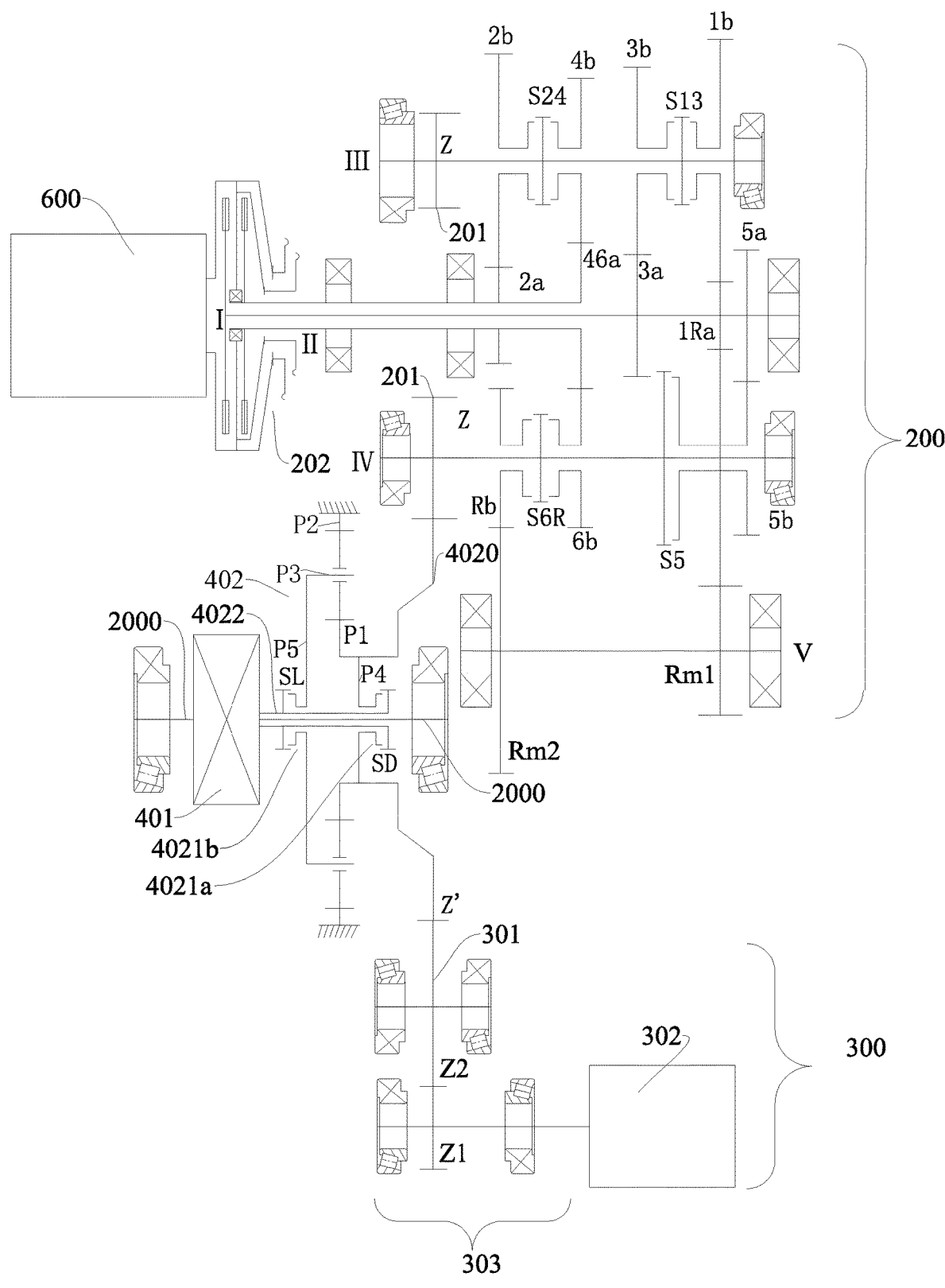
Figure 41:
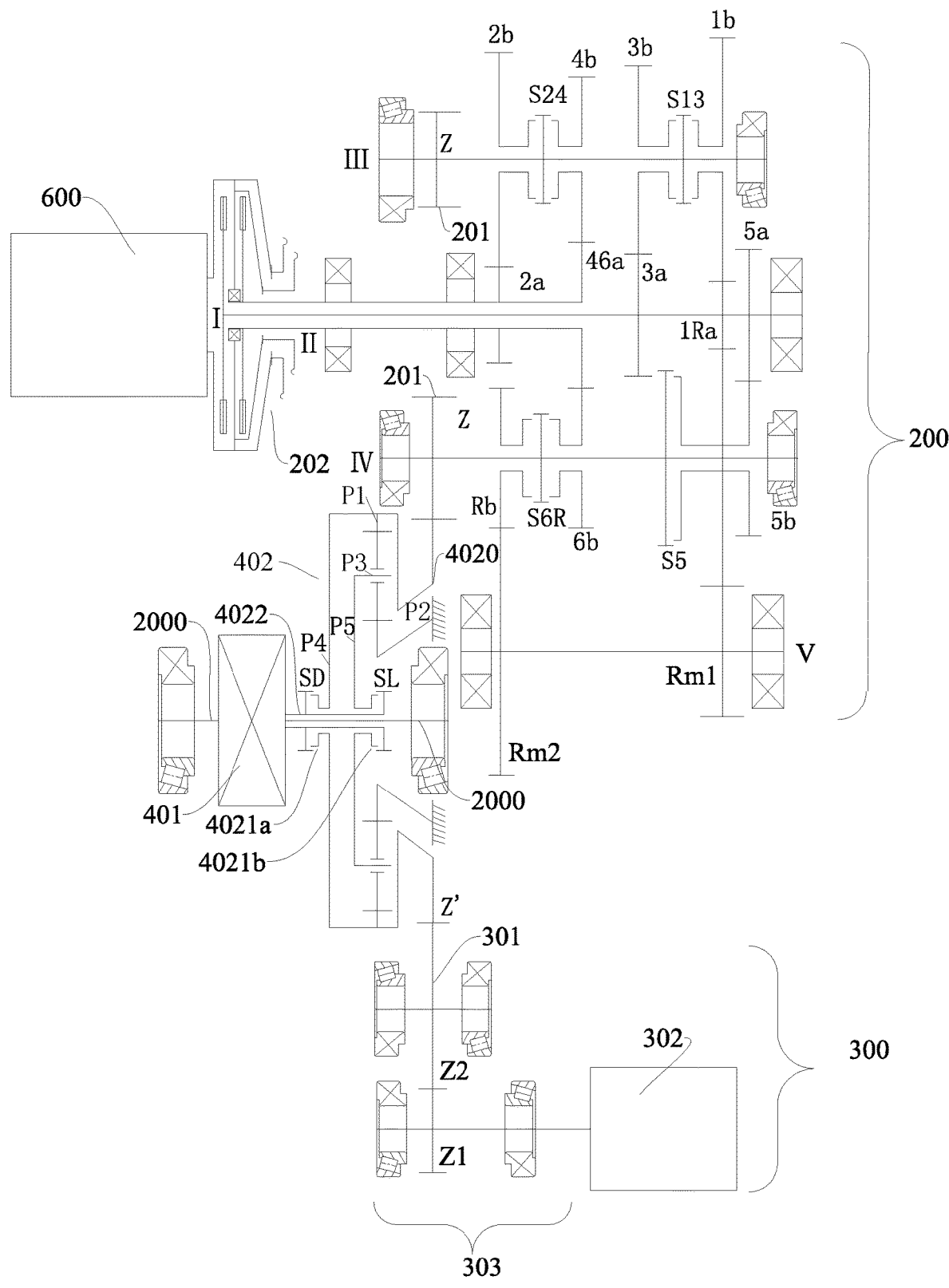
Figure 42:
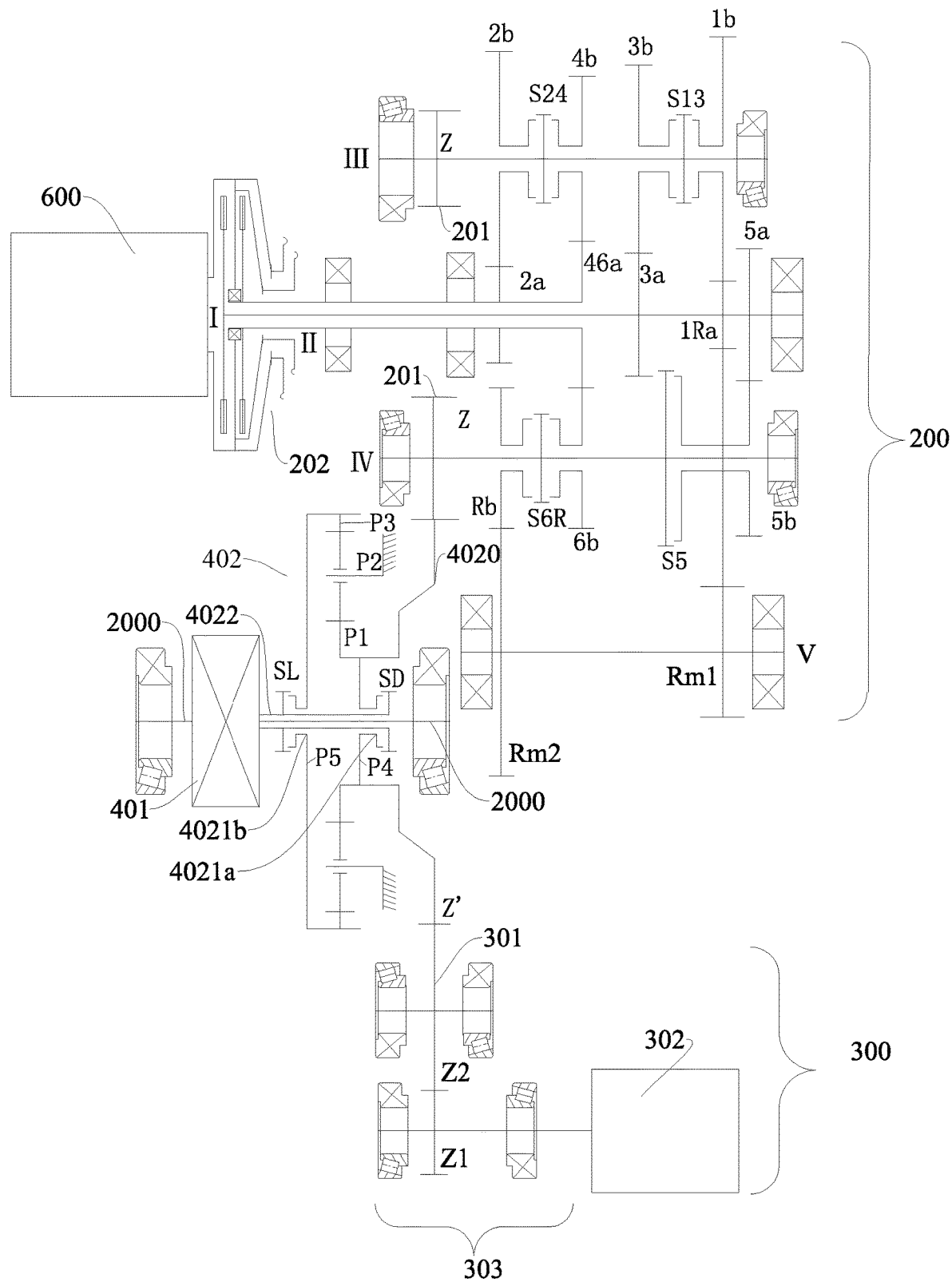
Figure 43:
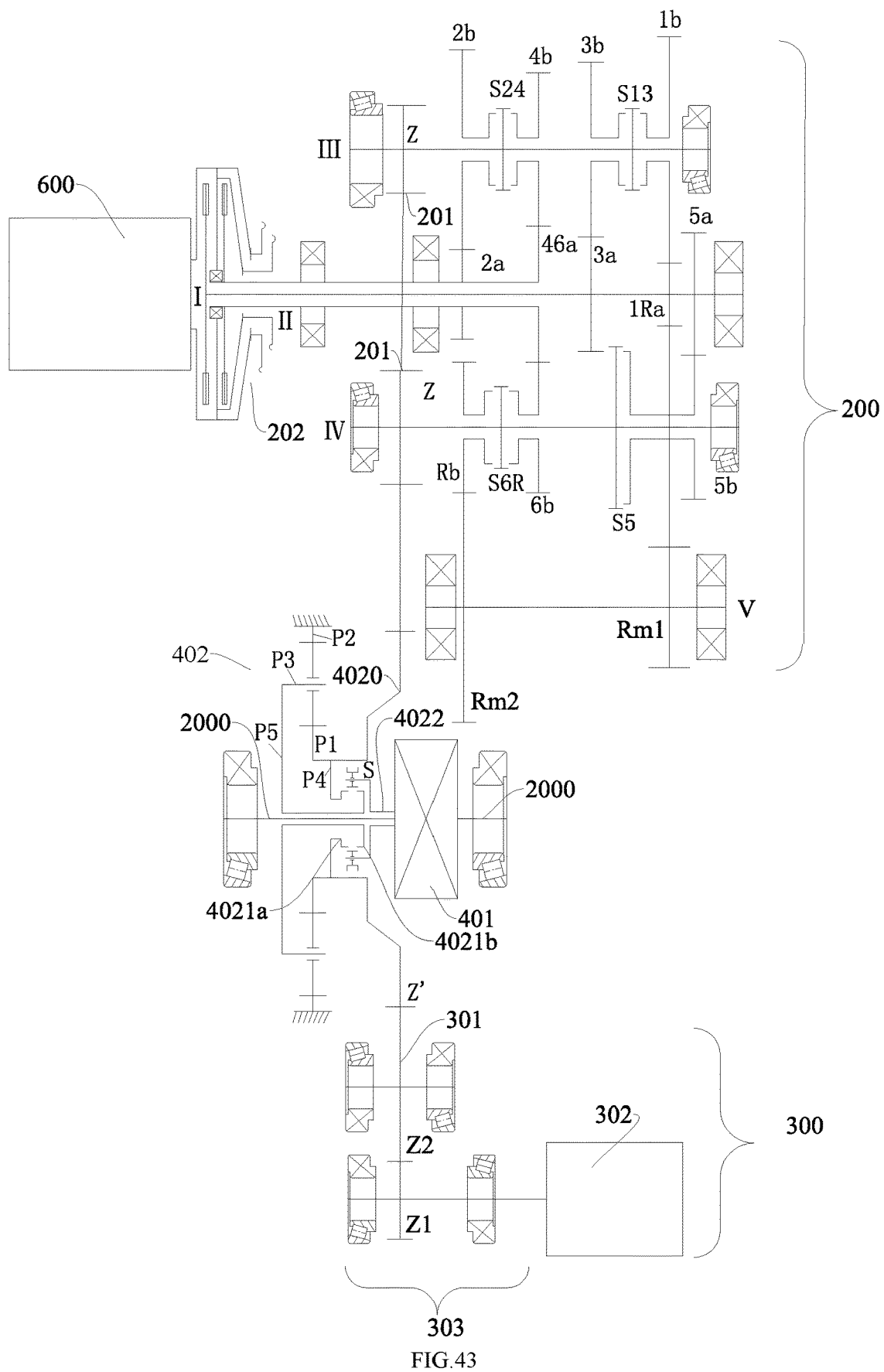
Figure 44:
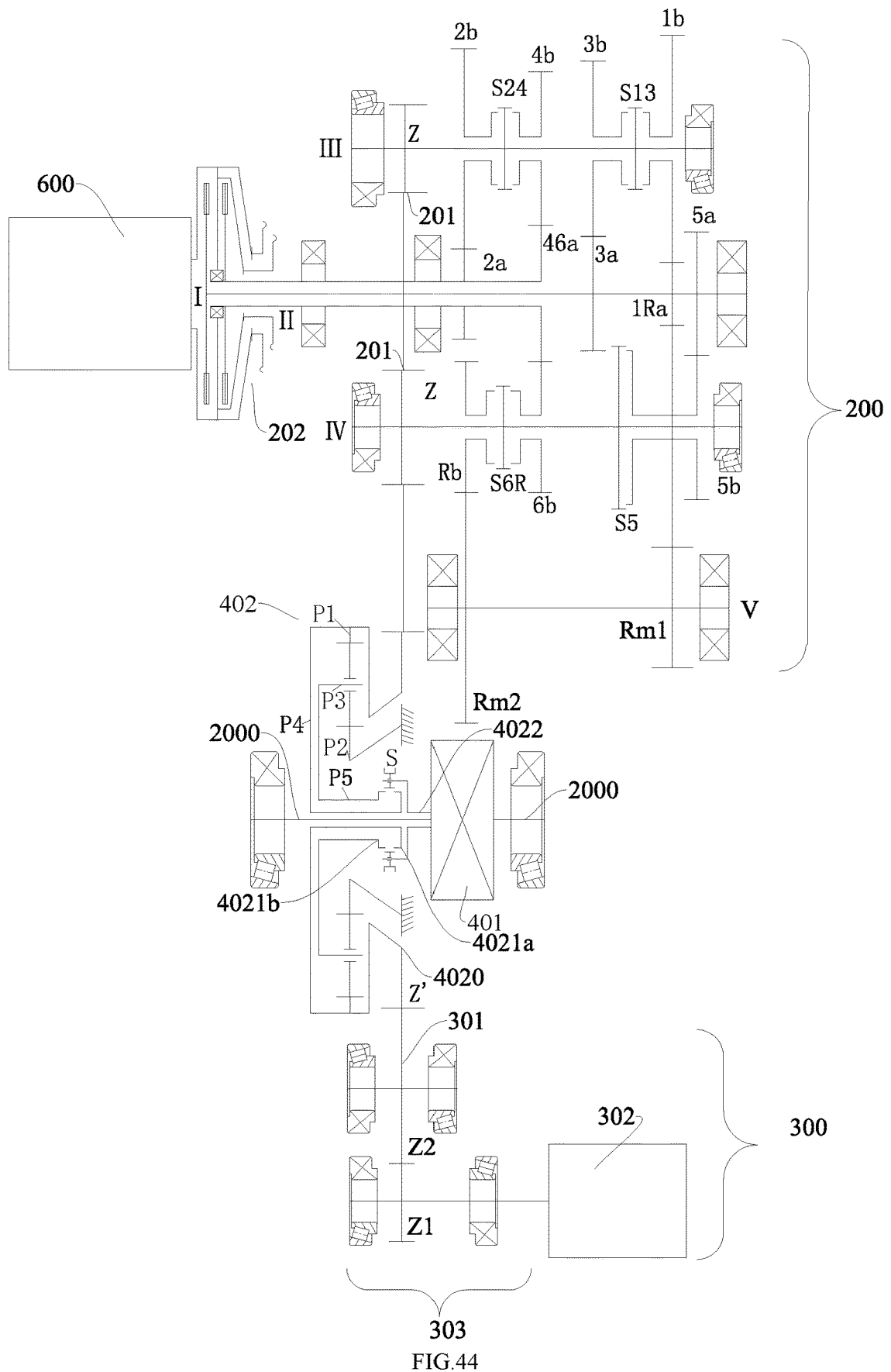
Figure 45:
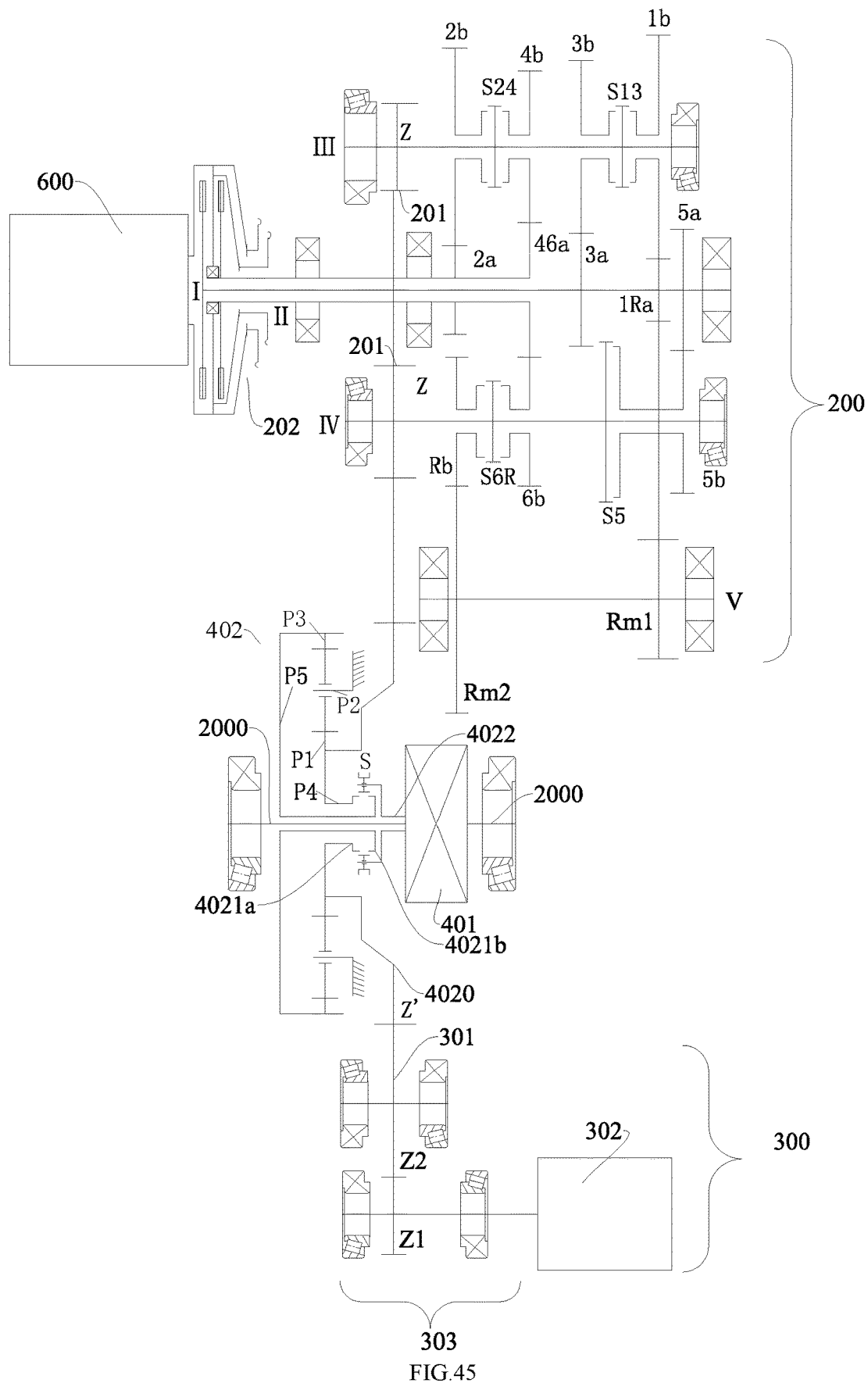
Figure 46:
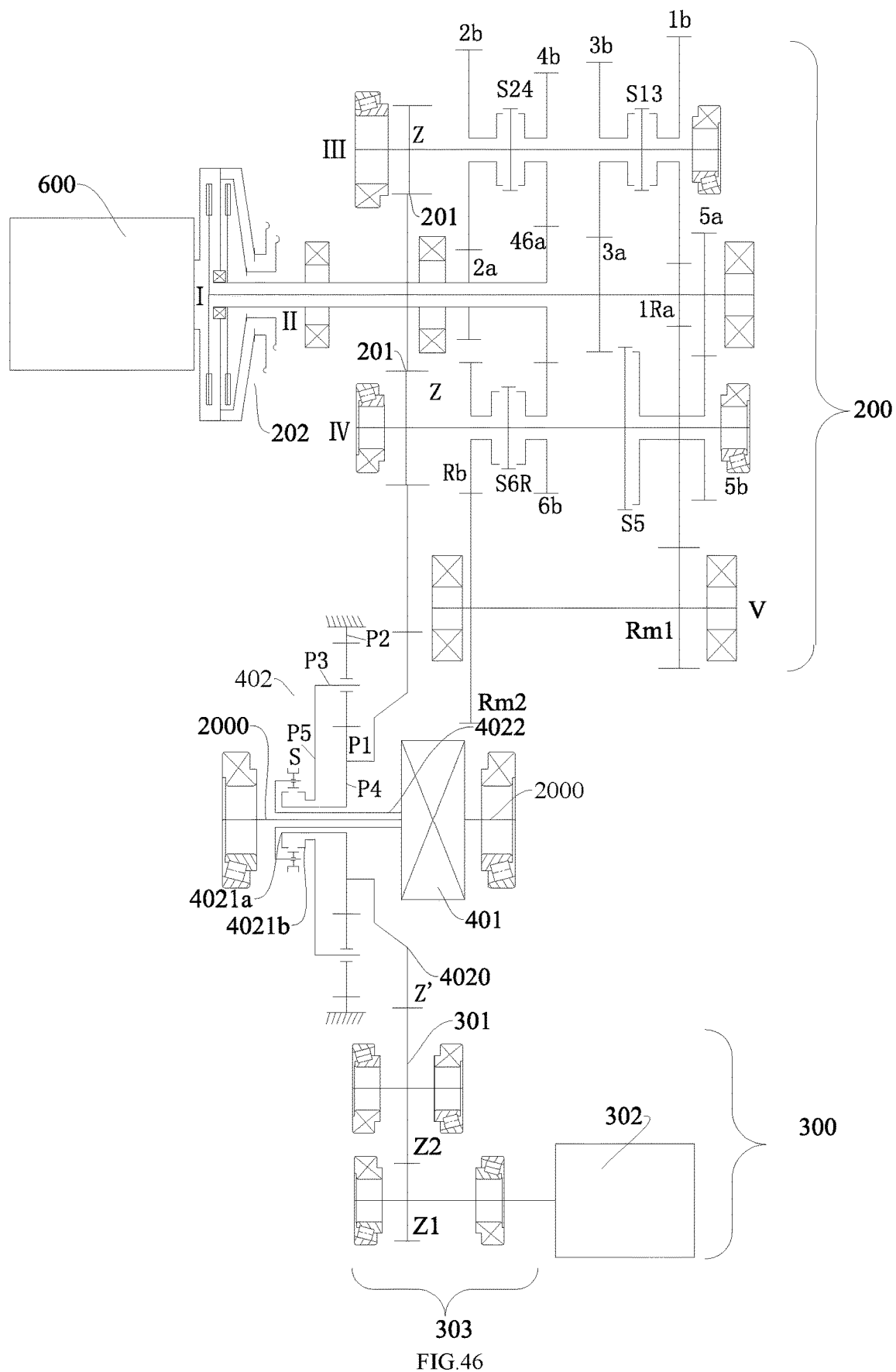
Figure 47:
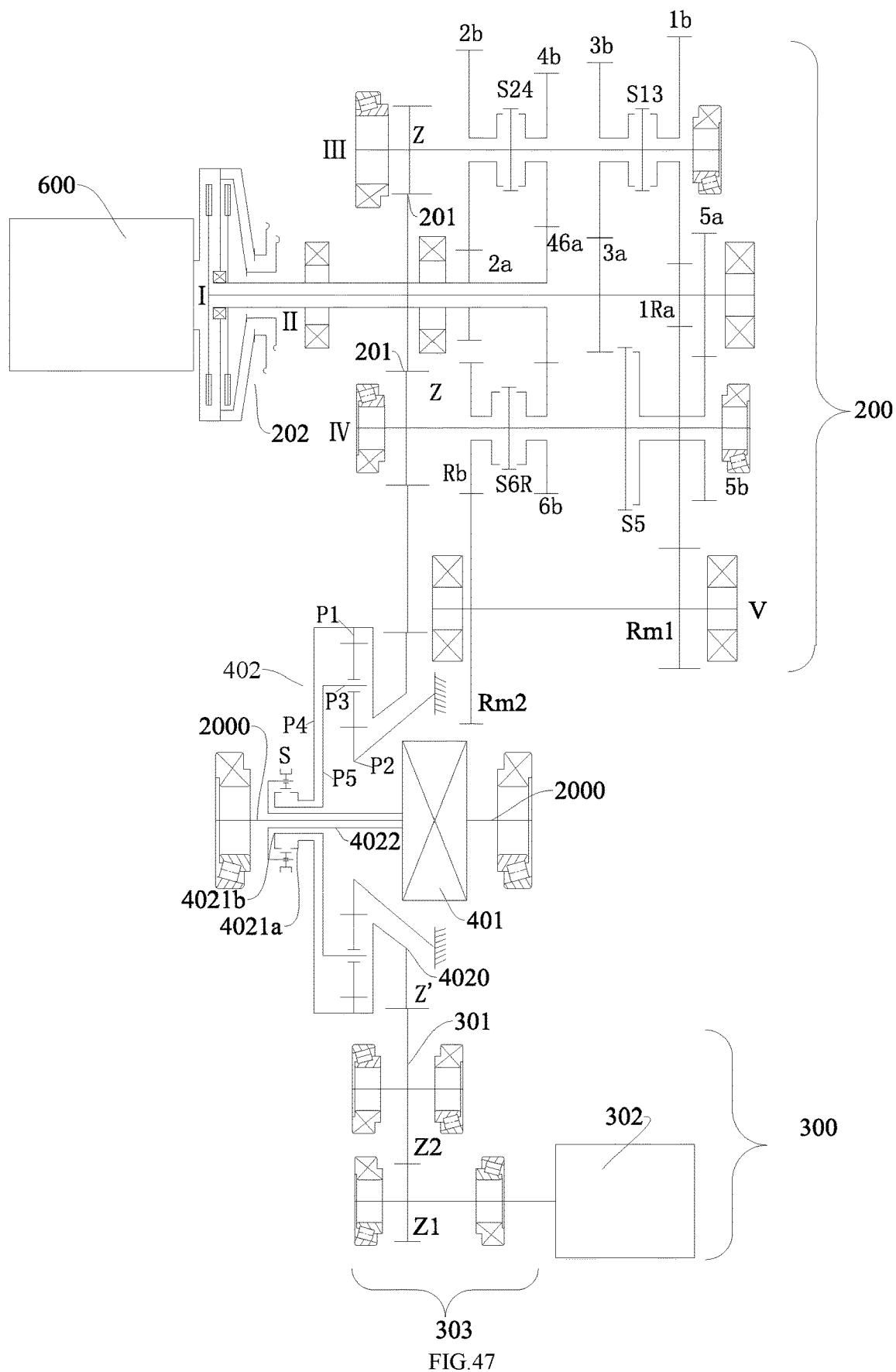
Figure 48:
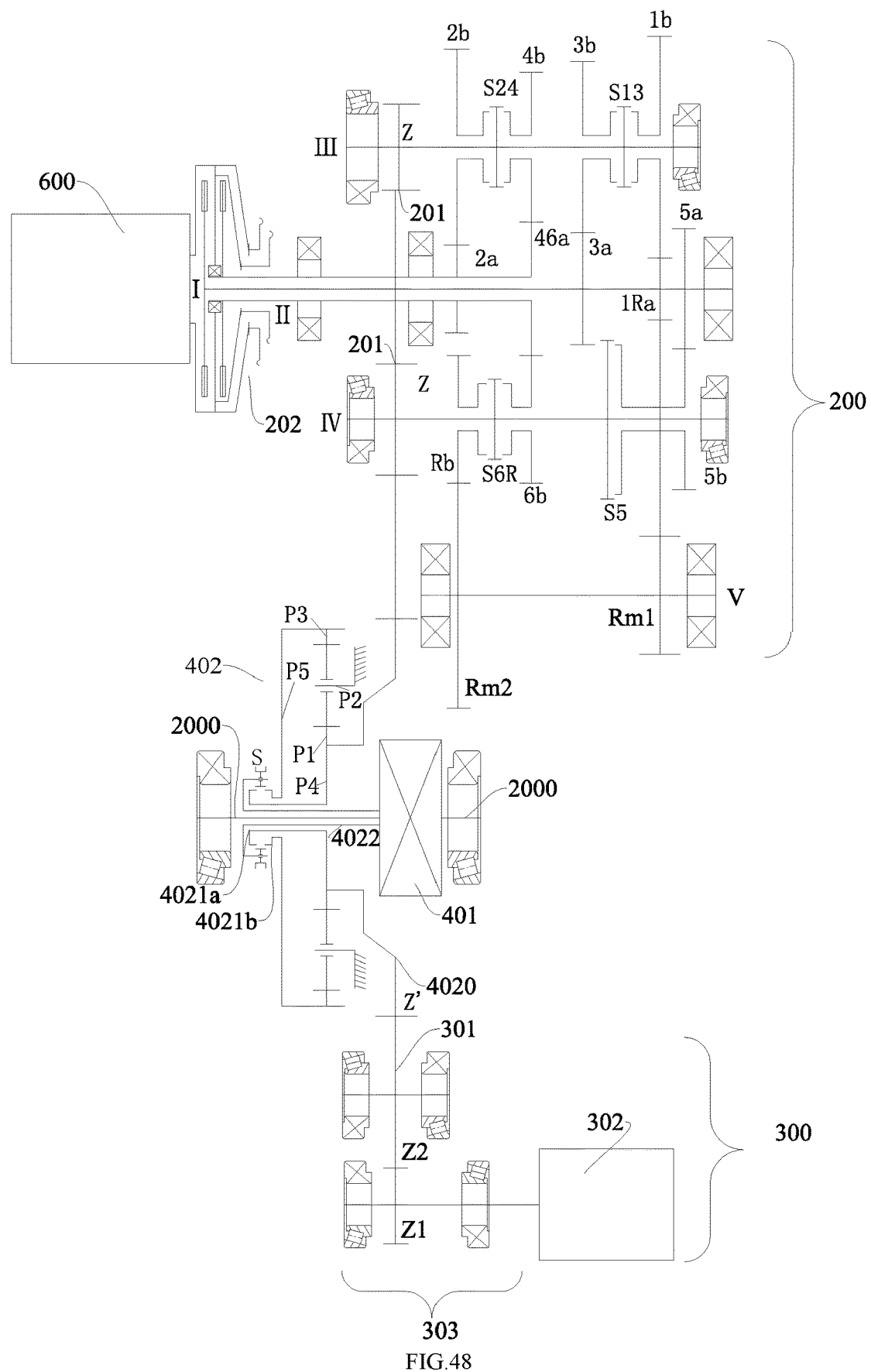
Figure 49:
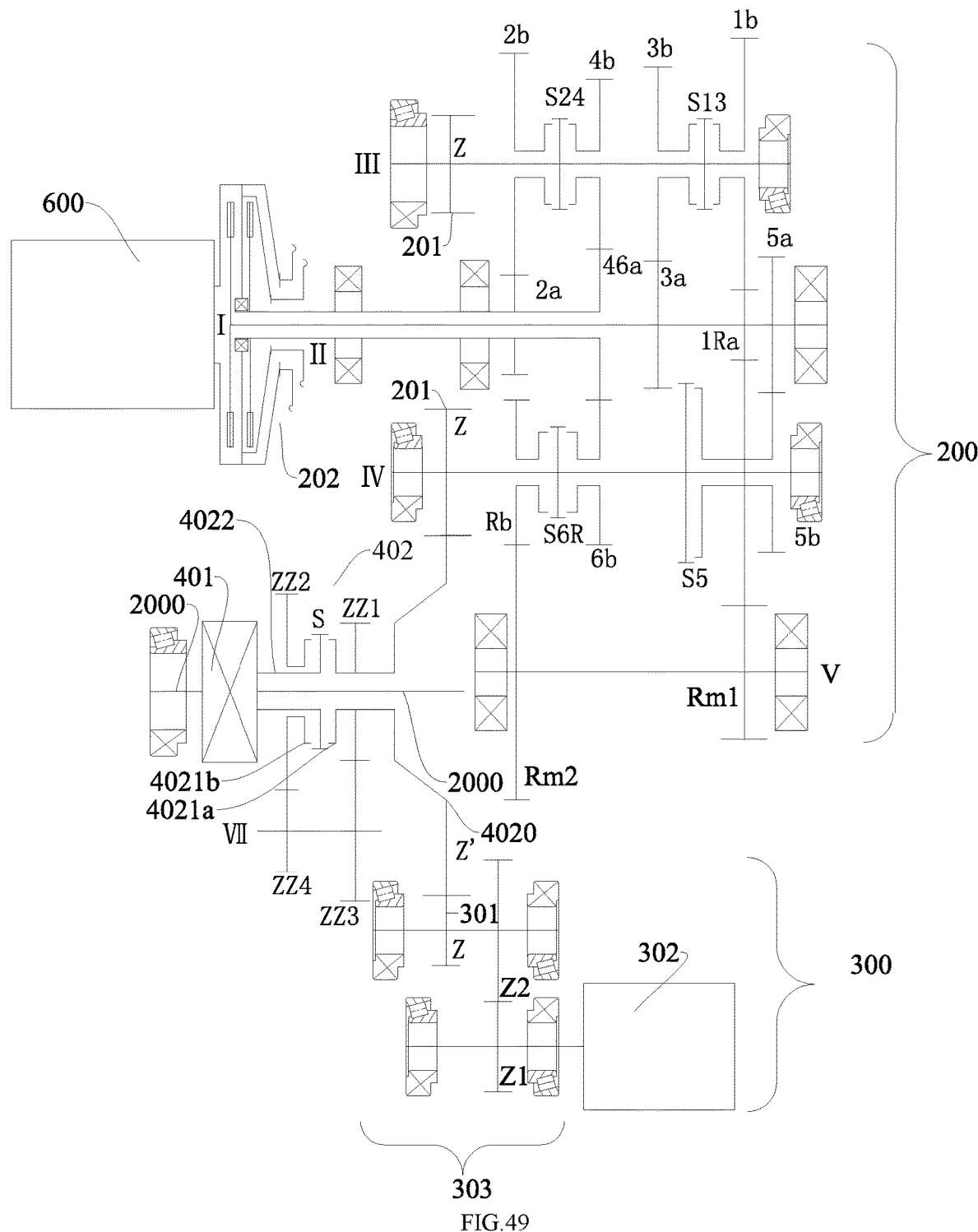
Figure 50:
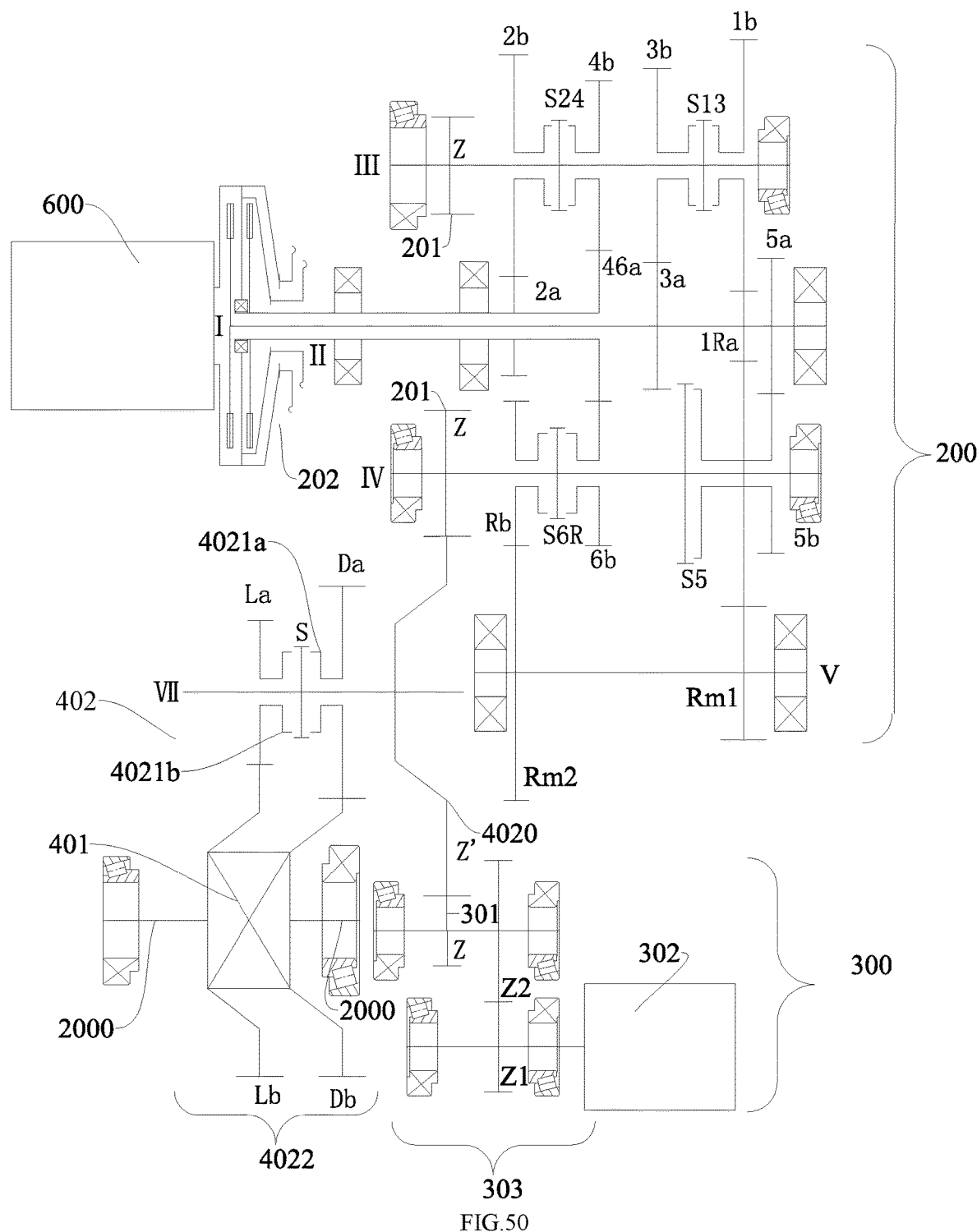

Certainly, the first motor generator unit 300 may alternatively be not provided with the speed reduction chain 303. As shown in FIG. 36, the first motor generator 302 is meshed with the main reducer driven gear Z' directly through the first motor generator unit coupling portion 301.

When the conversion device input portion 4020 is power-coupled to the conversion device output portion 4022, the rotational speed of the conversion device input portion 4020 is greater than or equal to the rotational speed of the conversion device output portion 4022. To be specific, when power transmission is performed between the conversion device input portion 4020 and the conversion device output portion 4022, there are two transmission modes. One transmission mode is a direct transfer mode, that is, the rotational speed of the conversion device input portion 4020 is equal to the rotational speed of the conversion device output portion 4022. The other transmission mode is a deceleration transfer mode, that is, the rotational speed of the conversion device input portion 4020 is greater than the rotational speed of the conversion device output portion 4022. In this way, the mode conversion device 402 increases a quantity of gears of the entire vehicle, the maximum output torque of the entire vehicle may be amplified by N times, and the power performance and the passing-through capability (for example, the maximum gradeability or the de-trapping capability) are improved. Particularly, for a conventional hybrid power vehicle model, because a battery pack, a motor, and an electric control system are added, the mass of the entire vehicle is large. Only power output of an engine may be relied on after feeding. In this case, the passing-through capability and the power performance deteriorate greatly. However, a hybrid power vehicle model for which the mode conversion device 402 in the present invention is used may effectively improve the power performance and the passing-through capability. Moreover, the two transmission modes may obviously enrich driving modes of the vehicle, so that the vehicle adapts to more different working conditions.

The foregoing N is equal to a speed ratio of an L gear to a D gear. When the vehicle is in the L gear, power transmission is performed between the conversion device input portion 4020 and the conversion device output portion 4022 in the direct transfer mode, and the rotational speed of the conversion device input portion 4020 is greater than the rotational speed of the conversion device output portion 4022. When the vehicle is in the D gear, power transmission is performed between the conversion device input portion 4020 and the conversion device output portion 4022 in the deceleration transfer mode, and the rotational speed of the conversion device input portion 4020 is equal to the rotational speed of the conversion device output portion 4022.

The mode conversion device 402 may facilitate intervention of the first motor generator unit 300 when the power source 100 is working, and the power source 100 and the first motor generator unit 300 connected in parallel may make, through direct torque coupling, advantages of strong power performance of the parallel-connected structure, a simple structure and easy space arrangement of the entire vehicle more outstanding.

Under a pure electric working condition, the first motor generator unit 300 has quite high transmission efficiency, and the mode conversion device 402 is disposed to separate the speed change unit 200, wheels, and the first motor generator 302, so that any two of the three parties may bypass a third party to work. For example, the speed change unit 200 transfers power to the wheels through the mode conversion device 402, and in this case, the vehicle is under a pure fuel working condition. For another example, the speed change unit 200 transfers power to the first motor generator 302 through the mode conversion device 402, and in this case, the vehicle is under a stationary power generation working condition. For still another example, the first motor generator 302 transfers power to the wheels through the mode conversion device 402, and in this case, the vehicle is under a pure electric working condition. Additionally, such a way may further avoid a problem that a pure electric working condition needs to be implemented through a complex gear change during a speed change and a transmission chain in a usually hybrid power transmission system, and is particularly applicable to a plug-in hybrid power vehicle. Certainly, the three parties may alternatively work at the same time.

Moreover, the mode conversion device 402 can further implement ultra-low speed gear output of the power transmission system 1000. That is, in an embodiment in which there is the speed change unit 200, the power from the power source 100 is first decelerated through the speed change unit 200, and then decelerated through the L gear, and ultra-low speed gear output of the power transmission system 1000 may be implemented. Therefore, torque output of the engine may be amplified to a great extent.

On control logic, the power transmission system 1000 provided in the present invention does not change the basic architecture and the gear change logic of the double clutch speed change, and intervention of the first motor generator unit 300 is only represented in torque superposition at the output end. Therefore, the control logic of the power source 100 and the speed change unit 200 is independent of the control logic of the first motor generator unit 300, the power output of the engine and the power output of the first motor generator 302 are relatively independent, and each output control logic of the power source is simple and easy to implement. Moreover, such a way facilitates saving of development time and costs of a manufacturer, and avoidance of a relatively high fault rate of the system. Even if the engine and the speed change unit 200 have a system fault, the power output of the first motor generator unit 300 under the pure electric working condition is not affected.

Moreover, when the conversion device input portion 4020 is disconnected from the conversion device output portion 4022, the power output by the power source 100 is suitable for driving the first motor generator unit 300 sequentially through the speed change unit 200 and the conversion device input portion 4020 to perform power generation. To be specific, when the vehicle is under the parking working condition, the power of the power source 100 may be transferred to the first motor generator unit 300 for the first motor generator unit 300 to perform power generation, thereby implementing stationary power generation. Such stationary power generation does not need to add an additional power transmission chain, and switching between stationary power generation modes may be implemented through only the mode conversion device 402, so that switching control is simple, and transmission efficiency is high. The first motor generator 302 is set to directly connect to the mode conversion device 402, power output of the first motor generator 302 is direct and efficient, and braking energy feedback efficiency is high.

Further, the speed change unit 200 only needs to implement a speed change and a torque change in the power of the engine. In this way, the speed change unit 200 does not need an additional design change, so as to facilitate miniaturization of the speed change unit 200, thereby reducing the development costs of the entire vehicle and shortening the development period.

Finally, the foregoing these advantages are all implemented through the mode conversion device 402, and therefore the power transmission system 1000 has a quite high integration level.

There is a plurality of arrangement forms of the mode conversion device 402, and the following contents are described in detail one by one.

As shown in FIG. 21 to FIG. 26, the system power output portion 401 may be a differential, the differential may include two half-shaft gears, and the two half-shaft gears and two half shafts 2000 of the vehicle are in a one-to-one correspondence. The power transmission system 1000 for the vehicle further includes: a power switching on/off device 500, and the power switching on/off device 500 is suitable for selectively connect at least one of the two half-shaft gears and a corresponding half shaft 2000 of the vehicle. It may be understood that, if a power switching on/off device 500 is disposed between a half shaft 2000 on one side and a corresponding half-shaft gear, the power switching on/off device 500 may control a state of connection or disconnection between the half shaft 2000 on the side and the half-shaft gear; or if a power switching on/off device 500 is disposed between each of half shafts 2000 on two sides and a corresponding half-shaft gear, each power switching on/off device 500 may control a state of connection or disconnection on a corresponding side. The power switching on/off device 500 may facilitate stationary power generation when the vehicle is under the parking working condition. In this way, when the vehicle is under the parking working condition, the first motor generator 302 is directly connected to the mode conversion device 402, power output of the first motor generator 302 is direct and efficient, and braking energy feedback efficiency is high.

Figure 21:
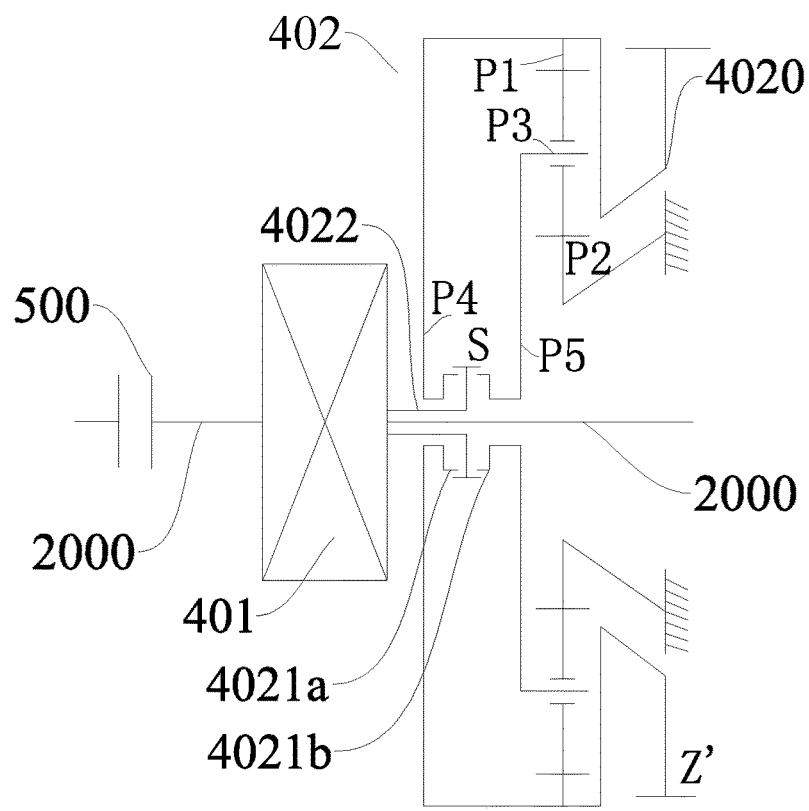
FIG. 21 to FIG. 26 are schematic diagrams of a mode conversion device, a system power output portion and a power switching on/off device.
Figure 22:
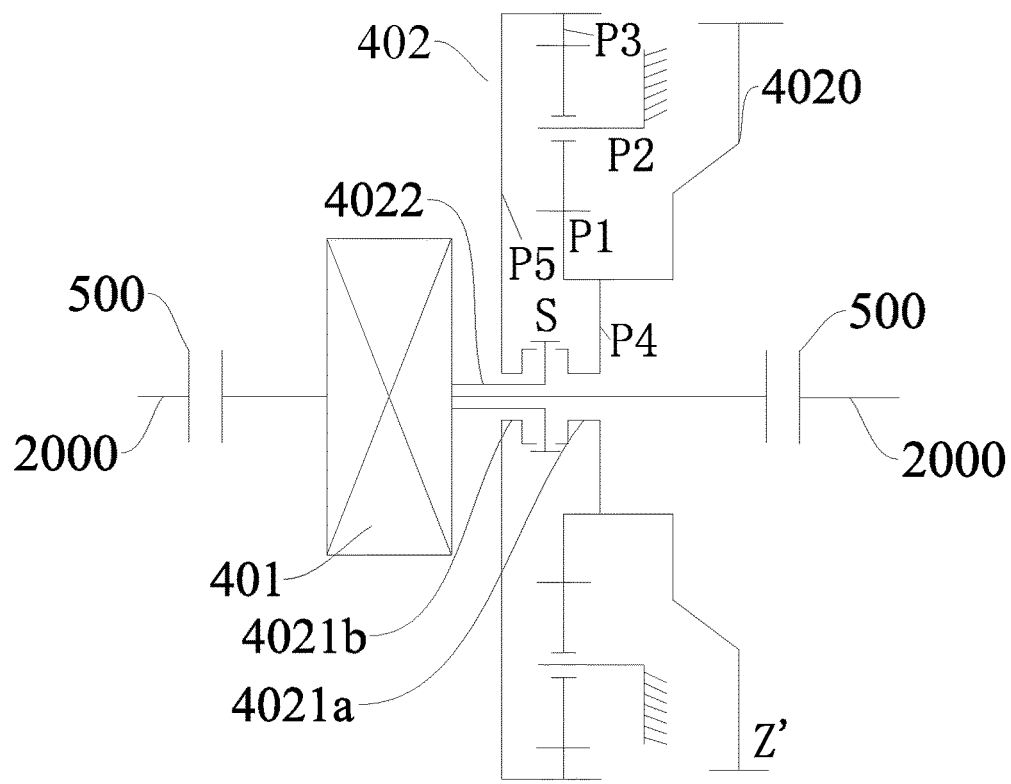

As shown in FIG. 21, a power switching on/off device 500 is disposed between a half shaft 2000 on a left side and a corresponding half-shaft gear. As shown in FIG. 22, there may be two power switching on/off devices 500, one power switching on/off device 500 may be disposed between a half shaft 2000 on a left side and a corresponding half-shaft gear, and the other power switching on/off device 500 may be disposed between a half shaft 2000 on a right side and a corresponding half-shaft gear.

Figure 23:
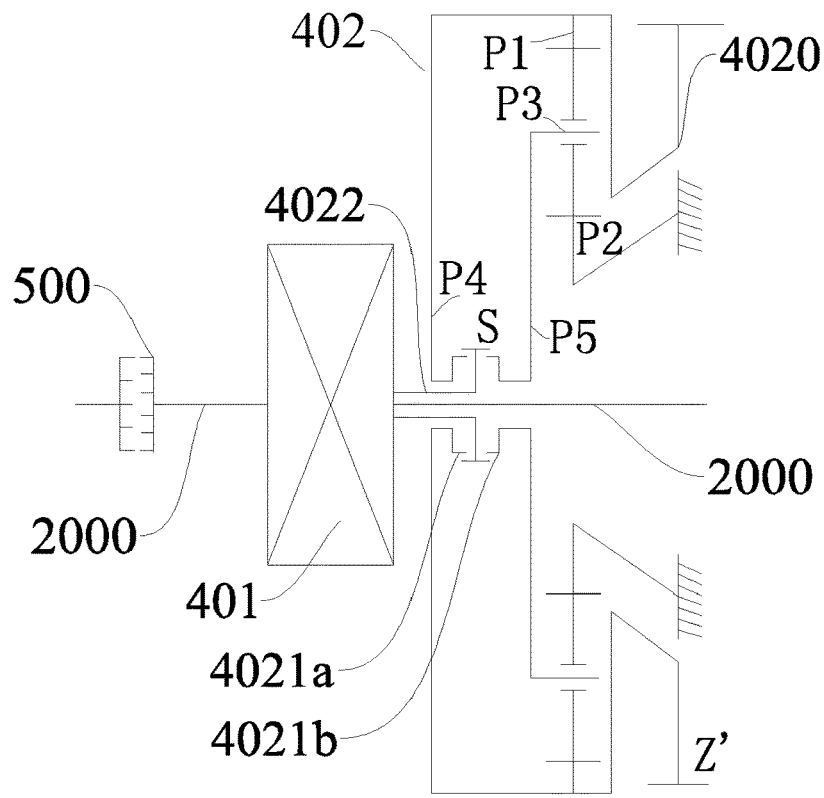
Figure 24:
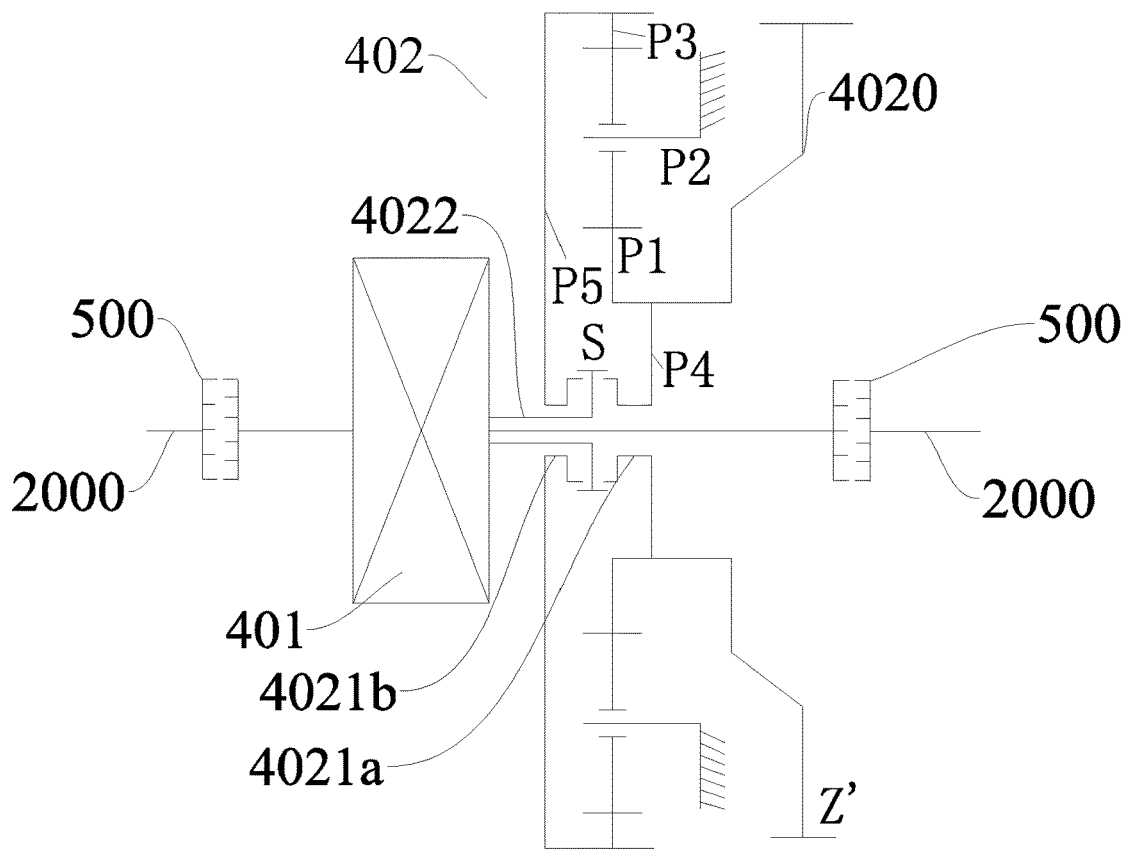

There is a plurality of types of power switching on/off devices 500. For example, as shown in FIG. 21 and FIG. 22, the power switching on/off device 500 may be a clutch. Preferably, as shown in FIG. 23 and FIG. 24, the clutch may be a jaw clutch.

Figure 25:
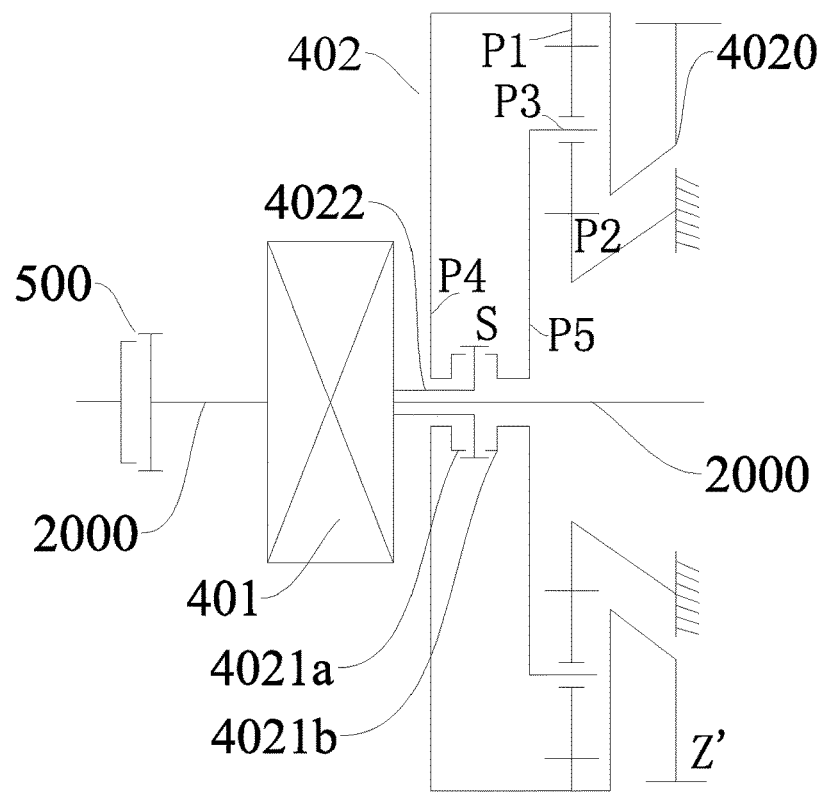
Figure 26:
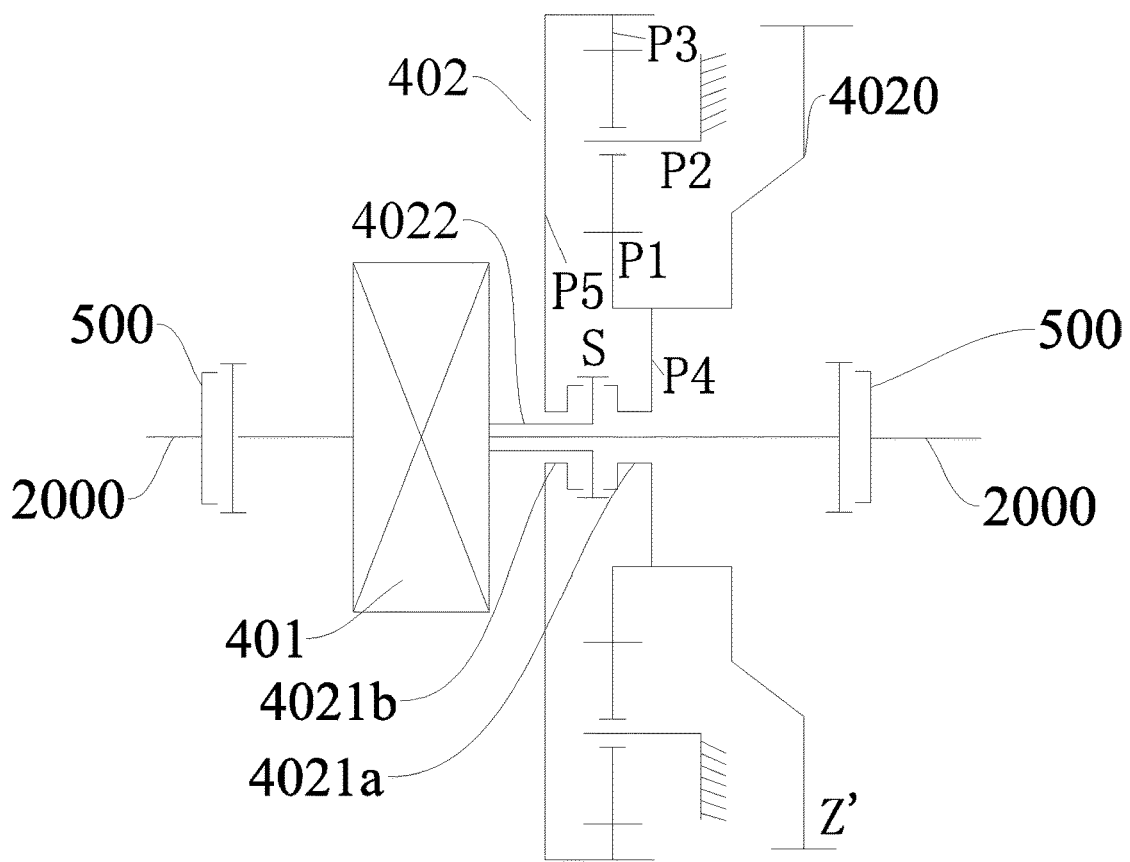

Certainly, the power switching on/off device 500 may be further of another type. For example, as shown in FIG. 25 and FIG. 26, the power switching on/off device 500 may be a synchronizer.

Figure 2:
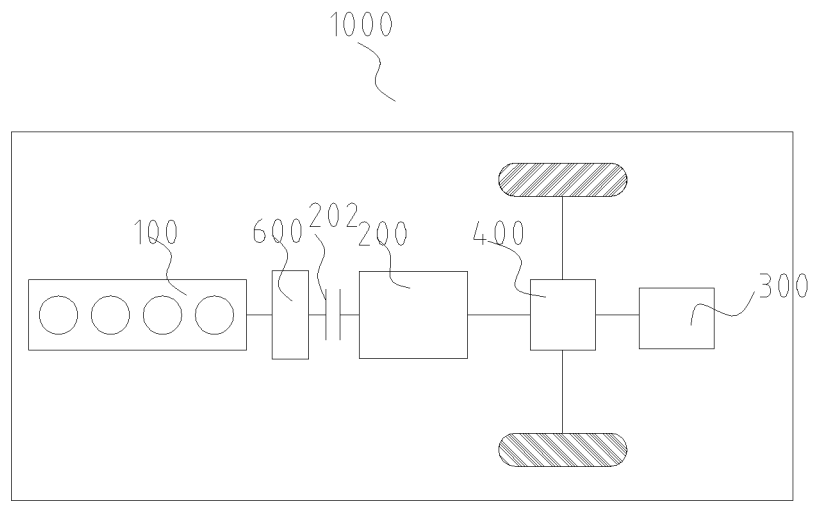
Figure 3:
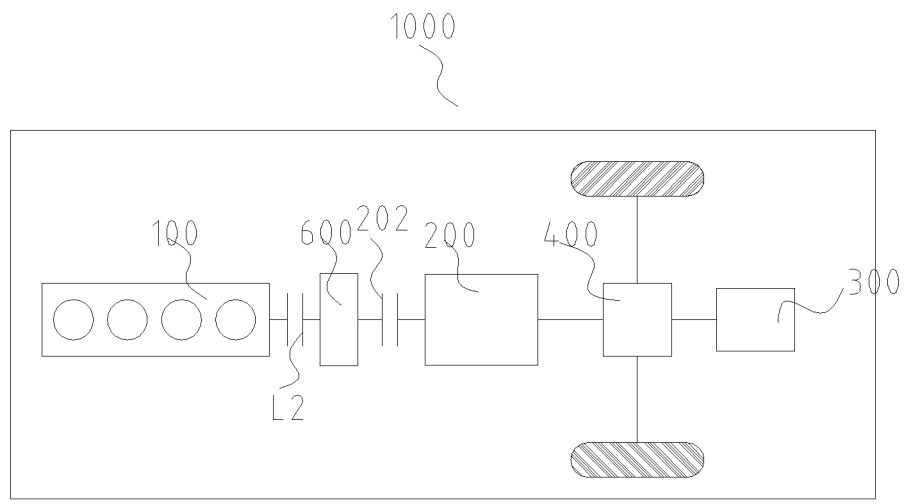
Figure 4:
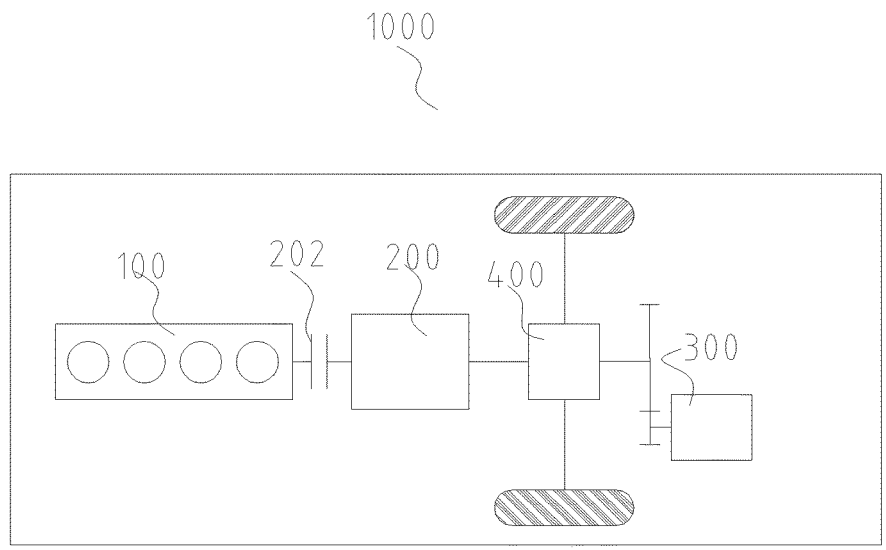
Figure 5:
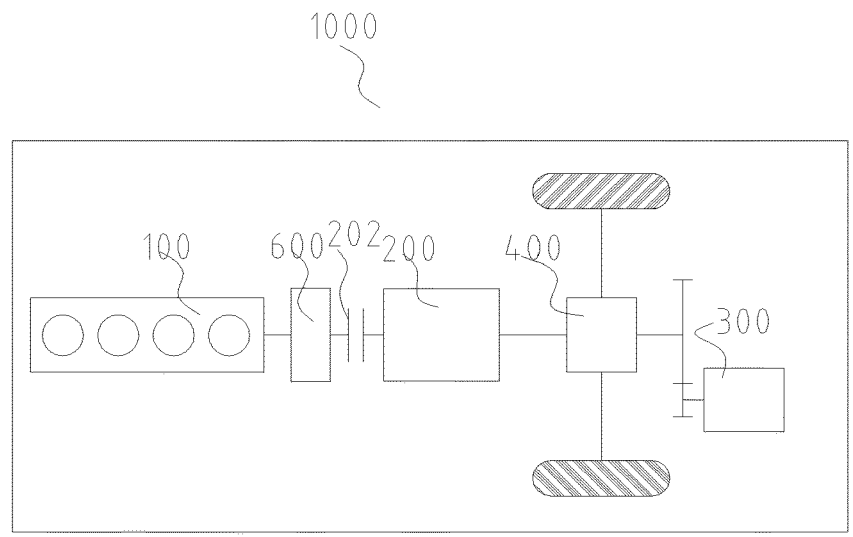
Figure 6:
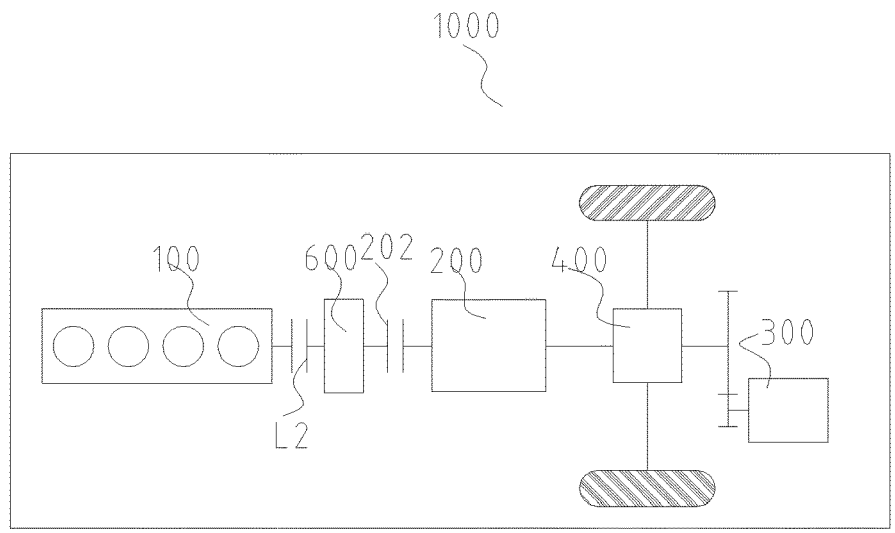

According to a preferred embodiment of the present invention, as shown in FIG. 2 and FIG. 5, the power transmission system 1000 may further include a second motor generator 600, the second motor generator 600 is located between the power source 100 and the speed change unit 200, one end of the second motor generator 600 is directly power-coupled to the power source 100, and another end of the second motor generator 600 is selectively power-coupled to the speed change unit 200.

As shown in FIG. 34, the second motor generator 600 may be coaxially connected to the input end of the first clutch device 202. The second motor generator 600 may be disposed between the input end of the first clutch device 202 and the engine. In this way, when being transferred to the input end, the power of the engine inevitably passes through the second motor generator 600. In this case, the second motor generator 600 may be used as a generator to perform stationary power generation.

As shown in FIG. 52 to FIG. 64, an input end outer tooth Z602 may be disposed on the input end of the first clutch device 202, and the second motor generator 600 is linked to the input end outer tooth Z602. A gear Z601 is disposed on a motor shaft of the second motor generator 600, and the gear Z601 is meshed with the input end outer tooth Z602. In this way, the power of the engine may be transferred to the second motor generator 600 through the input end and the input end outer tooth Z602. In this way, the second motor generator 600 may be used as a generator to perform stationary power generation.

According to another preferred embodiment of the present invention, as shown in FIG. 34 to FIG. 64, the power transmission system 1000 may further include a second motor generator 600, the second motor generator 600 is located between the power source 100 and the speed change unit 200, one end of the second motor generator 600 is power-coupled to the power source 100. For example, one end of the second motor generator 600 is selectively power-coupled to the power source 100, and another end of the second motor generator 600 is selectively power-coupled to the speed change unit 200.

As shown in FIG. 35, the second clutch device L2 may be disposed between the second motor generator 600 and the engine. The second clutch device L2 may be a single clutch, and the single clutch may control connection or disconnection between the engine and the second motor generator 600, and may control connection or disconnection between the engine and the input end of the first clutch device 202. By disposing the second clutch device L2, a stationary power generation state of the second motor generator 600 may be properly controlled, so that the power transmission system 1000 is simple in structure and reliable in driving mode conversion.

Preferably, the second clutch device L2 is disposed in a rotor of the second motor generator 600. In this way, the axial length of the power transmission system 1000 may be better shortened, thereby reducing the volume of the power transmission system 1000, and improving arrangement flexibility of the power transmission system 1000 in the vehicle. Additionally, the second motor generator 600 may be further used as a starter.

Preferably, the power source 100, the second clutch device L2 and the input end of the double clutch are coaxially arranged. In this way, the power transmission system 1000 is compact in structure and small in volume.

It should be noted that, for the power transmission systems 1000 in the foregoing three embodiments, in the axial direction, each second motor generator 600 may be located between the power source 100 and the first clutch device 202. Such a way may effectively reduce the axial length of the power transmission system 1000, may make location arrangement of the second motor generator 600 proper, and may improve structure compactness of the power transmission system 1000.

The first motor generator 302 is a main driving motor of the power transmission system 1000. Therefore, the capacity and the volume of the first motor generator 302 are relatively large. For the first motor generator 302 and the second motor generator 600, the rated power of the first motor generator 302 is greater than the rated power of the second motor generator 600. In this way, a motor generator having small volume and small rated power may be selected as the second motor generator 600, so that the power transmission system 1000 is simple in structure and small in volume. Moreover, during stationary power generation, the transmission path between the second motor generator 600 and the power source 100 is short, and power generation efficiency is high, so that a part of the power of the power source 100 may be effectively converted into electric energy. The peak power of the first motor generator 302 is similarly greater than the peak power of the second motor generator 600.

Preferably, the rated power of the first motor generator 302 is two or more times the rated power of the second motor generator 600. The peak power of the first motor generator 302 is two or more times the peak power of the second motor generator 600. For example, the rated power of the first motor generator 302 may be 60 kw, the rated power of the second motor generator 600 may be 24 kw, the peak power of the first motor generator 302 may be 120 kw, and the peak power of the second motor generator 600 may be 44 kw.

It should be noted that, the differential may be a regular open differential, for example, a bevel gear differential or a cylindrical gear differential, but is not limited thereto. Certainly, the differential may alternatively be a locking differential, for example, a mechanical locking differential or an electronic locking differential. Different differential types are selected for the power transmission system 1000 according to different vehicle models. In this way, main selection bases include vehicle costs, vehicle lightweight, vehicle cross-country performance and the like. The differential includes a shell 4011, and the shell 4011 may be the input end of the differential.

There is a plurality of driving modes of the power transmission system 1000 for the vehicle. Detailed description is made below through the power transmission system 1000 shown in FIG. 1 as an example.

The power transmission system 1000 for the vehicle has a first power source driving mode. When the power transmission system 1000 for the vehicle is in the first power source driving mode, the first motor generator unit 300 does not work, the speed change unit 200 is power-coupled to the power source 100, the conversion device input portion 4020 is power-coupled to the conversion device output portion 4022, the power output by the power source 100 is output to the system power output portion 401 sequentially through the speed change unit 200, the conversion device input portion 4020 and the conversion device output portion 4022, and the rotational speed of the conversion device input portion 4020 is the same as the rotational speed of the input end of the system power output portion 401. This is normal driving of the vehicle.

The power transmission system 1000 for the vehicle has a second power source driving mode. When the power transmission system 1000 for the vehicle is in the second power source driving mode, the first motor generator unit 300 does not work, the speed change unit 200 is power-coupled to the power source 100, the conversion device input portion 4020 is power-coupled to the conversion device output portion 4022, the power output by the power source 100 is output to the input end of the system power output portion 401 sequentially through the speed change unit 200, the conversion device input portion 4020 and the conversion device output portion 4022, and the rotational speed of the conversion device input portion 4020 is greater than the rotational speed of the input end of the system power output portion 401. In this way, the power output by the power source 100 may be decelerated once through the speed change unit 200 and then decelerated again through the mode conversion device 402, thereby better playing a role of speed reduction and torque increase, and further improving the passing-through capability of the vehicle.

The power transmission system 1000 for the vehicle has a first pure electric driving mode. When the power transmission system 1000 for the vehicle is in the first pure electric driving mode, the power source 100 does not work, the conversion device input portion 4020 is power-coupled to the conversion device output portion 4022, the power output by the first motor generator unit 300 is output to the system power output portion 401 sequentially through the conversion device input portion 4020 and the conversion device output portion 4022, and the rotational speed of the conversion device input portion 4020 is the same as the rotational speed of the input end of the system power output portion 401. In this way, the power output path of the first motor generator 302 is short, and the transmission efficiency is high, thereby improving the driving efficiency of the first motor generator 302, and improving the power performance of the vehicle.

The power transmission system 1000 for the vehicle has a second pure electric driving mode. When the power transmission system 1000 for the vehicle is in the second pure electric driving mode, the power source 100 does not work, the conversion device input portion 4020 is power-coupled to the conversion device output portion 4022, the power output by the first motor generator unit 300 is output to the input end of the system power output portion 401 sequentially through the conversion device input portion 4020 and the conversion device output portion 4022, and the rotational speed of the conversion device input portion 4020 is greater than the rotational speed of the input end of the system power output portion 401. In this way, the power output path of the first motor generator 302 is short, and the transmission efficiency is high. Moreover, through deceleration of the mode conversion device 402, driving modes of the power transmission system 1000 may be enriched, so that rotational speeds of wheels are suitable, and the passing-through capability of the vehicle may be improved.

The power transmission system 1000 for the vehicle has a reverse-drive starting mode, and when the power transmission system 1000 for the vehicle is in the reverse-drive starting mode, the power output by the first motor generator 302 is output to the power source 100 sequentially through the conversion device input portion 4020, to drive the power source 100 to start. In this case, the first motor generator 302 is used as a starter. In this way, the first motor generator 302 may rapidly start the engine, so that starting efficiency of the engine is high, and the energy loss of the first motor generator 302 may be reduced.

The power transmission system 1000 for the vehicle has a first hybrid driving mode. When the power transmission system 1000 for the vehicle is in the first hybrid driving mode, both the power source 100 and the first motor generator unit 300 work, the speed change unit 200 is power-coupled to the power source 100, the conversion device input portion 4020 is power-coupled to the conversion device output portion 4022, the power output by the power source 100 is output to the system power output portion 401 sequentially through the speed change unit 200, the conversion device input portion 4020 and the conversion device output portion 4022, the power output by the first motor generator unit 300 is output to the system power output portion 401 sequentially through the conversion device input portion 4020 and the conversion device output portion 4022, the power output by the power source 100 and the power output by the first motor generator unit 300 are coupled and then output to the conversion device input portion 4020, and the rotational speed of the conversion device input portion 4020 is the same as the rotational speed of the input end of the system power output portion 401. In this way, the power transmission efficiency of the power source 100 is high, the control policy is simple, the output path of the first motor generator 302 is short, and the transmission efficiency is high, thereby improving driving efficiency of the first motor generator 302, and improving power performance of the vehicle.

The power transmission system 1000 for the vehicle has a second hybrid driving mode. When the power transmission system 1000 for the vehicle is in the second hybrid driving mode, both the power source 100 and the first motor generator unit 300 work, the speed change unit 200 is power-coupled to the power source 100, the conversion device input portion 4020 is power-coupled to the conversion device output portion 4022, the power output by the power source 100 is output to the system power output portion 401 sequentially through the speed change unit 200, the conversion device input portion 4020 and the conversion device output portion 4022, the power output by the first motor generator unit 300 is output to the system power output portion 401 sequentially through the conversion device input portion 4020 and the conversion device output portion 4022, the power output by the power source 100 and the power output by the first motor generator unit 300 are coupled and then output to the conversion device input portion 4020, and the rotational speed of the conversion device input portion 4020 is greater than the rotational speed of the input end of the system power output portion 401. In this way, the power output by the power source 100 may be decelerated once through the speed change unit 200 and then decelerated again through the mode conversion device 402, thereby better playing a role of speed reduction and torque increase, and further improving the passing-through capability of the vehicle. Moreover, the power output path of the first motor generator 302 is short, and the transmission efficiency is suitable, thereby improving the driving efficiency of the first motor generator 302, and improving the passing-through capability of the vehicle.

The power transmission system 1000 for the vehicle has a first driving power generation mode. When the power transmission system 1000 for the vehicle is in the first driving power generation mode, the power source 100 works, the speed change unit 200 is power-coupled to the power source 100, the conversion device input portion 4020 is power-coupled to the conversion device output portion 4022, a part of the power output by the power source 100 is output to the system power output portion 401 sequentially through the speed change unit 200, the conversion device input portion 4020 and the conversion device output portion 4022, the rotational speed of the conversion device input portion 4020 is the same as the rotational speed of the input end of the system power output portion 401, and another part of the power output by the power source 100 is output to the first motor generator unit 300 sequentially through the speed change unit 200 and the conversion device input portion 4020, to drive the first motor generator unit 300 to perform power generation. In this way, a form of performing power generation while driving the vehicle by the power source 100 may be formed, the power output efficiency of the power source 100 is high, and the control policy is simple.

The power transmission system 1000 for the vehicle has a second driving power generation mode. When the power transmission system 1000 for the vehicle is in the second driving power generation mode, the power source 100 works, the speed change unit 200 is power-coupled to the power source 100, the conversion device input portion 4020 is power-coupled to the conversion device output portion 4022, a part of the power output by the power source 100 is output to the system power output portion 401 sequentially through the speed change unit 200, the conversion device input portion 4020 and the conversion device output portion 4022, the rotational speed of the conversion device input portion 4020 is greater than the rotational speed of the input end of the system power output portion 401, and another part of the power output by the power source 100 is output to the first motor generator unit 300 sequentially through the speed change unit 200 and the conversion device input portion 4020, to drive the first motor generator unit 300 to perform power generation. In this way, a form of performing power generation while driving the vehicle by the power source 100 may be formed, the power of the power source 100 is decelerated twice, thereby improving the passing-through capability of the vehicle, and the first motor generator 302 performs power generation.

The power transmission system 1000 for the vehicle has a first braking energy recycling mode. When the power transmission system 1000 for the vehicle is in the first braking energy recycling mode, the conversion device input portion 4020 is power-coupled to the conversion device output portion 4022, power from wheels of the vehicle drives the first motor generator unit 300 sequentially through the system power output portion 401, the conversion device output portion 4022, and the conversion device input portion 4020 to perform power generation, and the rotational speed of the conversion device input portion 4020 is the same as the rotational speed of the input end of the system power output portion 401. In this case, the first motor generator 302 may recycle energy from the wheels, energy waste may be reduced, and the travelling mileage of the vehicle may be improved.

The power transmission system 1000 for the vehicle has a second braking energy recycling mode. When the power transmission system 1000 for the vehicle is in the second braking energy recycling mode, the conversion device input portion 4020 is power-coupled to the conversion device output portion 4022, power from wheels of the vehicle drives the first motor generator unit 300 sequentially through the system power output portion 401, the conversion device output portion 4022, and the conversion device input portion 4020 to perform power generation, and the rotational speed of the conversion device input portion 4020 is greater than the rotational speed of the input end of the system power output portion 401. In this case, the first motor generator 302 may recycle energy from the wheels, the power generation efficiency is high, energy waste may be reduced, and the travelling mileage of the vehicle may be improved.

The power transmission system 1000 for the vehicle has a first stationary power generation mode. When the power transmission system 1000 for the vehicle is in the first stationary power generation mode, the second motor generator 600 is power-coupled to the power source 100, the conversion device input portion 4020 is disconnected from the conversion device output portion 4022, and the power output by the power source 100 directly drives the second motor generator 600 to perform power generation. The transmission path between the second motor generator unit 600 and the power source 100 is short, the power generation efficiency is high, and energy waste may be reduced.

The power transmission system 1000 for the vehicle has a second stationary power generation mode. When the power transmission system 1000 for the vehicle is in the second stationary power generation mode, the second motor generator 600 is power-coupled to the power source 100, the power source 100 is power-coupled to the speed change unit 200, the conversion device input portion 4020 is disconnected from the conversion device output portion 4022, a part of the power output by the power source 100 directly drives the second motor generator 600 to perform power generation, and another part of the power output by the power source 100 is output to the first motor generator unit 300 sequentially through the speed change unit 200 and the conversion device input portion 4020 and drives the first motor generator unit 300 to perform power generation. In this case, the first motor generator unit 300 and the second motor generator unit 600 may perform power generation at the same time, so that the power generation efficiency is high.

The power transmission system 1000 for the vehicle has a third driving power generation mode. When the power transmission system 1000 for the vehicle is in the third driving power generation mode, the power source 100 works, the second motor generator 600 is power-coupled to the power source 100, the power source 100 is power-coupled to the speed change unit 200, the conversion device input portion 4020 is power-coupled to the conversion device output portion 4022, a part of the power output by the power source 100 is output to the system power output portion 401 sequentially through the speed change unit 200, the conversion device input portion 4020 and the conversion device output portion 4022, the rotational speed of the conversion device input portion 4020 is greater than or equal to the rotational speed of the input end of the system power output portion 401, and another part of the power output by the power source 100 directly drives the second motor generator 600 to perform power generation. In this way, a form of performing power generation while driving the vehicle by the power source 100 may be formed, the power output efficiency of the power source 100 is high, and the power generation efficiency of the second motor generator 600 is high. Additionally, the control policy of the power transmission system 1000 is simple.

The power transmission system 1000 for the vehicle has a fourth driving power generation mode. When the power transmission system 1000 for the vehicle is in the fourth driving power generation mode, the power source 100 works, the second motor generator 600 is power-coupled to the power source 100, the power source 100 is power-coupled to the speed change unit, the conversion device input portion 4020 is power-coupled to the conversion device output portion 4022, a first part of the power output by the power source 100 is output to the system power output portion 401 sequentially through the speed change unit 200, the conversion device input portion 4020 and the conversion device output portion 4022, the rotational speed of the conversion device input portion 4020 is greater than or equal to the rotational speed of the input end of the system power output portion 401, a second part of the power output by the power source 100 is output to the first motor generator unit 300 sequentially through the conversion device input portion 4020, to drive the first motor generator unit 300 to perform power generation, and a third part of the power output by the power source 100 directly drives the second motor generator 600 to perform power generation. In this way, a form of performing power generation while driving the vehicle by the power source 100 may be formed, and the power generation efficiency of the first motor generator 302 and the second motor generator 600 is high.

The power transmission system 1000 for the vehicle has a rapid starting mode. When the power transmission system 1000 for the vehicle is in the rapid starting mode, the second motor generator 600 is power-coupled to the power source 100, and the power output by the second motor generator 600 directly drives the power source 100 to start. The second motor generator 600 may be used as a starter, and the starting efficiency is high.

All of the power transmitted by the foregoing power transmission system 1000 is output to two wheels of the vehicle through the system power output portion 401, but the power transmission system 1000 is not limited thereto. The power transmission system 1000 may further include an electric driving system 700, and the electric driving system 700 may be configured to drive two other wheels of the vehicle, thereby implementing four-wheel drive of the vehicle.

A plurality of arrangement forms of the electric driving system 700 is described below in detail.

Figure 27:
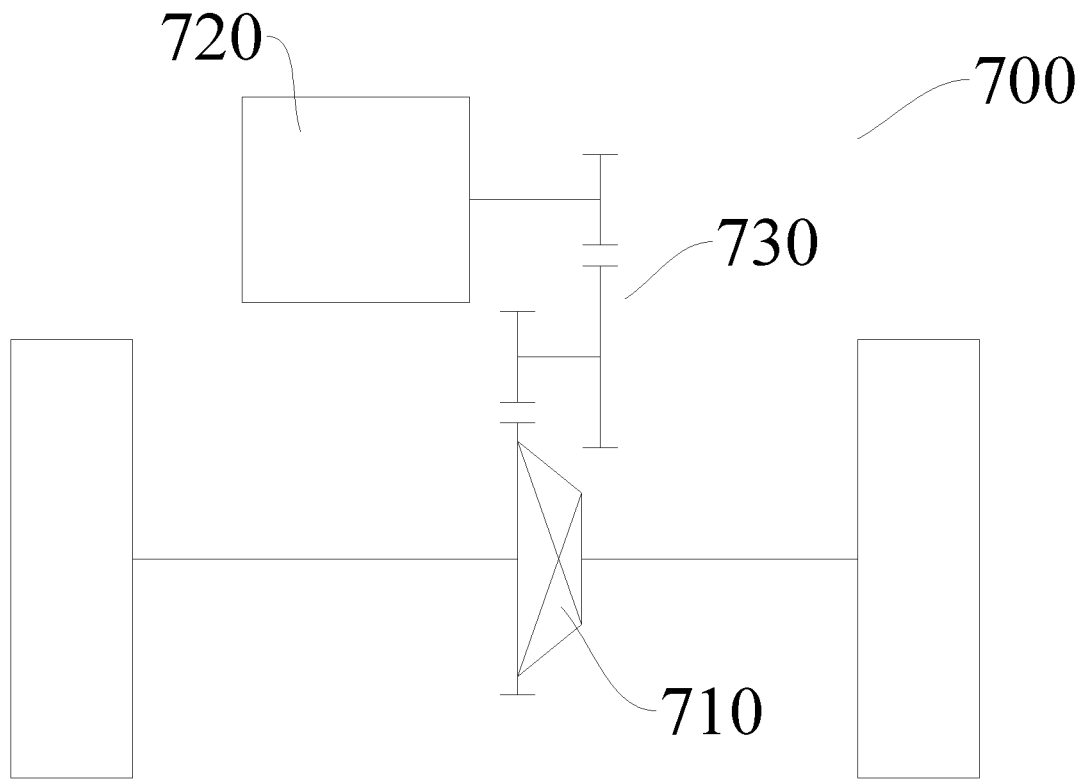
FIG. 27 to FIG. 32 are schematic diagrams of an electric driving system.

As shown in FIG. 27, the electric driving system 700 may include a driving system input portion and a driving system output portion, and the driving system output portion is suitable for outputting power from the driving system input portion to two other wheels, for example, rear wheels. In this way, by adding the electric driving system 700, a quantity of driving modes of the vehicle may be increased. For example, the driving modes may be further divided into a front-wheel drive mode, a rear-wheel drive mode and a four-wheel drive mode, so that the vehicle is more applicable to different road conditions, and the power performance of the vehicle may be improved.

For example, as shown in FIG. 27, the electric driving system 700 further includes an electric driving system power output portion 710, and the driving system output portion is suitable for outputting power from the driving system input portion to two other wheels through the electric driving system power output portion 710. The electric driving system power output portion 710 may facilitate allocation of the power transferred from the driving system output portion to two wheels on two sides, thereby stably driving the vehicle.

Specifically, the driving system input portion may be a driving motor generator 720, the driving motor generator 720 may be a rear wheel motor generator, the rear wheel motor generator may drive two rear wheels through a speed reduction mechanism, and the driving system output portion may be a gear reducer 730 (that is, the speed reduction mechanism). Therefore, when the driving motor generator 720 works, power generated by the driving motor generator 720 may be transferred to the electric driving system power output portion 710 after speed reduction and torque increase of the gear reducer 730 are performed, and the electric driving system power output portion 710 may facilitate allocation of the power transferred from the driving system output portion to two wheels on two sides, thereby stably driving the vehicle.

Figure 28:
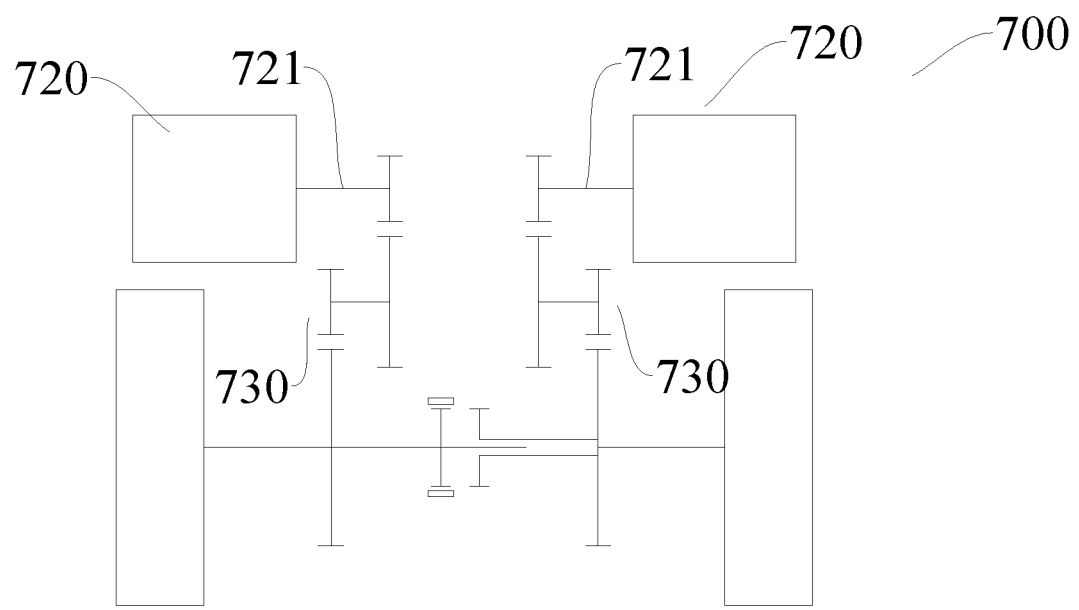

For another example, as shown in FIG. 28, the driving system input portion includes two driving motor generators 720, the driving system output portion includes two driving system output sub-portions, and each driving system output sub-portion is suitable for outputting power from a corresponding driving motor generator 720 to one corresponding wheel of two other wheels. To be specific, each wheel corresponds to one driving motor generator 720 and one driving system output sub-portion. In this way, the electric driving system power output portion 710 may be omitted, and the two driving motor generators 720 may adjust respective rotational speeds to implement a speed difference between two wheels, so that the power transmission system 1000 is simple and reliable in structure.

As shown in FIG. 28, the foregoing two other wheels are selectively synchronized. For example, a half shaft synchronizer may be disposed on one of half shafts 2000 to be suitable for being selectively connected to the other half shaft 2000. In this way, two wheels may rotate in a same direction at a same speed, or two wheels may move at different speeds, thereby ensuring travelling stability of the vehicle.

Figure 29:
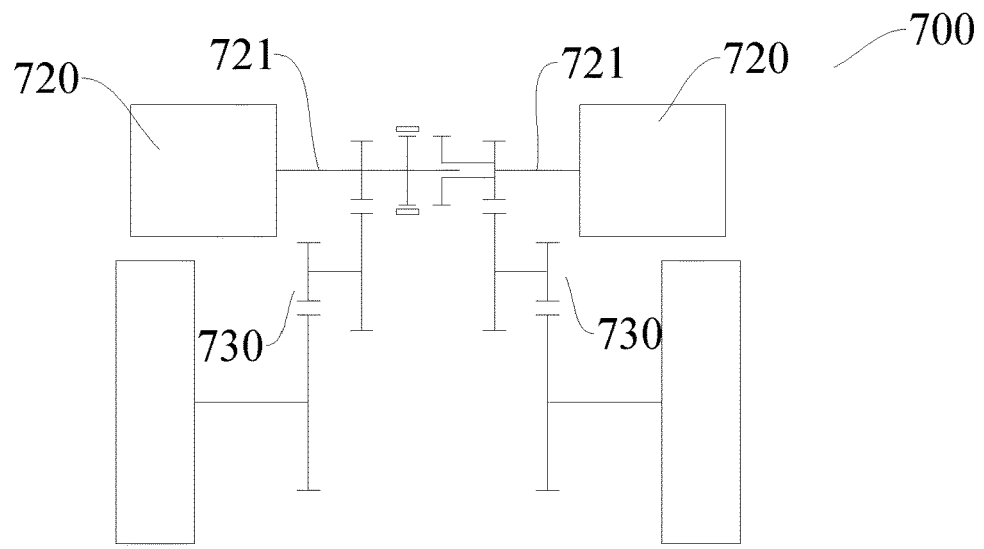

As shown in FIG. 29, the two driving motor generators 720 are selectively synchronized. For example, a synchronizer of motor output shafts 721 may be disposed on one motor output shaft 721 to be selectively connected to the other motor output shaft 721. In this way, two wheels may rotate in a same direction at a same speed, or two wheels may move at different speeds, thereby ensuring travelling stability of the vehicle.

Figure 30:
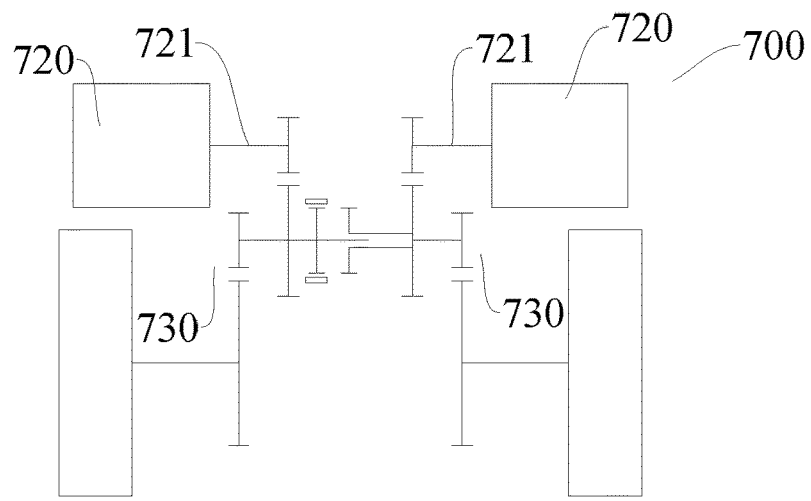
Figure 31:
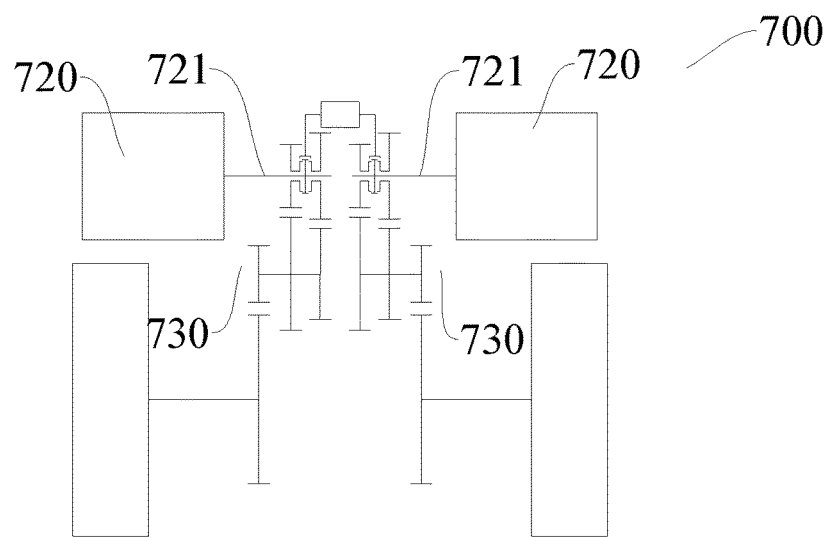

As shown in FIG. 30 and FIG. 31, the two driving system output sub-portions are selectively synchronized. To be specific, an output sub-portion synchronizer may be disposed on an output shaft of one of the two driving system output sub-portions and is configured to synchronize the one driving system output sub-portion with the other driving system output sub-portion. In this way, two wheels may rotate in a same direction at a same speed, or two wheels may move at different speeds, thereby ensuring travelling stability of the vehicle.

As shown in FIG. 27 to FIG. 30, the driving system output sub-portion may include a two-stage gear reducer, and power of the driving motor generator 720 subjected to two-stage speed reduction may be transferred to wheels to drive the wheels to rotate.

Alternatively, as shown in FIG. 31, the driving system output sub-portion may include a two-gear transmission. The driving motor generator 720 is selectively connected to one of gears. By disposing the two-gear transmission, a rotational speed of the driving motor generator 720 output to wheels may be changed, thereby enriching driving modes of the power transmission system 1000, and improving the economy and the power performance of the vehicle.

Specifically, the driving motor generator 720 may include a motor output shaft 721, and the two-stage gear reducer 730 or the two-gear transmission may include a driving system output sub-portion input shaft, and the driving system output sub-portion input shaft is fixedly and coaxially connected to the motor output shaft 721. In this way, the driving motor generator 720 may transfer power to the driving system output sub-portion input shaft through the motor output shaft 721, and then the power is transferred to wheels through the driving system output sub-portion to drive the vehicle to move.

Figure 32:
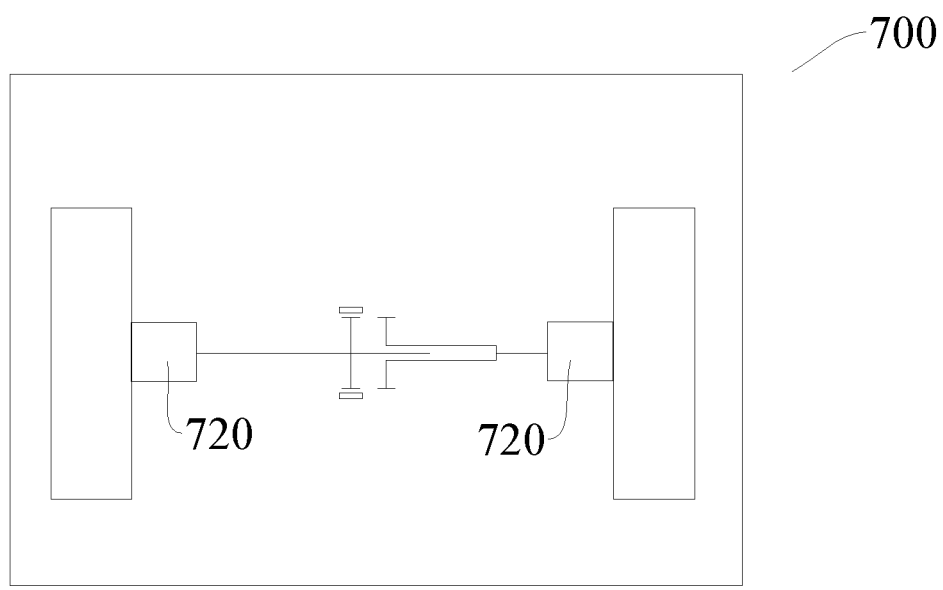

For still another example, as shown in FIG. 32, the electric driving system 700 includes two wheel motors, each wheel motor directly drives one corresponding wheel of two other wheels, and the two other wheels are selectively synchronized. A half shaft synchronizer may be disposed on one half shaft 2000 to be selectively connected to the other half shaft 2000. In this way, each wheel motor may drive a corresponding wheel to rotate, and by disconnecting the half shaft synchronizer, two wheels may move at different speeds, thereby ensuring travelling stability of the vehicle.

A plurality of arrangement forms of the mode conversion device 402 is described in detail below with reference to a plurality of accompanying drawings.

According to a first embodiment of the present invention, as shown in FIG. 7 to FIG. 19, the mode conversion device 402 may further include a first conversion portion 4021*a* and a second conversion portion 4021*b*, the conversion device output portion 4022 is selectively connected to one of the first conversion portion 4021*a* and the second conversion portion 4021*b*, the conversion device input portion 4020 is fixedly connected to the first conversion portion 4021*a*, and the conversion device output portion 4022 is connected to the second conversion portion 4021*b*, so that the rotational speed output by the conversion device input portion 4020 is reduced and then output to the input end of the system power output portion 401.

In this way, when the conversion device output portion 4022 is connected to the first conversion portion 4021*a*, the rotational speed output by the conversion device input portion 4020 is suitably made the same as the rotational speed of the input end of the system power output portion 401.

Therefore, it may be understood that, after the power generated by the power source 100 and/or the first motor generator unit 300 is transferred to the conversion device input portion 4020, the conversion device input portion 4020 may transfer the power to the first conversion portion 4021*a* and the second conversion portion 4021*b*, and by properly selecting the first conversion portion 4021*a* and the second conversion portion 4021*b*, the conversion device output portion 4022 may control the rotational speed transferred to the wheels, and then may control the speed of the vehicle, so that the speed of the vehicle is more suitable for the current vehicle condition, and travelling stability and power performance of the vehicle may be improved.

Each of the first conversion portion 4021*a* and the second conversion portion 4021*b* is disconnected from the conversion device output portion 4022, the power source 100 is suitable for driving the first motor generator unit 300 through the conversion device input portion 4020 to perform power generation. It may be understood that, when each of the first conversion portion 4021*a* and the second conversion portion 4021*b* is disconnected from the conversion device output portion 4022, the power source 100 cannot transfer power to the system power output portion 401, the power of the power source 100 may be transferred to the first motor generator unit 300 through the conversion device input portion 4020, and the first motor generator 302 in the first motor generator unit 300 may be used as a generator to perform power generation. In this way, the stationary power generation mode of the vehicle may be implemented, so that energy waste may be avoided, energy may be saved, and power performance and economy of the vehicle may be improved.

According to a first preferred embodiment of the present invention, as shown in FIG. 7 to FIG. 18, the mode conversion device 402 may include: a main reducer driven gear Z', a planet gear mechanism P and a conversion device connector S, where the main reducer driven gear Z' is the conversion device input portion 4020, the planet gear mechanism P may include a first element P1, a second element P2 and a third element P3, and the first element P1 is fixed to the main reducer driven gear Z'. In this way, power may be transferred between the first element P1 and the main reducer driven gear Z', the second element P2 is fixedly disposed, the first element P1 is the first conversion portion 4021*a*, and the third element P3 is the second conversion portion 4021*b*. To be specific, the first element P1 may perform transmission with the third element P3, and in this transmission process, the rotational speed of the first element P1 is greater than the rotational speed of the third element P3. Moreover, the planet gear mechanism P may include: a sun gear, a planet gear, a planet carrier and a gear ring, the planet gear is installed on the planet carrier, and the planet gear is meshed between the sun gear and the gear ring. In this way, each of the sun gear, the planet carrier and the gear ring may be one of the first element P1, the second element P2 and the third element P3.

As shown in FIG. 7, the first element P1 is the sun gear, the sun gear is directly fixedly connected to the main reducer driven gear Z', the second element P2 is the gear ring, and the third element P3 is the planet carrier.

Figure 8:
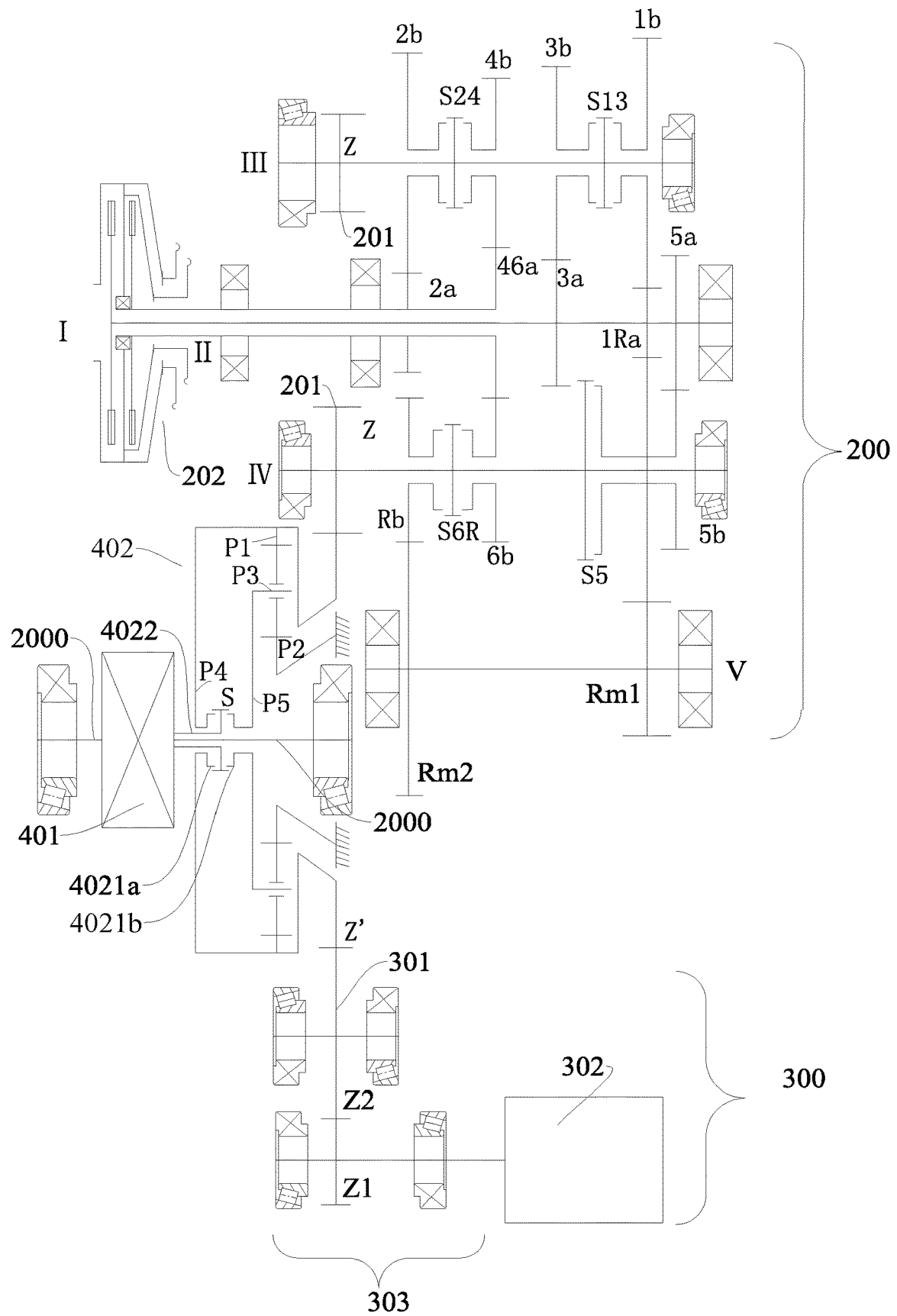

As shown in FIG. 8, the first element P1 is the gear ring, the gear ring is directly fixedly connected to the main reducer driven gear Z', the second element P2 is the sun gear, and the third element P3 is the planet carrier.

Figure 9:
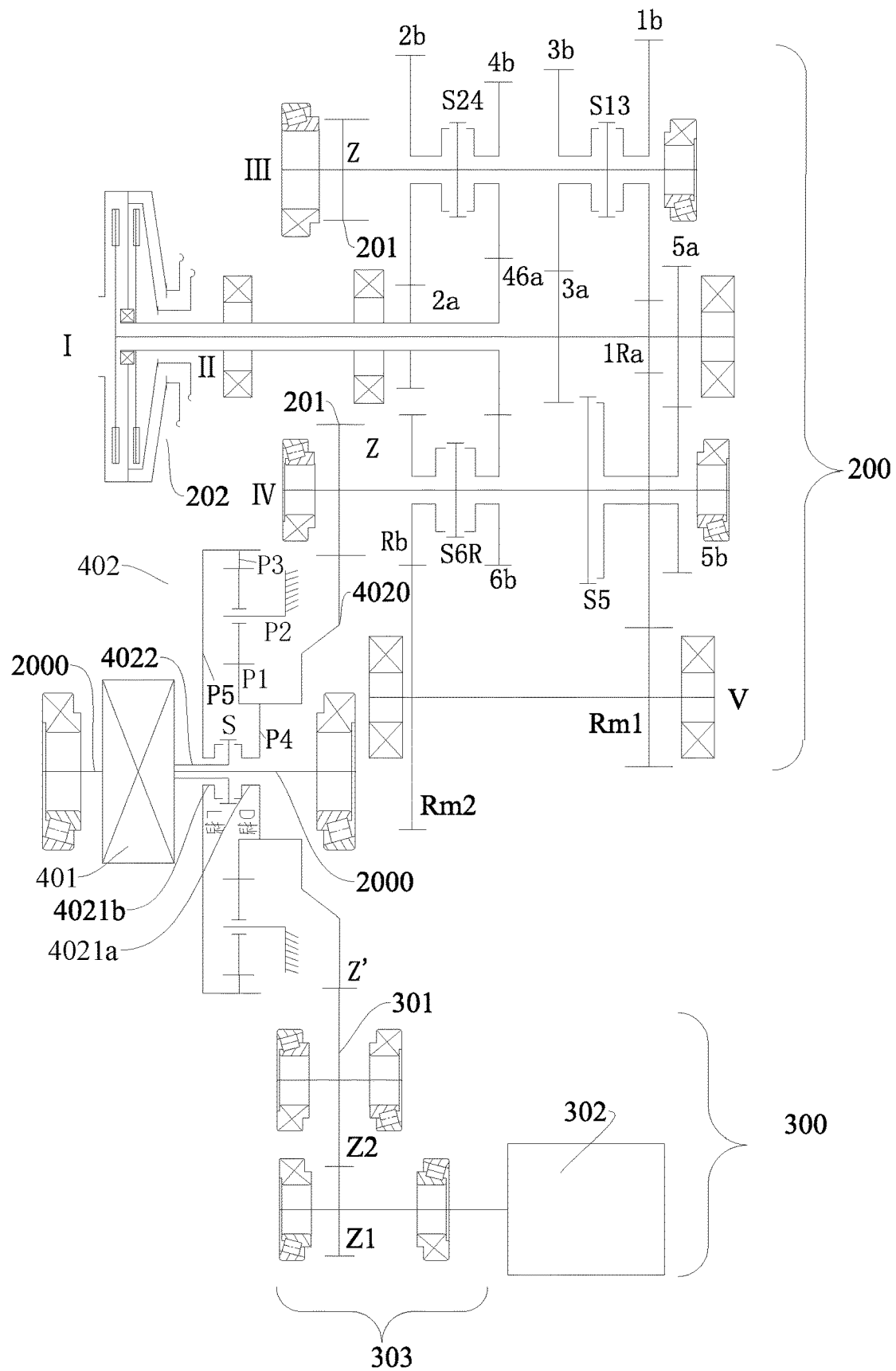

As shown in FIG. 9, the first element P1 is the sun gear, the sun gear is directly fixedly connected to the main reducer driven gear Z', the second element P2 is the planet carrier, and the third element P3 is the gear ring.

Further, the mode conversion device 402 may further include: a conversion device connector S, and the conversion device output portion 4022 is selectively connected to one of the first element P1 and the third element P3 through the conversion device connector S. Preferably, the conversion device connector may be a conversion device synchronizer. In this way, the conversion device synchronizer may selectively connect the conversion device output portion 4022 to the first element P1 and the third element P3. When the conversion device synchronizer is connected to the first element P1, the rotational speed of the conversion device input portion 4020 is the same as the rotational speed of the conversion device output portion 4022. When the conversion device synchronizer is connected to the third element P3, the rotational speed of the conversion device input portion 4020 is greater than the rotational speed of the conversion device output portion 4022.

There is a plurality of arrangement forms of the conversion device connector S, and detailed description is made below with reference to accompanying drawings.

According to a first specific embodiment of the present invention, as shown in FIG. 7 to FIG. 9, in the axial direction of the central axis of the planet gear mechanism P, the conversion device connector S is located between the first element P1 and the third element P3. In this way, one conversion device synchronizer may be saved, so that the mode conversion device 402 is simple in structure and is simple in control logic.

The conversion device output portion 4022 may be a shaft sleeve, the shaft sleeve may be sleeved on a half shaft 2000, one end of the shaft sleeve is fixedly connected to the input end of the system power output portion 401, and the conversion device connector S is fixedly disposed on the other end of the shaft sleeve. In this way the conversion device output portion 4022 may output power to the system power output portion 401 in time and reliably.

Specifically, each of that element that is of the first element P1 and the third element P3 and that is closer to the input end of the system power output portion 401, and the main reducer driven gear Z' is freely sleeved on the shaft sleeve, the shaft sleeve is sleeved on the half shaft 2000 of the vehicle, and that element that is of the first element P1 and the third element P3 and that is farther away from the input end of the system power output portion 401 is freely sleeved on the half shaft 2000 of the vehicle.

As shown in FIG. 7, the third element P3 is closer to the system power output portion 401, and the third element P3 is freely sleeved on the shaft sleeve. As shown in FIG. 8, the first element P1 is closer to the system power output portion 401, and the first element P1 is freely sleeved on the shaft sleeve. As shown in FIG. 9, the third element P3 is closer to the system power output portion 401, and the third element P3 is freely sleeved on the shaft sleeve. In this way, the mode conversion device 402 is compact in structure and proper in arrangement.

The planet gear mechanism P further includes a first element connection portion P4 and a third element connection portion P5, the first element connection portion P4 is fixedly connected to the first element P1, and the first element connection portion P4 is suitable for being selectively connected to the conversion device connector S. The third element connection portion P5 is fixedly connected to the third element P3, and the third element connection portion P5 is suitable for being selectively connected to the conversion device connector S. In the axial direction of the central axis of the planet gear mechanism P, the conversion device connector S is located in space defined by the first element connection portion P4 and the third element connection portion P5. The first element connection portion P4 may facilitate connection or disconnection between the first element P1 and the conversion device synchronizer, and the third element connection portion P5 may facilitate connection or disconnection between the third element P3 and the conversion device connector S. Moreover, the conversion device connector S is located between the first element connection portion P4 and the third element connection portion P5.

Figure 10:
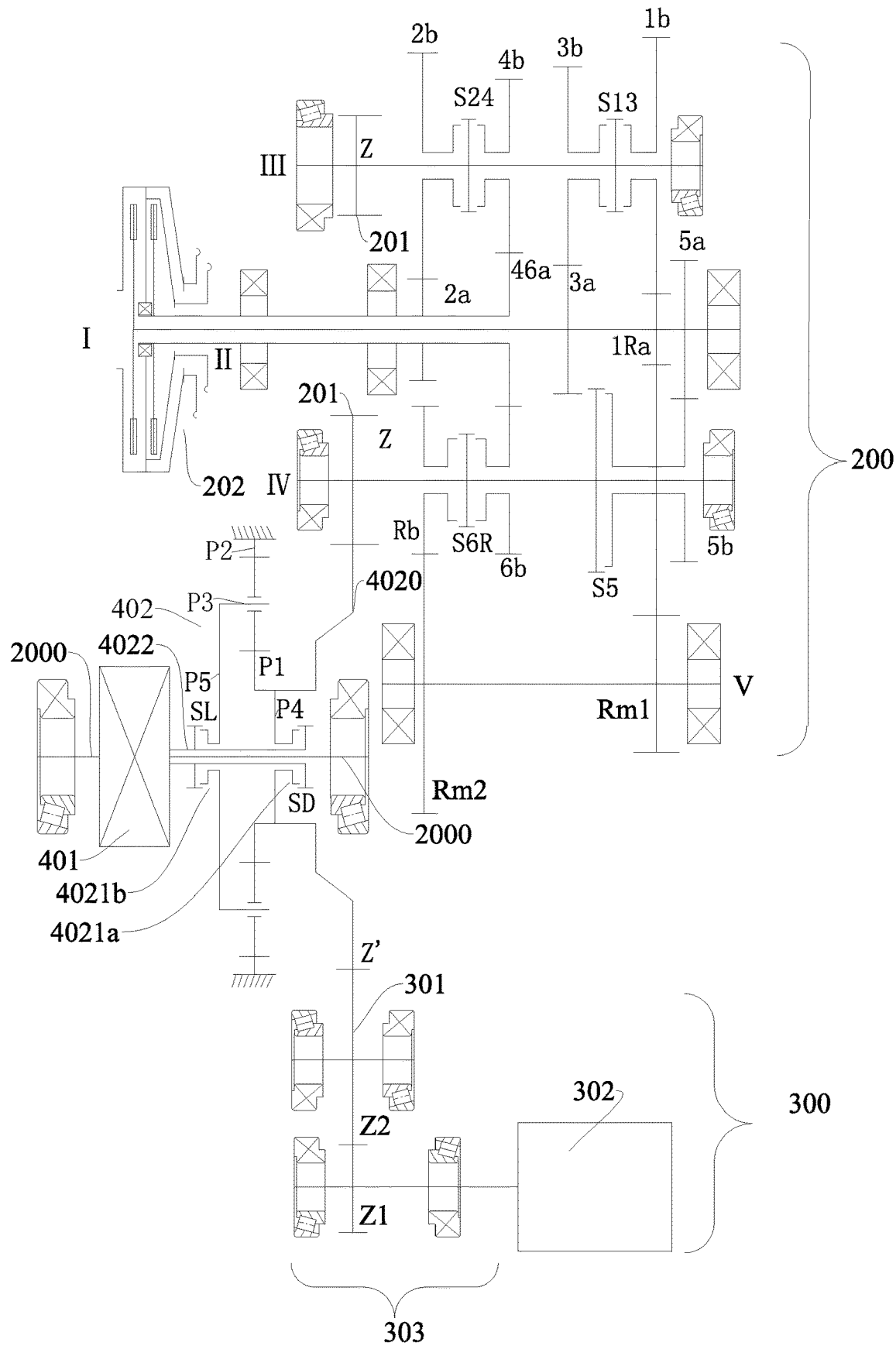
Figure 11:
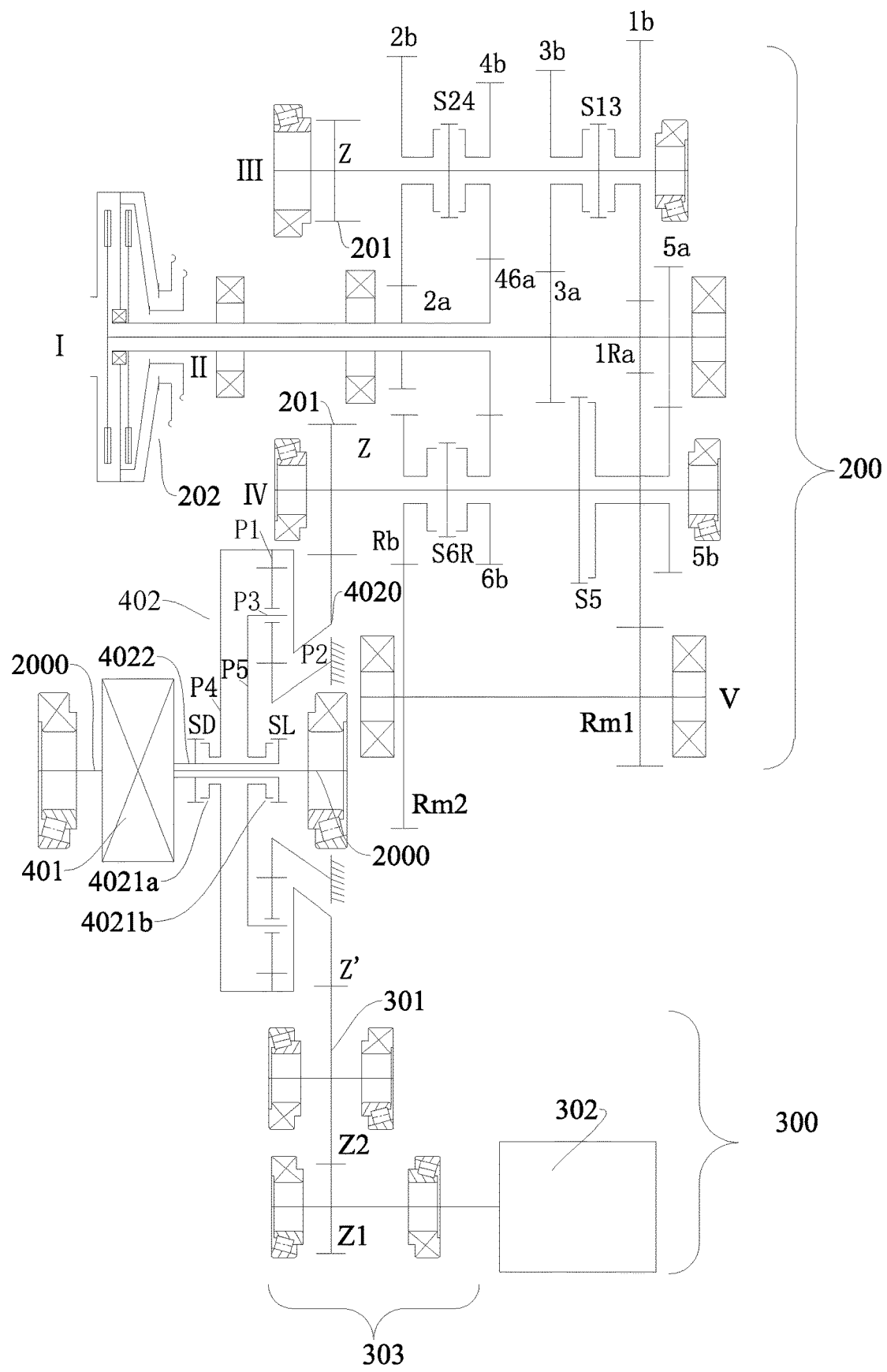
Figure 12:
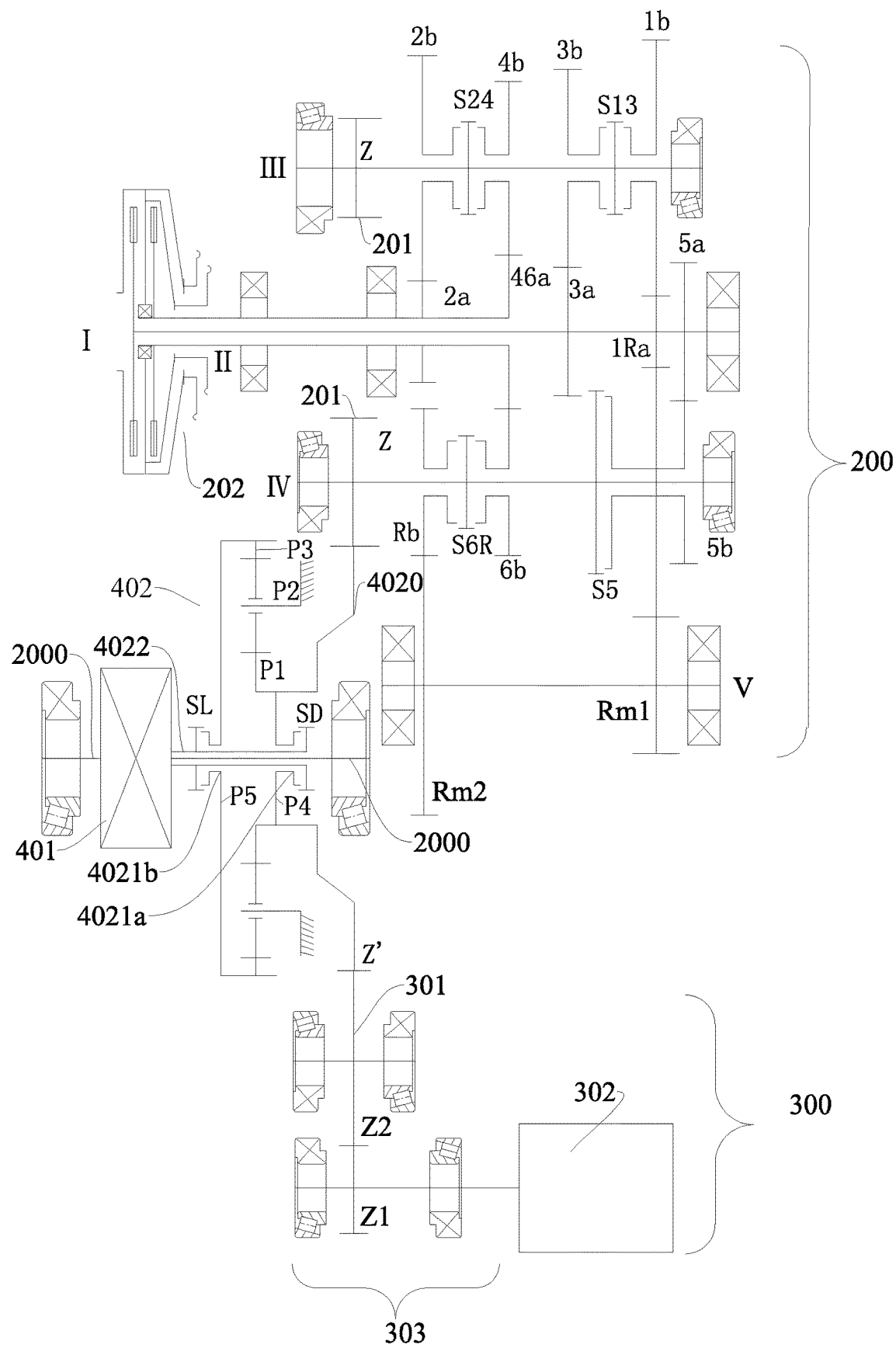

A main difference between a second specific embodiment of the present invention and the foregoing first specific embodiment is that, as shown in FIG. 10 to FIG. 12, the conversion device connector S may include a first connection portion and a second connection portion spaced apart from each other, the first connection portion is suitable for selectively connecting the conversion device output portion 4022 to the first element P1, and the second connection portion is suitable for selectively connecting the conversion device output portion 4022 to the third element P3. To be specific, when the first connection portion connects the conversion device output portion 4022 to the first element P1, the rotational speed of the conversion device input portion 4020 is the same as the rotational speed of the conversion device output portion 4022; when the second connection portion connects the conversion device output portion 4022 to the third element P3, the rotational speed of the conversion device input portion 4020 is greater than the rotational speed of the conversion device output portion 4022. In this way, the first connection portion and the second connection portion are separately arranged, so that the conversion device connector S is simple in arrangement, and cooperation between a shifting yoke mechanism and the first connection portion and the second connection portion may be facilitated.

Further, as shown in FIG. 10 to FIG. 12, the conversion device output portion 4022 may be a shaft sleeve, one end of the shaft sleeve is fixedly connected to the input end of the system power output portion 401, the other end of the shaft sleeve passes through the planet gear structure, one of the first connection portion and the second connection portion is fixedly disposed on the other end of the shaft sleeve, and the other of the first connection portion and the second connection portion is fixedly disposed on a part of the shaft sleeve not passing through the planet gear mechanism P. It should be noted that, arrangement locations of the first connection portion and the second connection portion are adjusted according to the first element P1 and the third element P3, and when the first element P1 is farther away from the system power output portion 401 relative to the third element P3, the first connection portion is fixed on the other end of the shaft sleeve, and the second connection portion is fixedly disposed on a part of the shaft sleeve not passing through the planet gear mechanism P. When the first element P1 is closer to the system power output portion 401 relative to the third element P3, the second connection portion is fixed on the other end of the shaft sleeve, and the first connection portion is fixedly disposed on a part of the shaft sleeve not passing through the planet gear mechanism P.

Specifically, as shown in FIG. 10 to FIG. 12, The planet gear mechanism P may further include a first element connection portion P4 and a third element connection portion P5, the first element connection portion P4 is fixedly connected to the first element P1, and the first element connection portion P4 is suitable for being selectively connected to the conversion device connector S. The third element connection portion P5 is fixedly connected to the third element P3, and the third element connection portion P5 is suitable for being selectively connected to the conversion device connector S. In the axial direction of the central axis of the planet gear mechanism P, each of the first element connection portion P4 and the third element connection portion P5 is located between the first connection portion and the second connection portion. Such an aspect may help the conversion device connector S control connection between the first element P1 and the conversion device output portion 4022, and may help control connection between the third element P3 and the conversion device output portion 4022, so that the mode conversion device 402 is simple in structure, proper in deployment, and simple in control logic.

Optionally, as shown in FIG. 10 to FIG. 12, each of the first element P1, the third element P3, and the main reducer driven gear Z' may be freely sleeved on the shaft sleeve, and the shaft sleeve is sleeved on the half shaft 2000 of the vehicle. The shaft sleeve may rotate relative to the half shaft 2000, and the first element P1, the third element P3, and the main reducer driven gear Z' may rotate relative to the shaft sleeve. In this way, space on the half shaft 2000 may be properly used, arrangement reliability of the shaft sleeve, the first element P1, the third element P3, and the main reducer driven gear Z' may be ensured, and arrangement difficulty of the power transmission system 1000 may be further reduced.

The conversion device connector S may include a direct-gear synchronizer SD and a low-gear synchronizer SL, the first connection portion is a part of the direct-gear synchronizer SD, and the second connection portion is a part of the low-gear synchronizer SL. Connection between the first element connection portion P4 and the conversion device output portion 4022 through the direct-gear synchronizer SD may ensure that the rotational speed of the conversion device input portion 4020 is the same as the rotational speed of the conversion device output portion 4022, and connection between the third element connection portion P5 and the conversion device output portion 4022 through the low-gear synchronizer SL may ensure that the rotational speed of the conversion device input portion 4020 is greater than the rotational speed of the conversion device output portion 4022.

Figure 13:
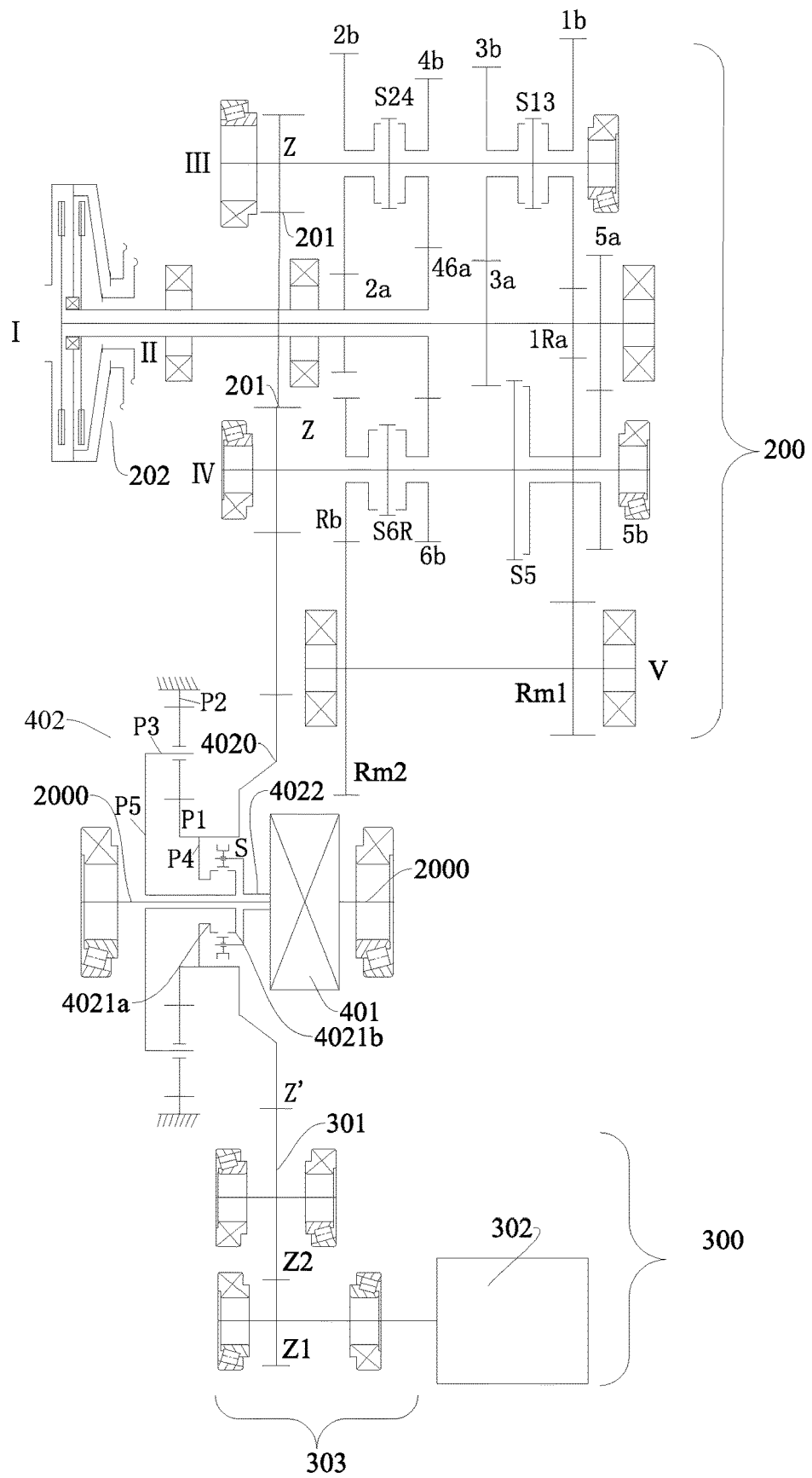
Figure 14:
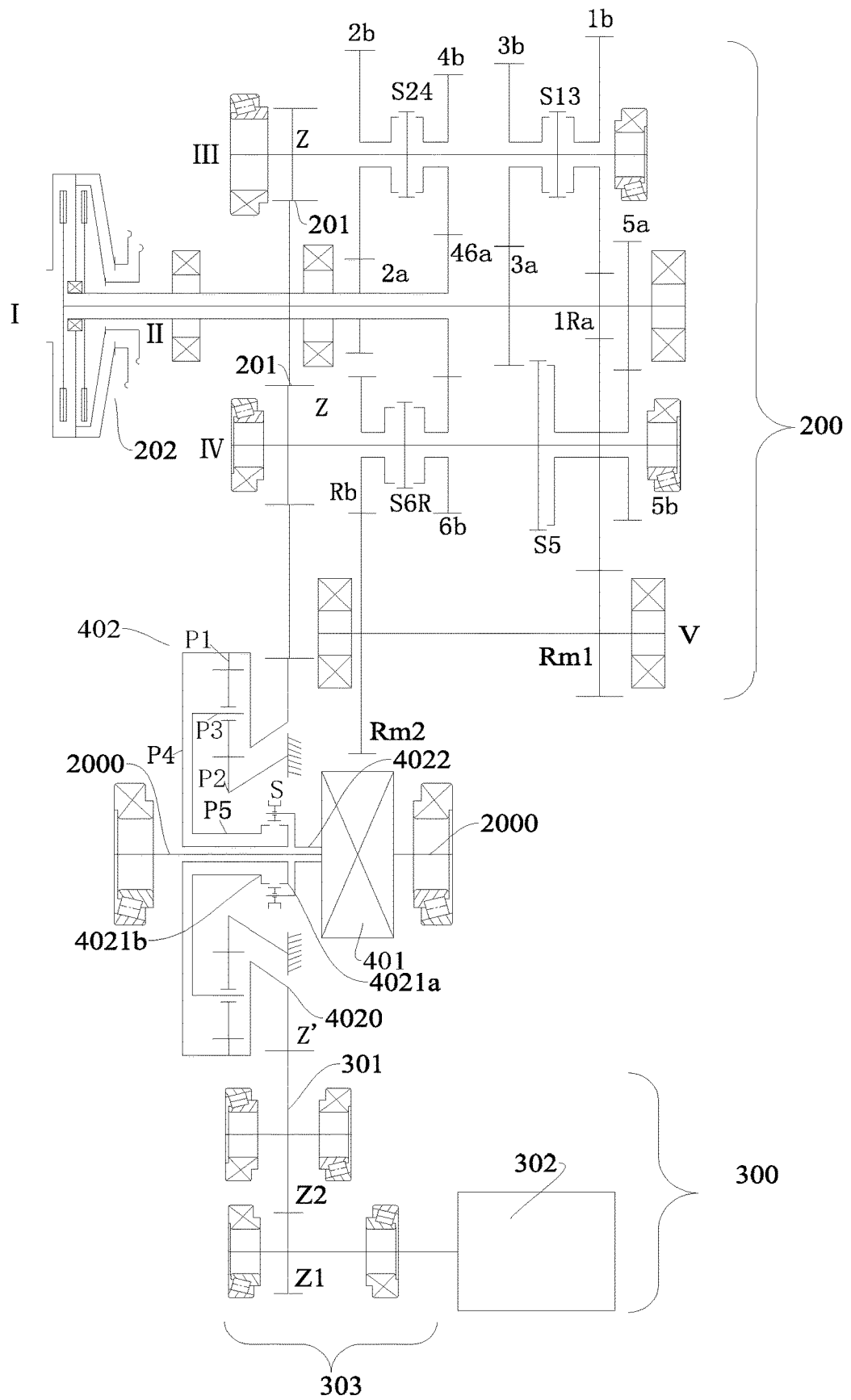
Figure 15:
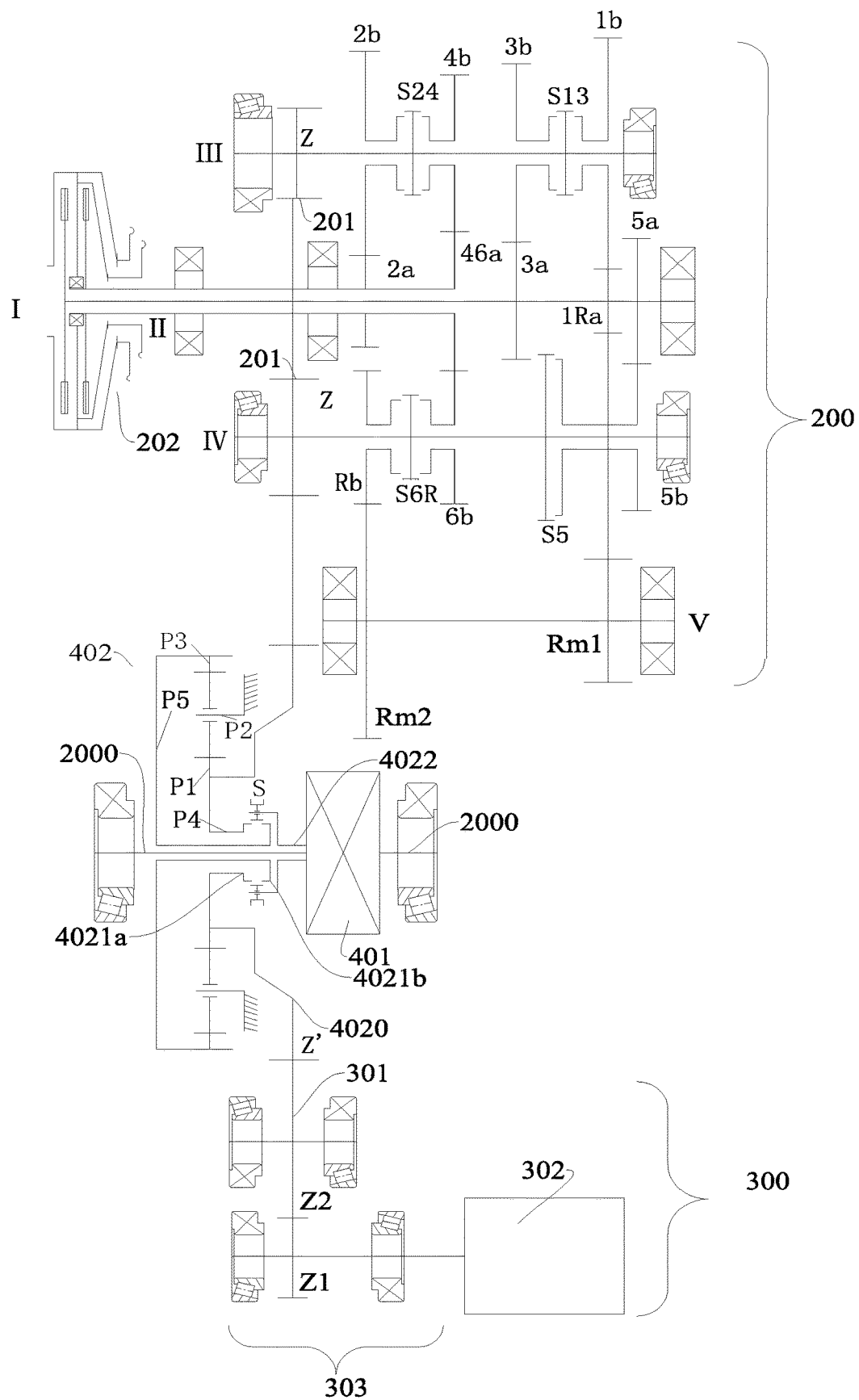
Figure 16:
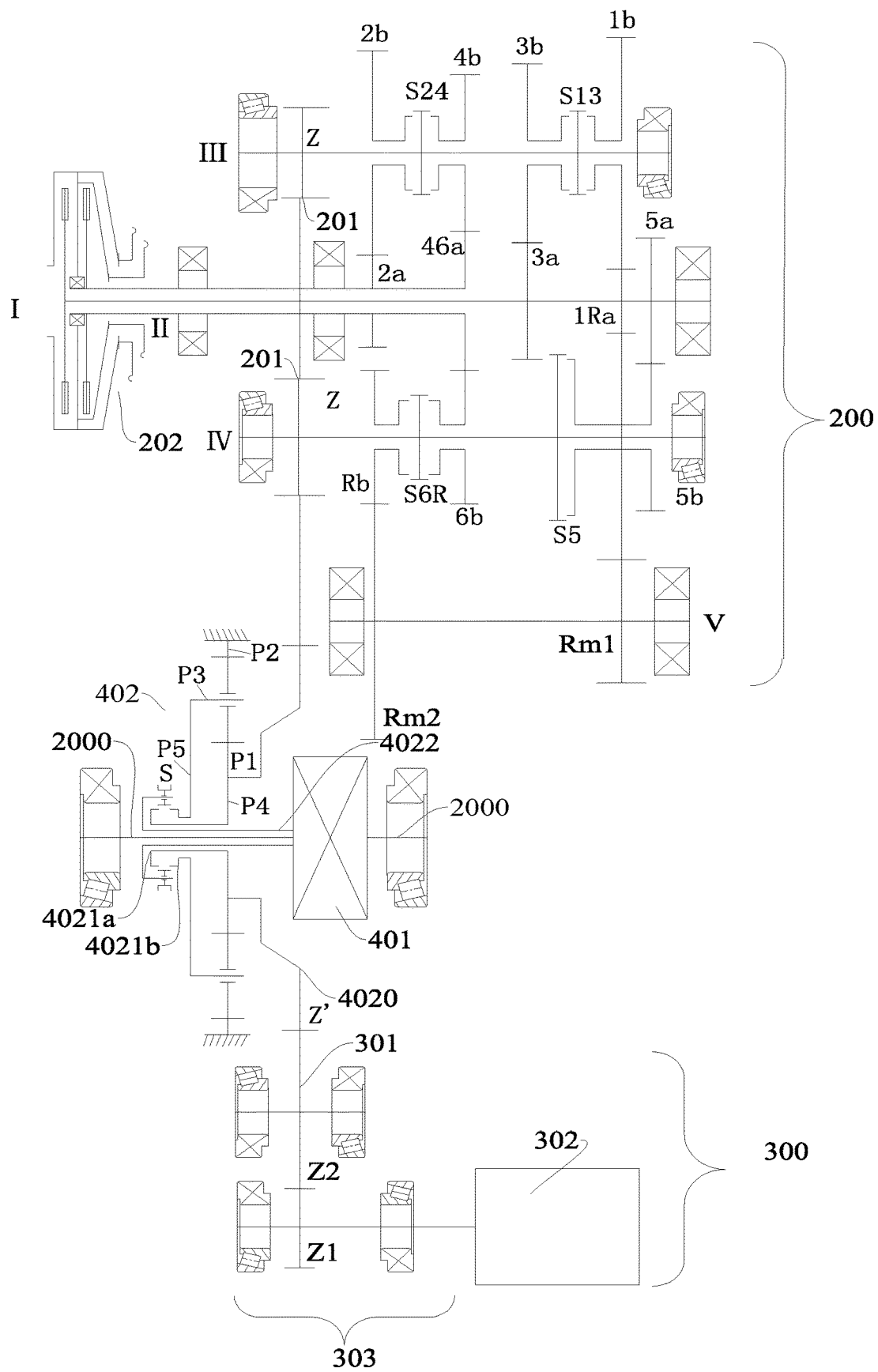
Figure 17:
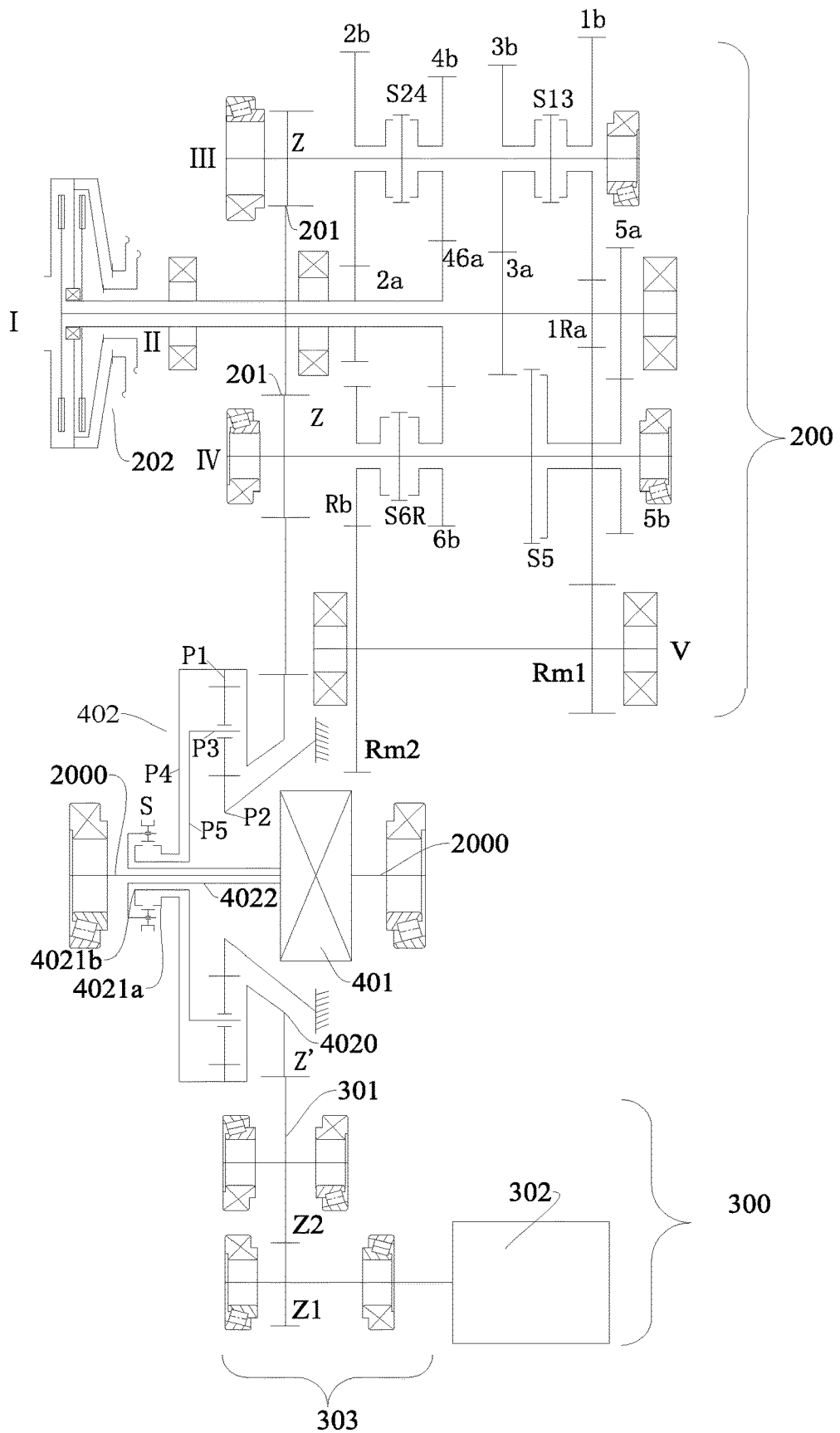
Figure 18:
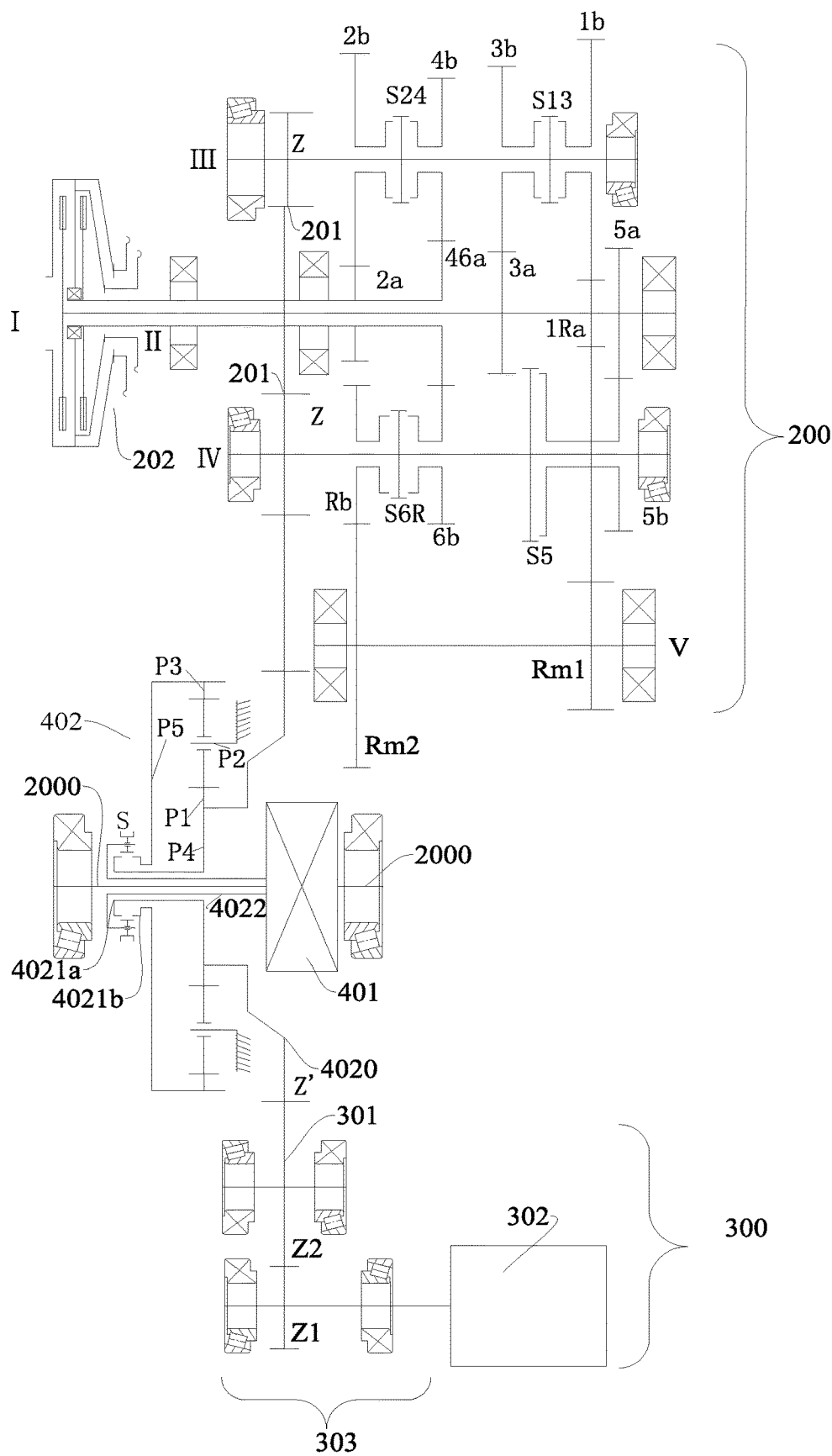

A third specific embodiment of the present invention is roughly the same as the first specific embodiment. For a specific difference, refer to the following content. As shown in FIG. 13 to FIG. 18, in the axial direction of the central axis of the planet gear mechanism P, the conversion device connector S is located on a side of the planet gear mechanism P. Specifically, as shown in FIG. 13 to FIG. 15, in the axial direction of the central axis of the planet gear mechanism P, the conversion device connector S is located on a right side of the planet gear mechanism P. As shown in FIG. 16 to FIG. 18, in the axial direction of the central axis of the planet gear mechanism P, the conversion device connector S is located on a left side of the planet gear mechanism P. In this way, in the axial direction, the planet gear mechanism P and the conversion device connector S are spaced apart from each other, thereby facilitating arrangement of the shifting yoke mechanism, reducing arrangement difficulty of the shifting yoke mechanism, and further improving arrangement convenience and control convenience of the power transmission system 1000.

Optionally, as shown in FIG. 13 to FIG. 15, the conversion device connector S is disposed on the conversion device output portion 4022, and each of the conversion device output portion 4022 and the conversion device connector S is located on a side of the planet gear mechanism P. To be specific, the conversion device output portion 4022 and the conversion device connector S may be located on a same side of the planet gear mechanism P, for example, a right side. In this way, axial arrangement of the planet gear mechanism P, the conversion device connector S and the conversion device output portion 4022 is made proper, thereby facilitating arrangement of the shifting yoke mechanism, and improving structure reliability of the mode conversion device 402.

As shown in FIG. 13 to FIG. 15, in the axial direction of the central axis of the planet gear mechanism P, from one end away from the conversion device connector S to one end close to the conversion device connector S, a connection disk part corresponding to that element that is of the first element P1 and the third element P3 and that is located on an outer side, and a connection disk part corresponding to that element that is of the first element P1 and the third element P3 and that is located on an inner side are sequentially disposed. In the radial direction of the central axis of the planet gear mechanism P, a sleeve part corresponding to that element that is of the first element P1 and the third element P3 and that is located on an inner side, and a sleeve part corresponding to that element that is of the first element P1 and the third element P3 and that is located on an outer side are sequentially sleeved from outside to inside.

Exemplary description is made below through the power transmission system 1000 shown in FIG. 13 as an example.

As shown in FIG. 13, in the axial direction of the central axis of the planet gear mechanism P, from one end away from the conversion device connector S to one end close to the conversion device connector S, the connection disk part of the third element P3 and the connection disk part of the first element P1 are sequentially arranged. In the radial direction of the central axis of the planet gear mechanism P, a sleeve part corresponding to the first element P1 and a sleeve part corresponding to the third element P3 are sequentially sleeved from outside to inside. In this way, the first element connection portion P4 and the third element connection portion P5 are arranged properly in each of the axial direction and the radial direction, so that the mode conversion device 402 is arranged properly.

Additionally, optionally, as shown in FIG. 16 to FIG. 18, one part of the conversion device output portion 4022 may pass through the planet gear mechanism P, and the conversion device connector S is disposed on the foregoing one part of the conversion device output portion 4022. To be specific, the conversion device connector S and the system power output portion 401 are respectively located on two sides of the planet gear mechanism P, and the planet gear mechanism P may be sleeved on the conversion device output portion 4022, so that axial space and radial space of the mode conversion device 402 may be properly used. Specifically, the conversion device output portion 4022 may be a shaft sleeve, and the shaft sleeve is sleeved on the half shaft 2000 of the vehicle.

As shown in FIG. 16 to FIG. 18, the planet gear mechanism P may further include a first element connection portion P4 and a third element connection portion P5, the first element connection portion P4 is fixedly connected to the first element P1, and the first element connection portion P4 is suitable for being selectively connected to the conversion device connector S. The third element connection portion P5 is fixedly connected to the third element P3, and the third element connection portion P5 is suitable for being selectively connected to the conversion device connector S. Disposition of the first element connection portion P4 and the third element connection portion P5 may help the conversion device output portion 4022 selectively connect to each of the first element P1 and the third element P3.

Optionally, as shown in FIG. 16 to FIG. 18, each of the first element connection portion P4 and the third element connection portion P5 may include a connection disk part and a sleeve part, the connection disk part is perpendicular to the central axis of the planet gear mechanism P, and the sleeve part is parallel to the central axis of the planet gear mechanism P. The outer edge of the connection disk part is fixedly connected to a corresponding element, the inner edge of the connection disk part is connected to one end of the sleeve part, and the other end of the sleeve part is suitable for selectively connecting to the conversion device connector S. In this way, disposition of the connection disk part and the sleeve part may ensure reliability of connection or disconnection between the first element P1 and the conversion device connector S, and may ensure reliability of connection or disconnection between the third element P3 and the conversion device connector S.

As shown in FIG. 16 to FIG. 18, in the axial direction of the central axis of the planet gear mechanism P, from one end away from the conversion device connector S to one end close to the conversion device connector S, a connection disk part corresponding to that element that is of the first element P1 and the third element P3 and that is located on an inner side, and a connection disk part corresponding to that element that is of the first element P1 and the third element P3 and that is located on an outer side are sequentially disposed. In the radial direction of the central axis of the planet gear mechanism P, a sleeve part corresponding to that element that is of the first element P1 and the third element P3 and that is located on an outer side, and a sleeve part corresponding to that element that is of the first element P1 and the third element P3 and that is located on an inner side are sequentially sleeved from outside to inside.

Exemplary description is made below through the power transmission system 1000 shown in FIG. 16 as an example.

As shown in FIG. 16, in the axial direction of the central axis of the planet gear mechanism P, from one end away from the conversion device connector S to one end close to the conversion device connector S, a connection disk part corresponding to the third element P3 and a connection disk part corresponding to the first element P1 are sequentially disposed, and in the radial direction of the central axis of the planet gear mechanism P, a sleeve part corresponding to the third element P3 and a sleeve part corresponding to the first element P1 are sequentially sleeved from outside to inside.

As shown in FIG. 13 to FIG. 18, each conversion device connector S may be a conversion device synchronizer.

Figure 19:
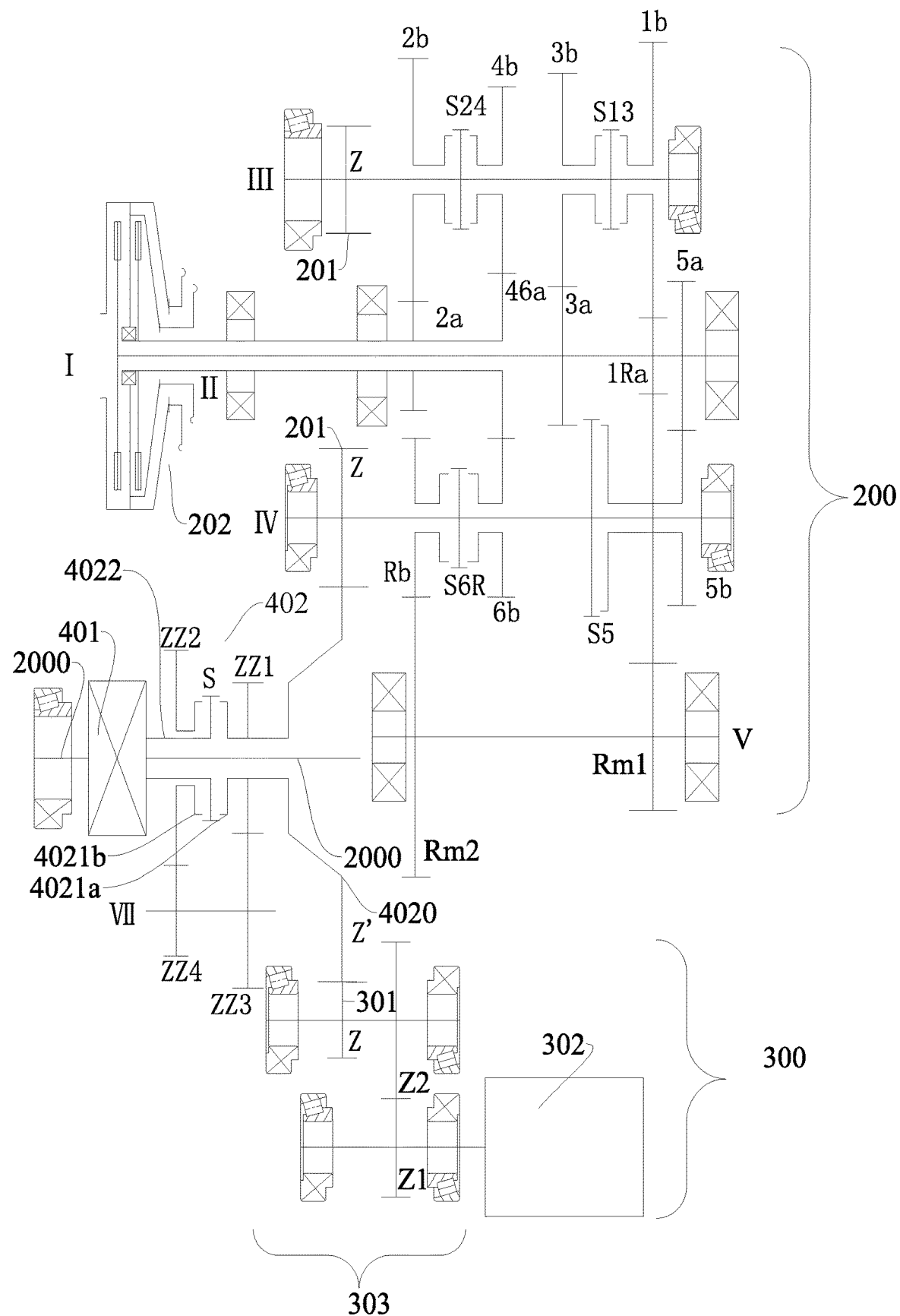

According to a second embodiment of the present invention, as shown in FIG. 19, the mode conversion device 402 may further include a first conversion portion 4021a and a second conversion portion 4021b, the conversion device output portion 4022 is selectively connected to one of the first conversion portion 4021a and the second conversion portion 4021b, the conversion device input portion 4020 is fixedly connected to the first conversion portion 4021a, and the conversion device output portion 4022 is connected to the second conversion portion 4021b, so that the rotational speed of the conversion device output portion 4022 is reduced sequentially through the first conversion portion 4021a and the second conversion portion 4021b and then output to the input end of the system power output portion 401.

In this way, when the conversion device output portion 4022 is connected to the first conversion portion 4021a, the rotational speed output by the conversion device input portion 4020 is suitably made the same as the rotational speed of the input end of the system power output portion 401.

Therefore, it may be understood that, after the power generated by the power source 100 and/or the first motor generator unit 300 is transferred to the conversion device input portion 4020, the conversion device input portion 4020 may transfer the power to the first conversion portion 4021a and the second conversion portion 4021b, and by properly selecting the first conversion portion 4021a and the second conversion portion 4021b, the conversion device output portion 4022 may control the rotational speed transferred to the wheels, and then may control the speed of the vehicle, so that the speed of the vehicle is more suitable for the current vehicle condition, and travelling stability and power performance of the vehicle may be improved.

Each of the first conversion portion 4021a and the second conversion portion 4021b is disconnected from the conversion device output portion 4022, and the power source 100 is suitable for driving the first motor generator unit 300 through the conversion device input portion 4020 to perform power generation. It may be understood that, when each of the first conversion portion 4021a and the second conversion portion 4021b is disconnected from the conversion device output portion 4022, the power source 100 cannot transfer power to the system power output portion 401, the power of the power source 100 may be transferred to the first motor generator unit 300 through the conversion device input portion 4020, and the first motor generator 302 in the first motor generator unit 300 may be used as a generator to perform power generation. In this way, the stationary power generation mode of the vehicle may be implemented, so that energy waste may be avoided, energy may be saved, and power performance and economy of the vehicle may be improved.

As shown in FIG. 19, in the mode conversion device 402, the conversion device input portion 4020 is a main reducer driven gear Z', the first conversion portion 4021a is a first conversion gear ZZ1, and the second conversion portion 4021b is a second conversion gear ZZ2, but the mode conversion device 402 further includes: a conversion device shaft VII. Each of the main reducer driven gear Z', the first conversion gear ZZ1 and the second conversion gear ZZ2 is freely sleeved on the half shaft 2000 of the vehicle, a third conversion gear ZZ3 and a fourth conversion gear ZZ4 are fixed on the conversion device shaft VII, the first conversion gear ZZ1 is meshed with the third conversion gear ZZ3, and the second conversion gear ZZ2 is meshed with the fourth conversion gear ZZ4. In this way, first-stage speed reduction is formed between the first conversion gear ZZ1 and the third conversion gear ZZ3, and second-stage speed reduction is formed between the second conversion gear ZZ2 and the fourth conversion gear ZZ4, so that the rotational speed of the first conversion gear ZZ1 is greater than the rotational speed of the second conversion gear ZZ2.

Specifically, as shown in FIG. 19, the main reducer driven gear Z' may form a duplicate gear structure with the first conversion gear ZZ1. In other words, one gear of the duplicate gear structure forms the main reducer driven gear Z' and the other gear forms the first conversion gear ZZ1. In this way, by disposing the duplicate gear structure, the mode conversion device 402 is simple in structure and reliable in work, and the power transmission system 1000 is simple in structure and reliable in work.

Further, as shown in FIG. 19, the mode conversion device 402 may further include a conversion device connector S, and the conversion device output portion 4022 is selectively connected to the first conversion portion 4021a or the second conversion portion 4021b through the conversion device connector S. Herein, it may be understood that, the conversion device output portion 4022 may be selectively connected to and disconnected from the first conversion portion 4021a, and the conversion device output portion 4022 may be selectively connected to and disconnected from the second conversion portion 4021b. By switching a status and a connection target of the conversion device connector S, the output rotational speed transferred to the conversion device output portion 4022 may be changed, thereby changing the rotational speed of the wheels, further enriching driving modes of the vehicle, and improving economy and power performance of the vehicle. The conversion device connector S may be a conversion device synchronizer, and the conversion device synchronizer is disposed between the first conversion gear ZZ1 and the second conversion gear ZZ2, thereby reducing a quantity of synchronizers, so that the mode conversion device 402 is simple in structure and low in costs.

As shown in FIG. 19, the conversion device output portion 4022 may be a shaft sleeve, one end of the shaft sleeve is fixedly connected to the input end of the system power output portion 401, and the conversion device connector S is disposed on the other end of the shaft sleeve. In this way, reliability of synchronization between the conversion device output portion 4022 and the corresponding first conversion gear ZZ1 and second conversion gear ZZ2 may be ensured. Moreover, through proper radial sleeve arrangement, space of the mode conversion device 402 may be effectively saved, so that the mode conversion device 402 is compact in structure and small in volume, and occupies small space of the power transmission system 1000.

Further, the shaft sleeve may be sleeved on the half shaft 2000 of the vehicle, and the second conversion gear ZZ2 may be freely sleeved on the shaft sleeve. In this way, the arrangement location of the second conversion gear ZZ2 is proper, and structure reliability of the mode conversion device 402 may be ensured.

A plurality of driving modes corresponding to the power transmission system 1000 shown in FIG. 7 to FIG. 19 is described below in detail.

The power transmission system 1000 for the vehicle has a first power source driving mode. When the power transmission system 1000 for the vehicle is in the first power source driving mode, the first motor generator unit 300 does not work, the conversion device output portion 4022 is connected to the first conversion portion 4021a, the power output by the power source 100 is output to the input end of the system power output portion 401 sequentially through the conversion device input portion 4020, the first conversion portion 4021a, and the conversion device output portion 4022, and the rotational speed output by the conversion device input portion 4020 is the same as the rotational speed of the input end of the system power output portion 401.

The power transmission system 1000 for the vehicle has a second power source driving mode. When the power transmission system 1000 for the vehicle is in the second power source driving mode, the first motor generator unit 300 does not work, the conversion device output portion 4022 is connected to the second conversion portion 4021b, the power output by the power source 100 is output to the input end of the system power output portion 401 sequentially through the conversion device input portion 4020, the second conversion portion 4021b, and the conversion device output portion 4022, and the rotational speed output by the conversion device input portion 4020 is greater than the rotational speed of the input end of the system power output portion 401.

The power transmission system 1000 for the vehicle has a first pure electric driving mode. When the power transmission system 1000 for the vehicle is in the first pure electric driving mode, the power source 100 does not work, the conversion device output portion 4022 is connected to the first conversion portion 4021a, the power output by the first motor generator unit 300 is output to the input end of the system power output portion 401 sequentially through the conversion device input portion 4020, the first conversion portion 4021a, and the conversion device output portion 4022, and the rotational speed output by the conversion device input portion 4020 is the same as the rotational speed of the input end of the system power output portion 401.

The power transmission system 1000 for the vehicle has a second pure electric driving mode. When the power transmission system 1000 for the vehicle is in the second pure electric driving mode, the power source 100 does not work, the conversion device output portion 4022 is connected to the second conversion portion 4021b, the power output by the first motor generator unit 300 is output to the input end of the system power output portion 401 sequentially through the conversion device input portion 4020, the second conversion portion 4021b, and the conversion device output portion 4022, and the rotational speed output by the conversion device input portion 4020 is greater than the rotational speed of the input end of the system power output portion 401.

The power transmission system 1000 for the vehicle has a first hybrid driving mode. When the power transmission system 1000 for the vehicle is in the first hybrid driving mode, both the power source 100 and the first motor generator unit 300 work, the conversion device output portion 4022 is connected to the first conversion portion 4021a, the power output by each of the power source 100 and the first motor generator unit 300 is output to the input end of the system power output portion 401 sequentially through the conversion device input portion 4020, the first conversion portion 4021a, and the conversion device output portion 4022, and the rotational speed output by the conversion device input portion 4020 is the same as the rotational speed of the input end of the system power output portion 401.

The power transmission system 1000 for the vehicle has a second hybrid driving mode. When the power transmission system 1000 for the vehicle is in the second hybrid driving mode, both the power source 100 and the first motor generator unit 300 work, the conversion device output portion 4022 is connected to the second conversion portion 4021b, the power output by each of the power source 100 and the first motor generator unit 300 is output to the input end of the system power output portion 401 sequentially through the conversion device input portion 4020, the second conversion portion 4021b, and the conversion device output portion 4022, and the rotational speed output by the conversion device input portion 4020 is greater than the rotational speed of the input end of the system power output portion 401.

The power transmission system 1000 for the vehicle has a first driving power generation mode. When the power transmission system 1000 for the vehicle is in the first driving power generation mode, the power source 100 works, the conversion device output portion 4022 is connected to the first conversion portion 4021a, a part of the power output by the power source 100 is output to the input end of the system power output portion 401 sequentially through the conversion device input portion 4020, the first conversion portion 4021a, and the conversion device output portion 4022, and the rotational speed output by the conversion device input portion 4020 is the same as the rotational speed of the input end of the system power output portion 401. Another part of the power output by the power source 100 drives the first motor generator unit 300 through the conversion device input portion 4020 to perform power generation.

The power transmission system 1000 for the vehicle has a second driving power generation mode. When the power transmission system 1000 for the vehicle is in the second driving power generation mode, the power source 100 works, the conversion device output portion 4022 is connected to the second conversion portion 4021b, a part of the power output by the power source 100 is output to the input end of the system power output portion 401 sequentially through the conversion device input portion 4020, the second conversion portion 4021b, and the conversion device output portion 4022, and the rotational speed output by the conversion device input portion 4020 is greater than the rotational speed of the input end of the system power output portion 401. Another part of the power output by the power source 100 drives the first motor generator unit 300 through the conversion device input portion 4020 to perform power generation.

The power transmission system 1000 for the vehicle has a first braking energy recycling mode. When the power transmission system 1000 for the vehicle is in the first braking energy recycling mode, the conversion device output portion 4022 is connected to the first conversion portion 4021a, power from wheels of the vehicle is output to the first motor generator unit 300 sequentially through the system power output portion 401, the conversion device output portion 4022, the first conversion portion 4021a, and the conversion device input portion 4020, and drives the first motor generator unit 300 to perform power generation, and the rotational speed output by the conversion device input portion 4020 is the same as the rotational speed of the input end of the system power output portion 401.

The power transmission system 1000 for the vehicle has a second braking energy recycling mode. When the power transmission system 1000 for the vehicle is in the second braking energy recycling mode, the conversion device output portion 4022 is connected to the second conversion portion 4021b, power from wheels of the vehicle is output to the first motor generator unit 300 sequentially through the system power output portion 401, the conversion device output portion 4022, the second conversion portion 4021b, and the conversion device input portion 4020, and drives the first motor generator unit 300 to perform power generation, and the rotational speed output by the conversion device input portion 4020 is greater than the rotational speed of the input end of the system power output portion 401.

Figure 20:
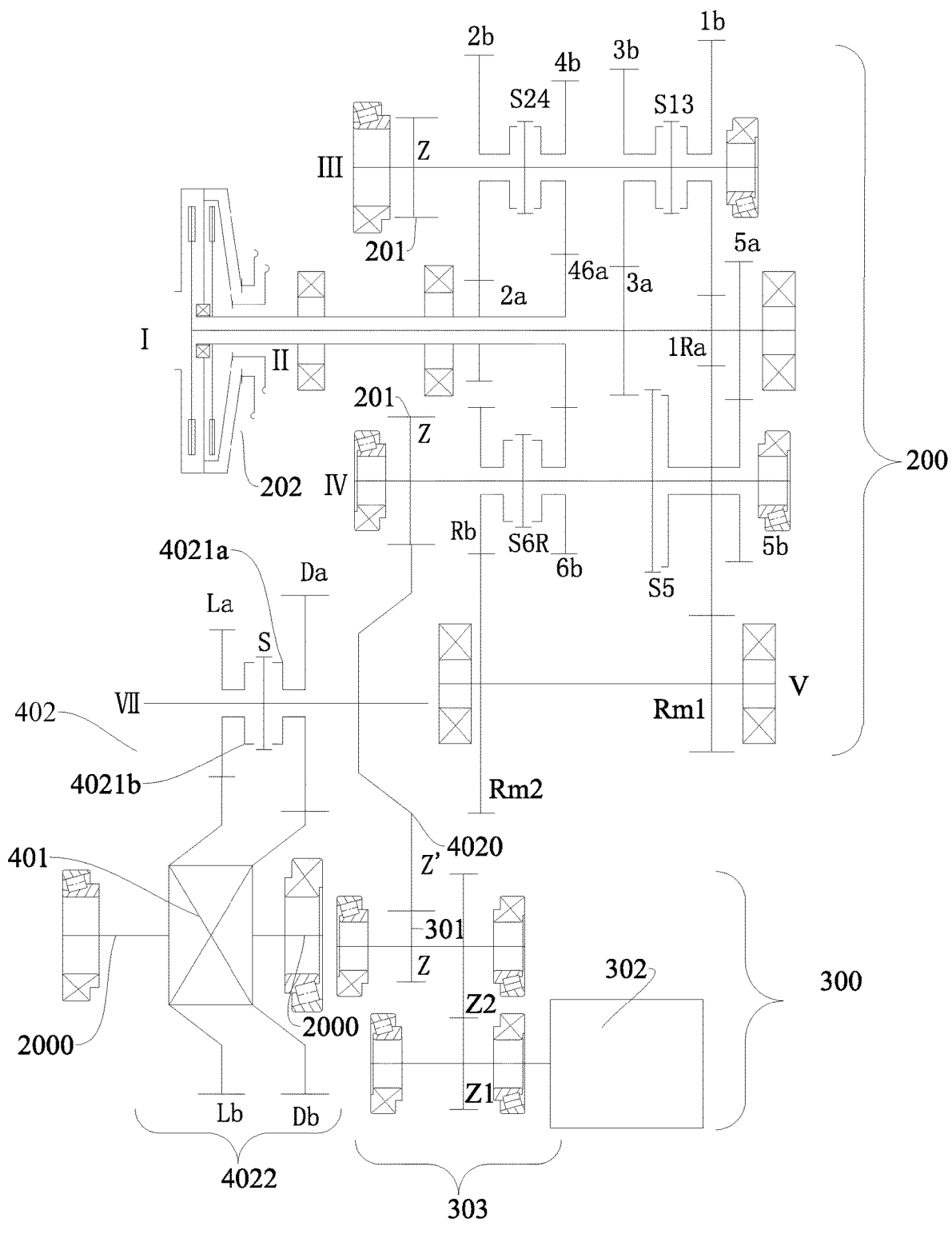

According to a third embodiment of the present invention, as shown in FIG. 20, the mode conversion device 402 may further include a first conversion portion 4021a and a second conversion portion 4021b, the conversion device output portion 4022 is connected to the input end of the system power output portion 401, the conversion device input portion 4020 is suitable for outputting power from at least one of the power source 100 and the first motor generator unit 300, the conversion device input portion 4020 is selectively connected to one of the first conversion portion 4021a and the second conversion portion 4021b, and each of the first conversion portion 4021a and the second conversion portion 4021b cooperates with the conversion device output portion 4022 to perform transmission. To be specific, during power transfer, the conversion device input portion 4020 may transfer power to the conversion device output portion 4022 through the first conversion portion 4021a or the second conversion portion 4021b.

The conversion device input portion 4020 is suitable for connecting to the first conversion portion 4021a, so that the rotational speed of the conversion device input portion 4020 is the same as the rotational speed of the input end of the system power output portion 401. The conversion device input portion 4020 is suitable for connecting to the second conversion portion 4021b, so that the rotational speed of the conversion device input portion 4020 is reduced and then output to the system power output portion 401.

Specifically, as shown in FIG. 20, the conversion device input portion 4020 is a main reducer driven gear Z', the mode conversion device 402 may further include: a conversion device shaft VII, the main reducer driven gear Z' is fixedly disposed on the conversion device shaft VII, a direct-gear driving gear Da and a low-gear driving gear La are freely sleeved on the conversion device shaft VII, and the conversion device shaft VII is parallel to the half shaft 2000 of the vehicle.

The direct-gear driving gear Da may be the first conversion portion 4021a, and the low-gear driving gear La may be the second conversion portion 4021b. The conversion device output portion 4022 may include a direct-gear driven gear Db and a low-gear driven gear Lb, the direct-gear driven gear Db is meshed with the direct-gear driving gear Da, the low-gear driven gear Lb is meshed with the low-gear driving gear La, and each of the direct-gear driven gear Db and the low-gear driven gear Lb is fixedly connected to the input end of the system power output portion 401. In this way, power transfer is reliable, and transmission efficiency is high.

Moreover, the conversion device input portion 4020 is suitable for being disconnected from each of the first conversion portion 4021a and the second conversion portion 4021b, so that the power source 100 is suitable for driving the first motor generator unit 300 sequentially through the speed change unit 200 and the conversion device input portion 4020 to perform power generation.

The mode conversion device 402 may further include a conversion device connector S, and the conversion device output portion 4022 is selectively connected to the first conversion portion 4021a or the second conversion portion 4021b through the conversion device connector S. Herein, it may be understood that, the conversion device output portion 4022 may be selectively connected to and disconnected from the first conversion portion 4021a, and the conversion device output portion 4022 may be selectively connected to and disconnected from the second conversion portion 4021b. By switching a status and a connection target of the conversion device connector S, the output rotational speed transferred to the conversion device output portion 4022 may be changed, thereby changing the rotational speed of the wheels, further enriching driving modes of the vehicle, and improving economy and power performance of the vehicle.

The conversion device connector S may be a conversion device synchronizer. Optionally, the conversion device synchronizer may be fixed on the conversion device shaft VII. Preferably, the conversion device synchronizer may be located between the direct-gear driving gear Da and the low-gear driving gear La. In this way, a quantity of synchronizers may be reduced, so that the mode conversion device 402 is simple in structure and low in costs.

Driving modes of the power transmission system 1000 shown in FIG. 20 are described below in detail.

The power transmission system 1000 for the vehicle has a first power source driving mode. When the power transmission system 1000 for the vehicle is in the first power source driving mode, the first motor generator 302 does not work, the first conversion portion 4021a is connected to the conversion device input portion 4020, and the power output by the power source 100 is output to the system power output portion 401 sequentially through the conversion device input portion 4020, the first conversion portion 4021a and the conversion device output portion 4022.

The power transmission system 1000 for the vehicle has a second power source driving mode. When the power transmission system 1000 for the vehicle is in the second power source driving mode, the first motor generator 302 does not work, the second conversion portion 4021b is connected to the conversion device input portion 4020, and the power output by the power source 100 is output to the input end of the system power output portion 401 sequentially through the conversion device input portion 4020, the second conversion portion 4021b and the conversion device output portion 4022.

The power transmission system 1000 for the vehicle has a first pure electric driving mode. When the power transmission system 1000 for the vehicle is in the first pure electric driving mode, the power source 100 does not work, the first conversion portion 4021a is connected to the conversion device input portion 4020, a switching module is power-coupled to the first motor generator 302 and the first motor generator unit coupling portion 301, and the power output by the first motor generator 302 is output to the system power output portion 401 sequentially through the switching module, the first motor generator unit coupling portion 301, the conversion device input portion 4020, the first conversion portion 4021a and the conversion device output portion 4022.

The power transmission system 1000 for the vehicle has a second pure electric driving mode. When the power transmission system 1000 for the vehicle is in the second pure electric driving mode, the power source 100 does not work, the second conversion portion 4021b is connected to the conversion device input portion 4020, and the power output by the first motor generator 302 is output to the input end of the system power output portion 401 sequentially through the conversion device input portion 4020, the second conversion portion 4021b and the conversion device output portion 4022.

The power transmission system 1000 for the vehicle has a reverse-drive starting mode, and when the power transmission system 1000 for the vehicle is in the reverse-drive starting mode, the power output by the first motor generator 302 is output to the power source 100 sequentially through the conversion device input portion 4020, to drive the power source 100 to start.

The power transmission system 1000 for the vehicle has a first hybrid driving mode. When the power transmission system 1000 for the vehicle is in the first hybrid driving mode, both the power source 100 and the first motor generator 302 work, the first conversion portion 4021a is connected to the conversion device input portion 4020, the power output by the power source 100 is output to the system power output portion 401 sequentially through the conversion device input portion 4020, the first conversion portion 4021a and the conversion device output portion 4022, the power output by the first motor generator 302 is output to the system power output portion 401 sequentially through the conversion device input portion 4020, the first conversion portion 4021a and the conversion device output portion 4022, and the power output by the power source 100 and the power output by the first motor generator 302 are coupled and then output to the conversion device input portion 4020.

The power transmission system 1000 for the vehicle has a second hybrid driving mode. When the power transmission system 1000 for the vehicle is in the second hybrid driving mode, both the power source 100 and the first motor generator 302 work, the second conversion portion 4021b is connected to the conversion device input portion 4020, the power output by the power source 100 is output to the system power output portion 401 sequentially through the conversion device input portion 4020, the second conversion portion 4021b and the conversion device output portion 4022, the power output by the first motor generator 302 is output to the system power output portion 401 sequentially through the conversion device input portion 4020, the second conversion portion 4021b and the conversion device output portion 4022, and the rotational speed output by the power source 100 and the rotational speed output by the first motor generator 302 are coupled and then output to the conversion device input portion 4020.

The power transmission system 1000 for the vehicle has a first driving power generation mode, and when the power transmission system 1000 for the vehicle is in the first driving power generation mode, the power source 100 works, and the first conversion portion 4021a is connected to the conversion device input portion 4020.

A part of the power output by the power source 100 is output to the system power output portion 401 sequentially through the conversion device input portion 4020, the first conversion portion 4021a and the conversion device output portion 4022, and another part of the power output by the power source 100 is output to the first motor generator 302 sequentially through the conversion device input portion 4020, to drive the first motor generator 302 to perform power generation.

The power transmission system 1000 for the vehicle has a second driving power generation mode, and when the power transmission system 1000 for the vehicle is in the second driving power generation mode, the power source 100 works, and the second conversion portion 4021b is connected to the conversion device input portion 4020.

A part of the power output by the power source 100 is output to the system power output portion 401 sequentially through the conversion device input portion 4020, the second conversion portion 4021b and the conversion device output portion 4022, and another part of the power output by the power source 100 is output to the first motor generator 302 sequentially through the conversion device input portion 4020, to drive the first motor generator 302 to perform power generation.

The power transmission system 1000 for the vehicle has a first braking energy recycling mode, and when the power transmission system 1000 for the vehicle is in the first braking energy recycling mode, the first conversion portion 4021a is connected to the conversion device input portion 4020, and power from wheels of the vehicle drives the first motor generator 302 sequentially through the system power output portion 401, the conversion device output portion 4022, the first conversion portion 4021a, the conversion device input portion 4020, the first motor generator unit coupling portion 301, and the switching module to perform power generation.

The power transmission system 1000 for the vehicle has a second braking energy recycling mode, and when the power transmission system 1000 for the vehicle is in the second braking energy recycling mode, the second conversion portion 4021b is connected to the conversion device input portion 4020, and power from wheels of the vehicle drives the first motor generator 302 sequentially through the system power output portion 401, the conversion device output portion 4022, the second conversion portion 4021b, and the conversion device input portion 4020 to perform power generation.

It should be noted that, contents of the foregoing power transmission system 1000 may be combined with each other or be replaced with each other without conflict, thereby forming a new embodiment. The new embodiment similarly falls within the protection scope of this application. There is a plurality of combination and replacement manners, and several examples are listed below to make description.

For example, a part of the power transmission system 1000 shown in FIG. 1 to FIG. 6 may be used to drive front wheels of the vehicle, a part of the power transmission system 1000 shown in FIG. 27 to FIG. 32 may be used to drive rear wheels, and any one of FIG. 1 to FIG. 6 may form a new power transmission system 1000 with any one of FIG. 27 to FIG. 32.

For another example, to improve stationary power generation efficiency, the power transmission system 1000 shown in FIG. 1 may be combined with one second motor generator 600 to form a new power transmission system 1000, and the second motor generator 600 may implement stationary power generation when the vehicle is under the parking working condition.

Figure 51:
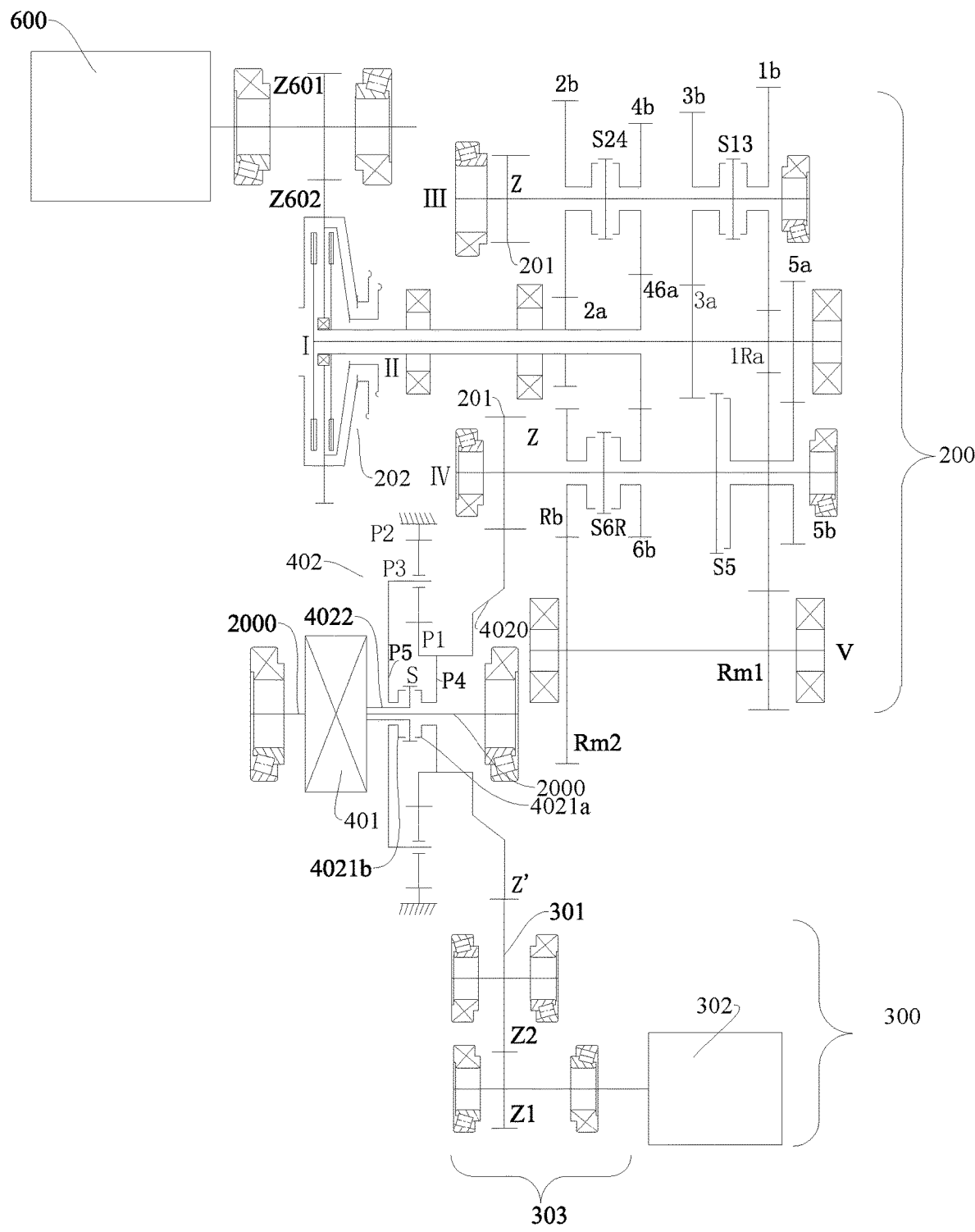
Figure 52:
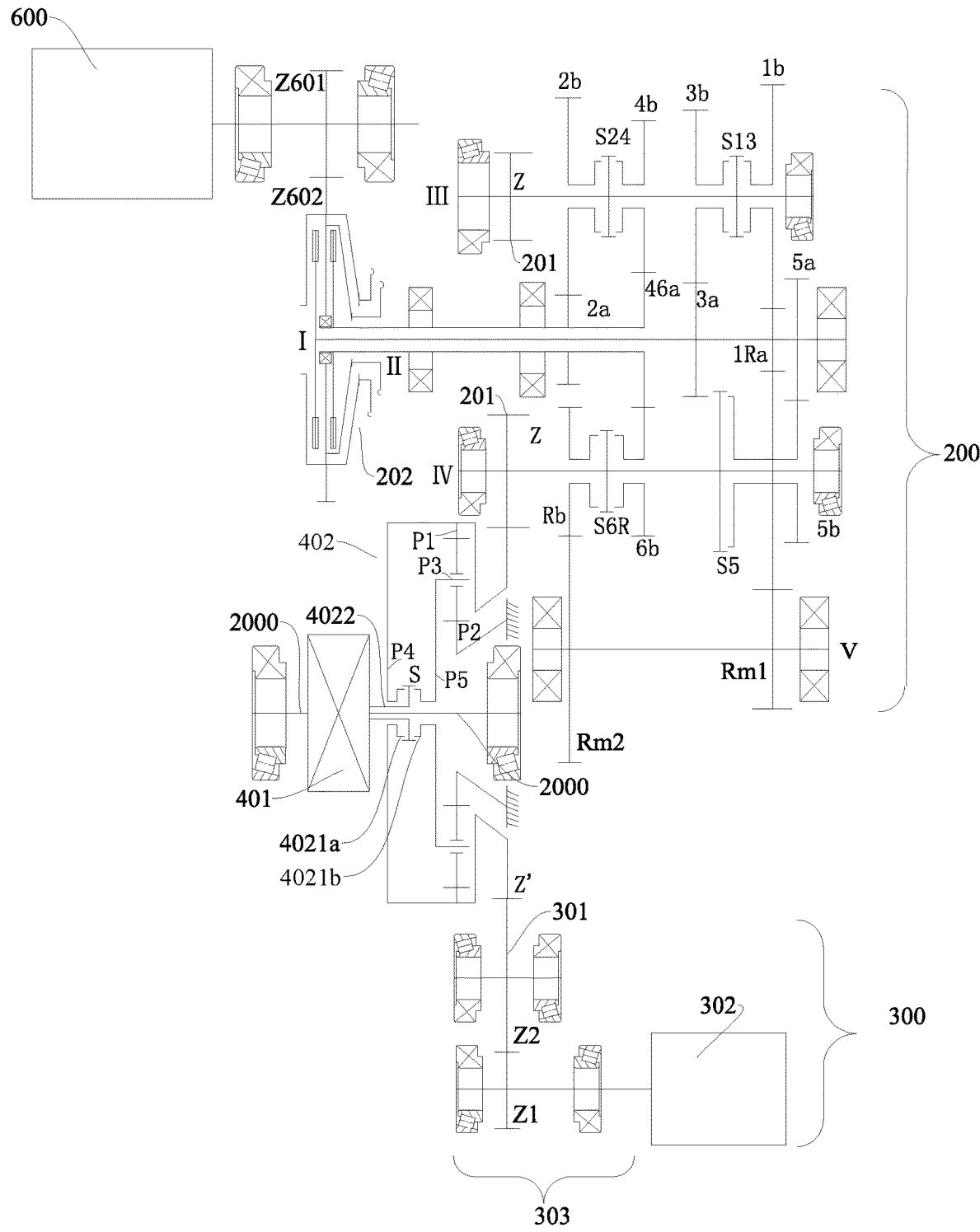
Figure 53:
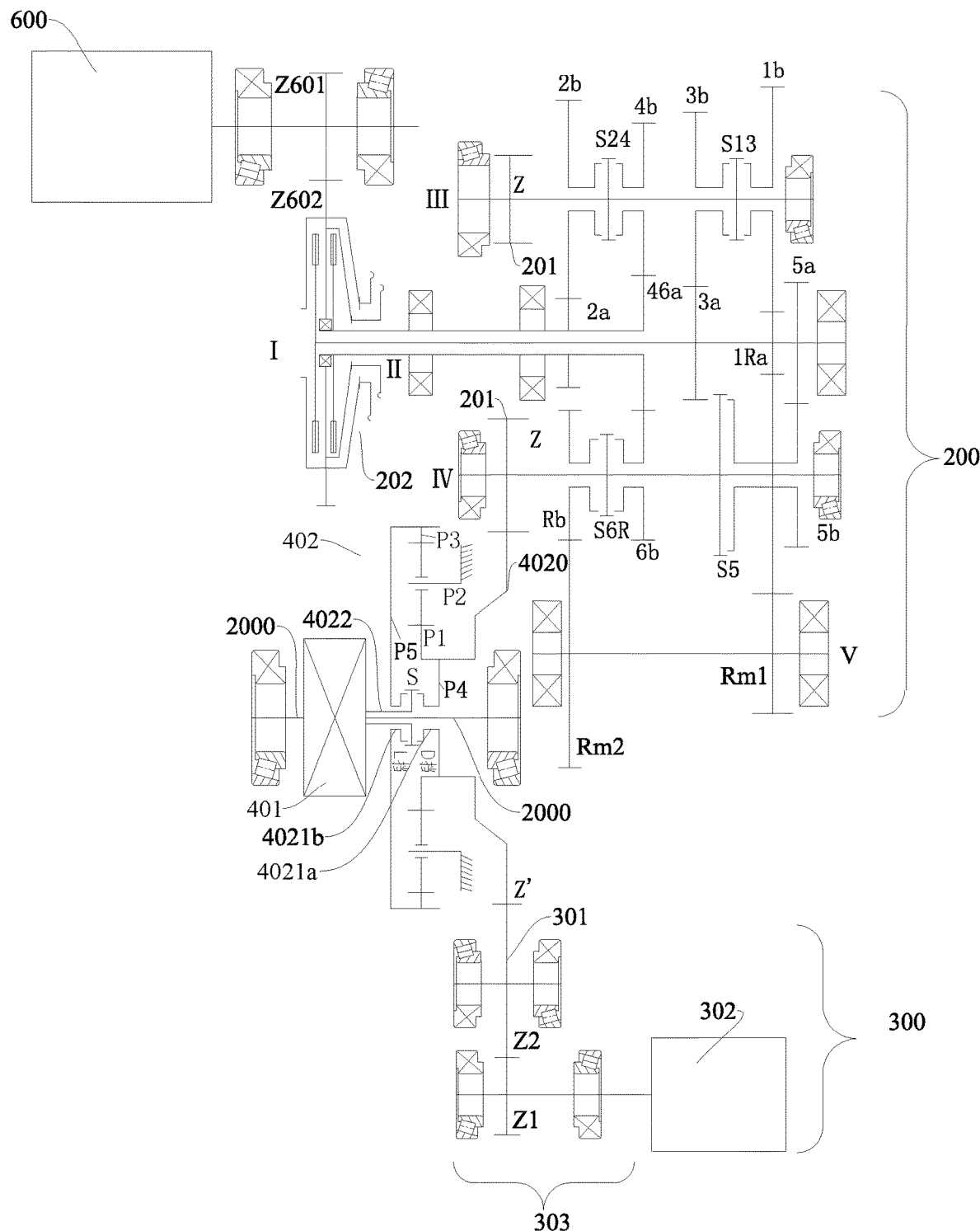
Figure 54:
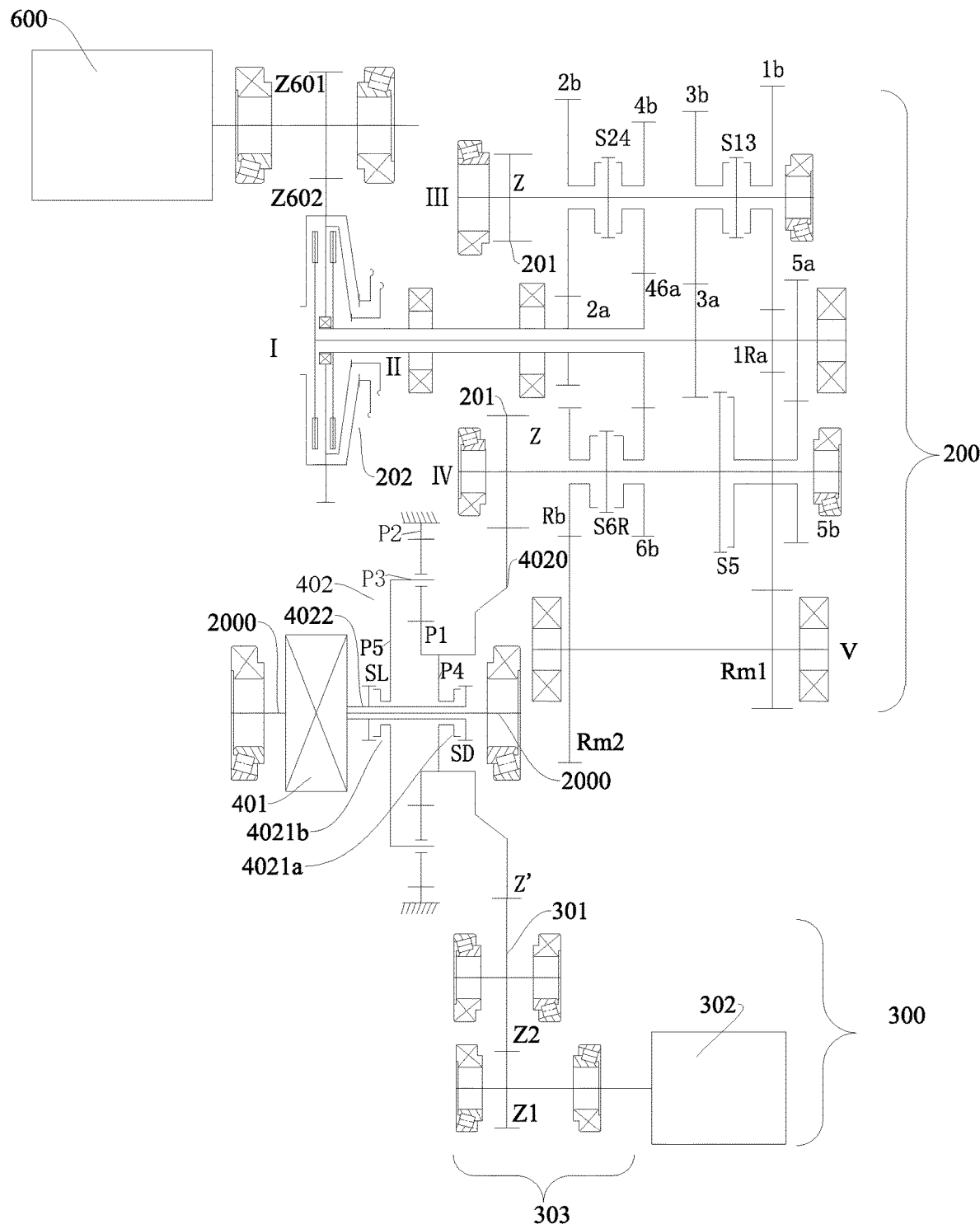
Figure 55:
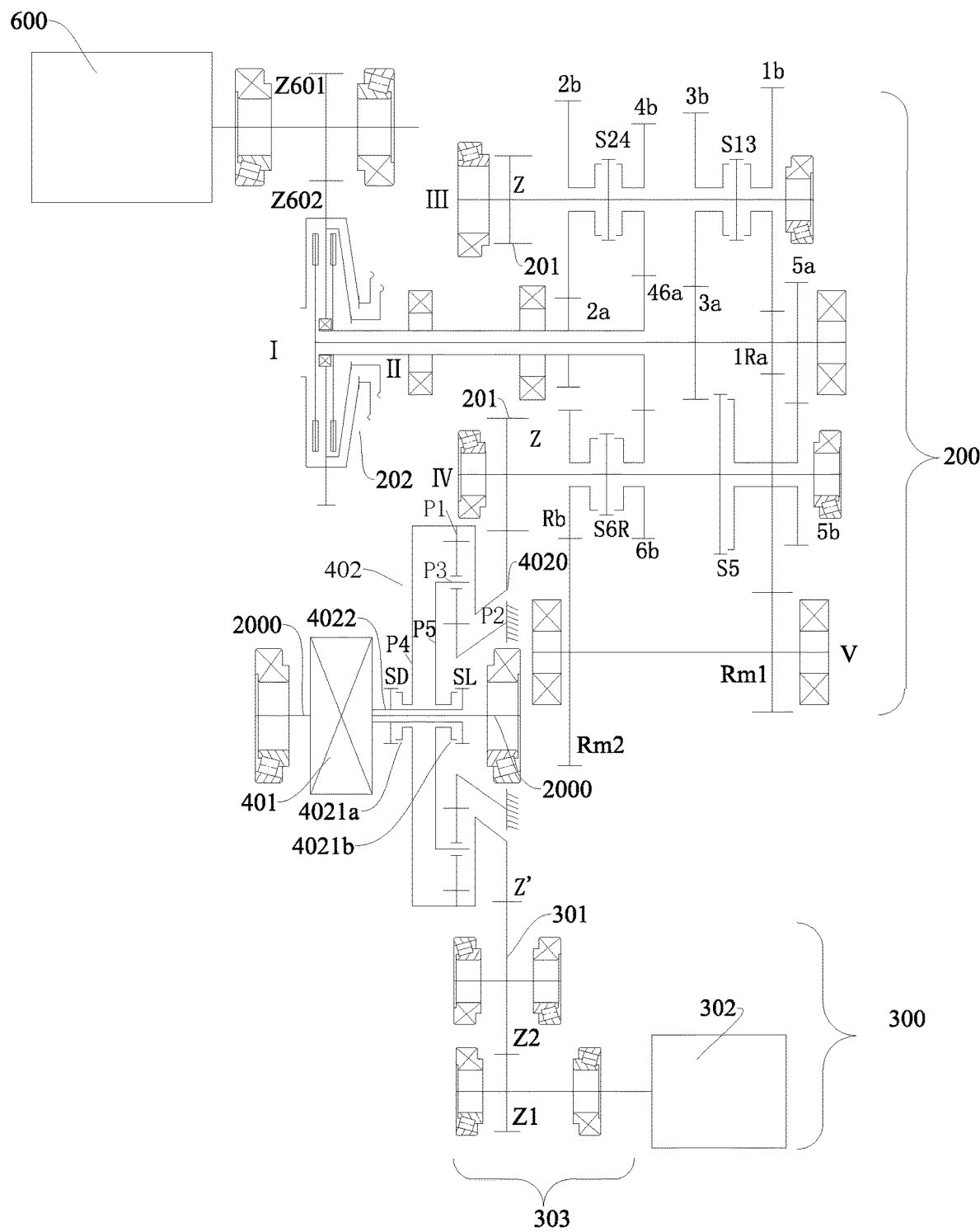
Figure 56:
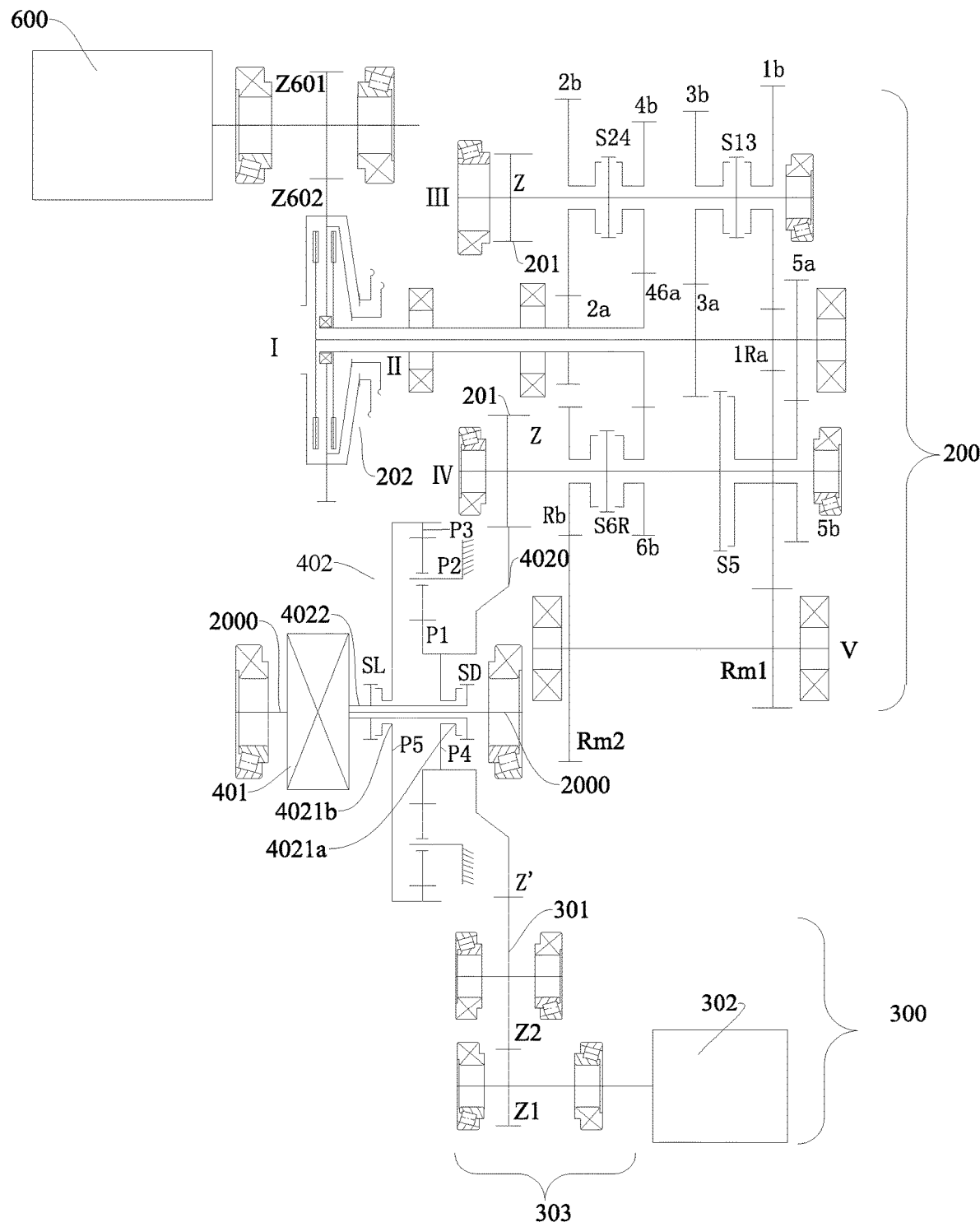
Figure 57:
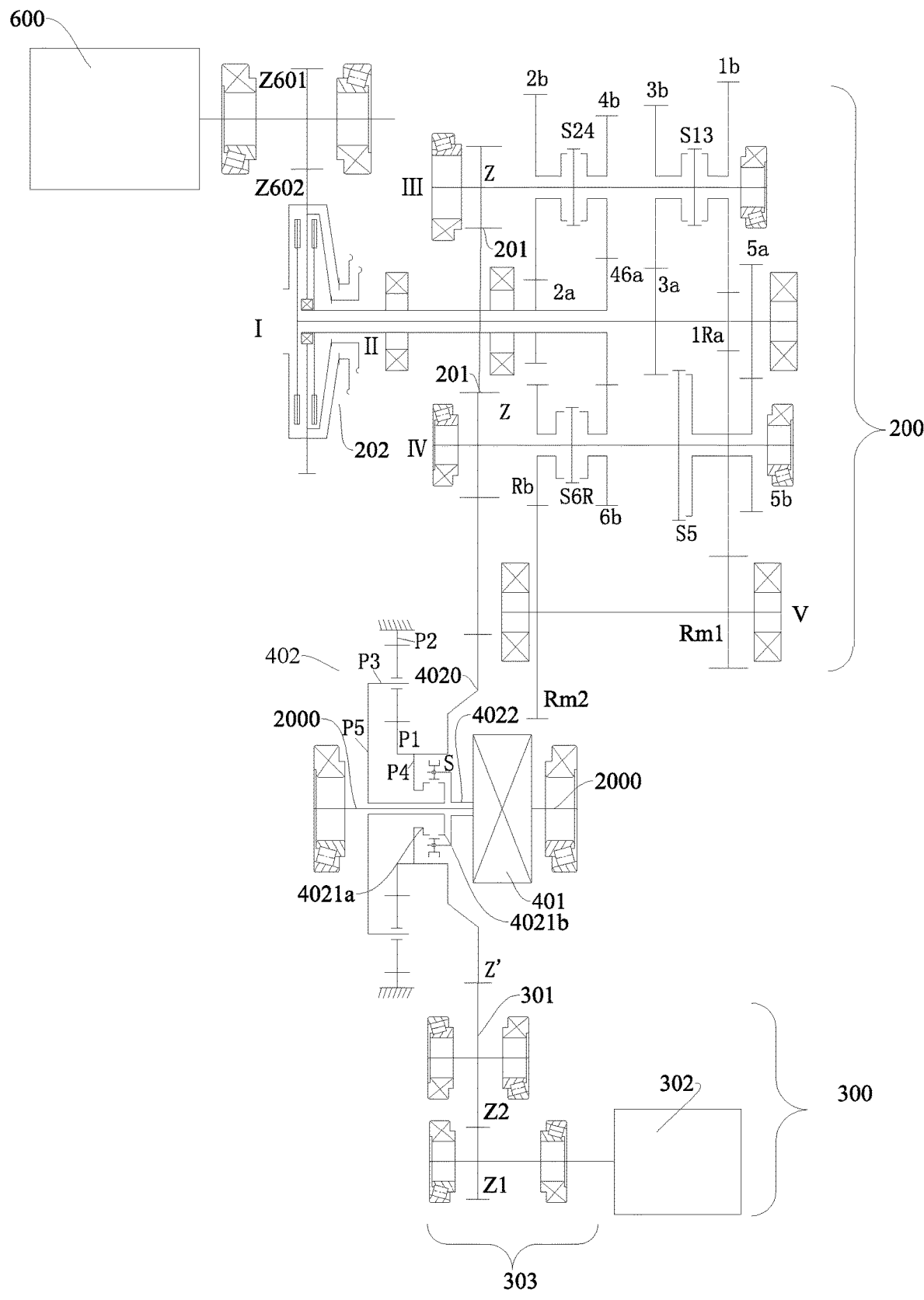
Figure 58:
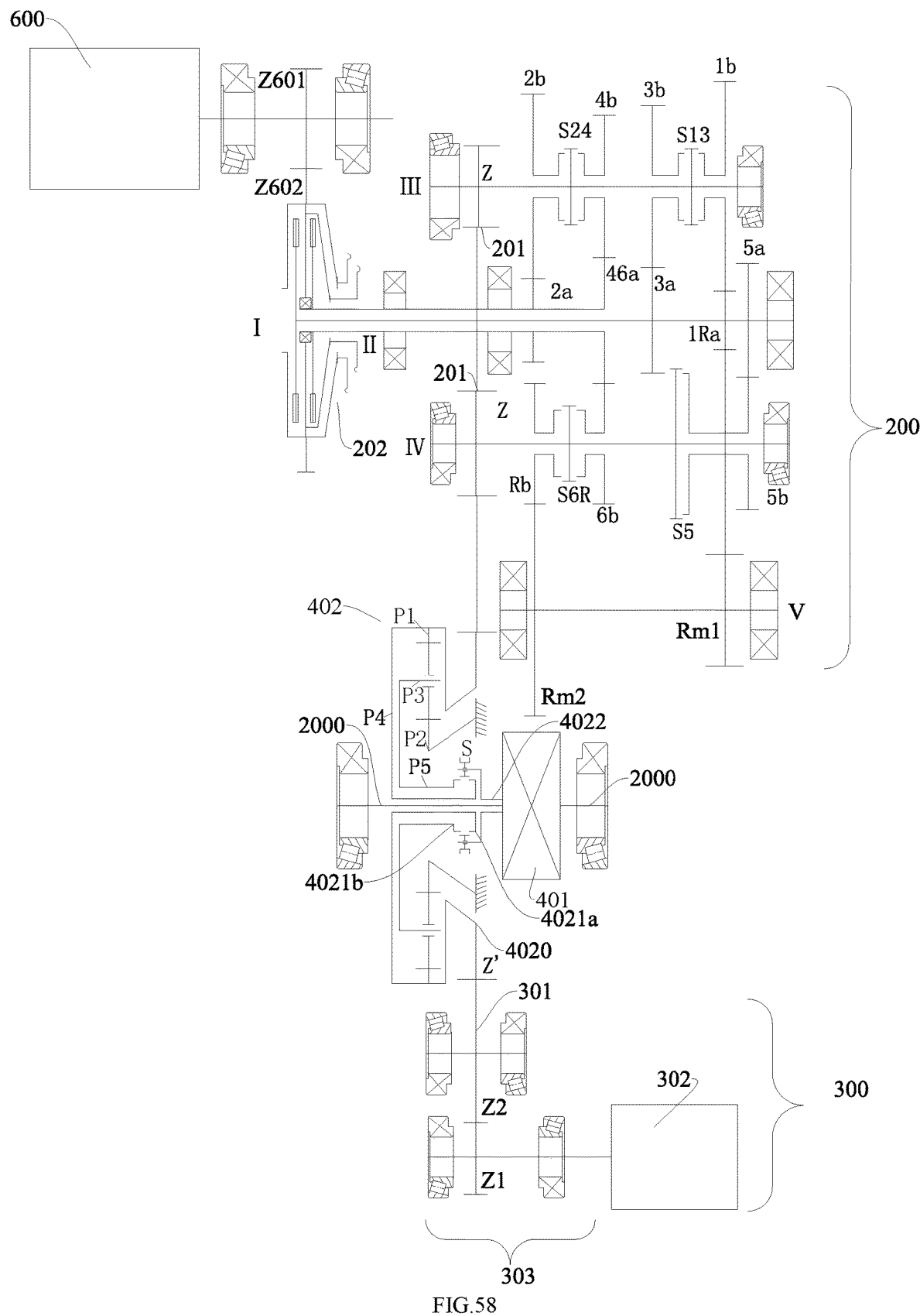
Figure 59:
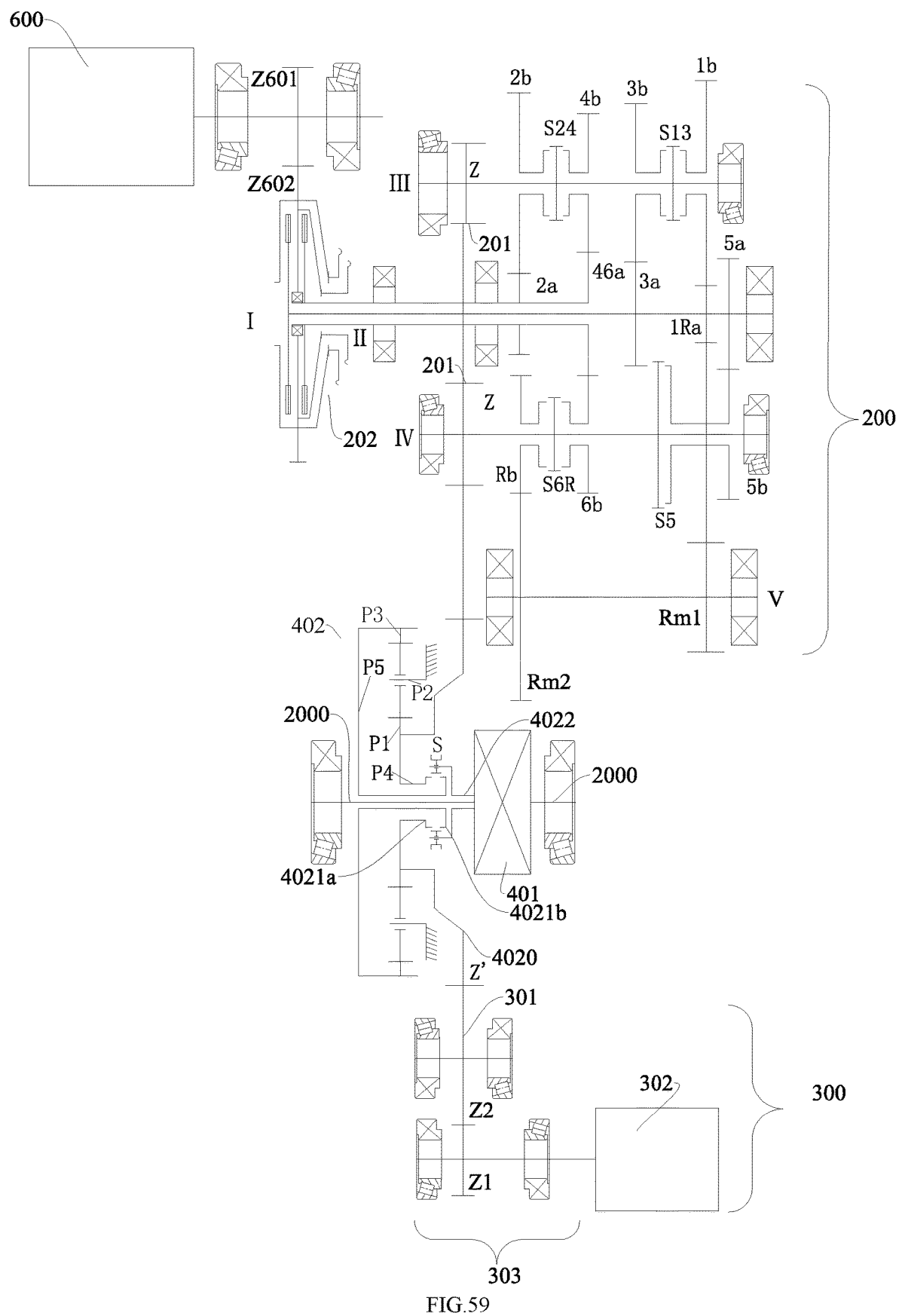
Figure 60:
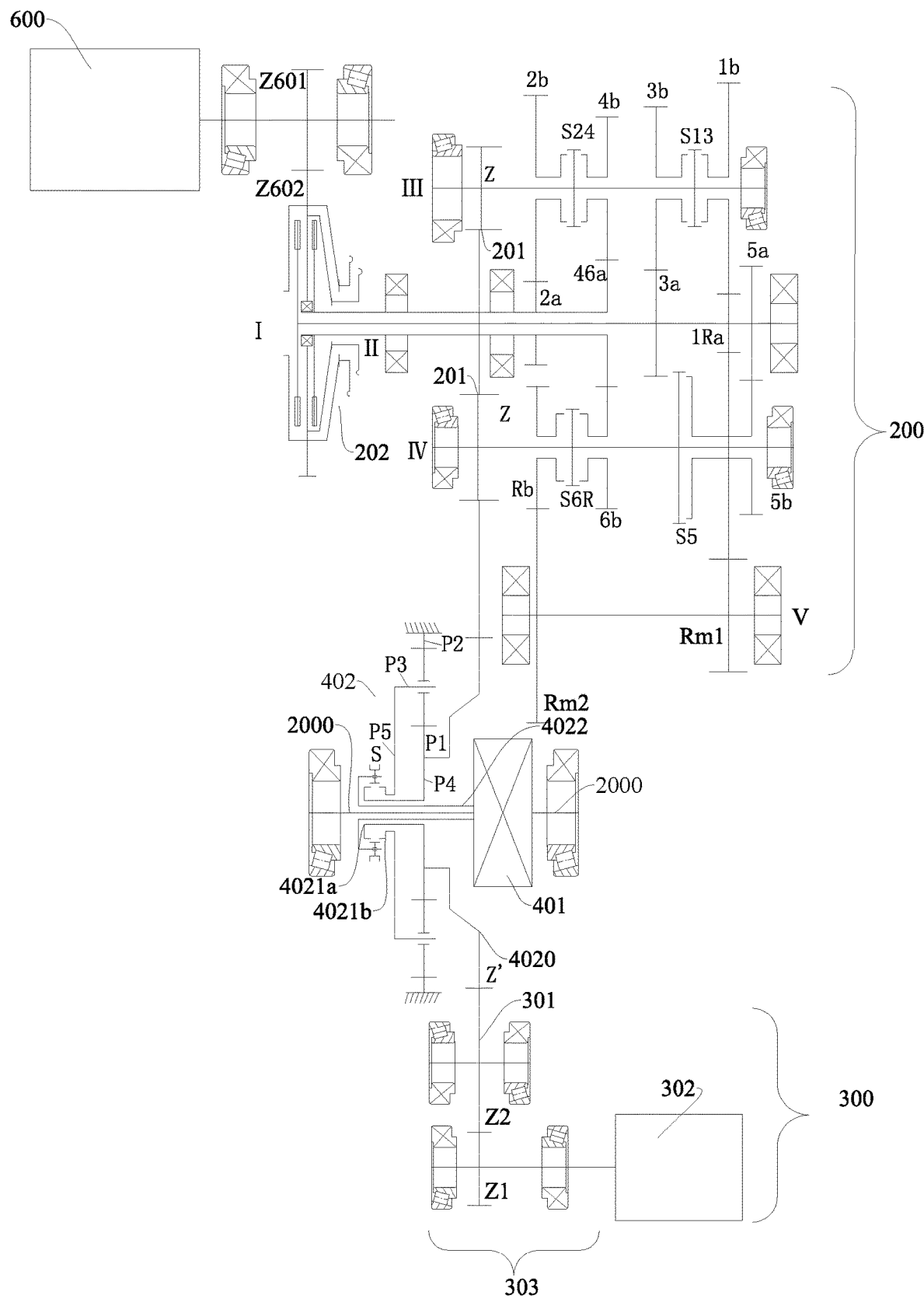
Figure 61:
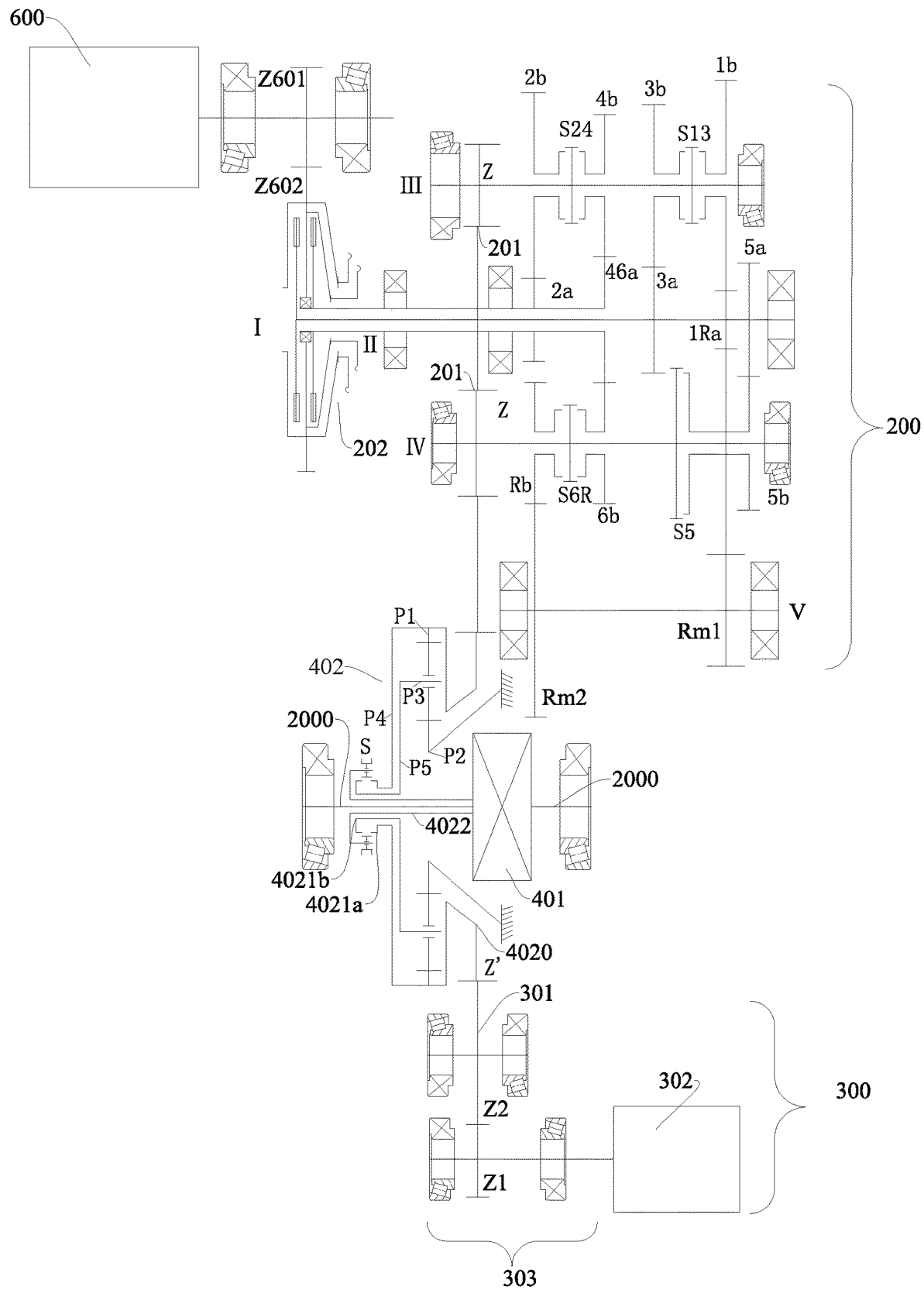
Figure 62:
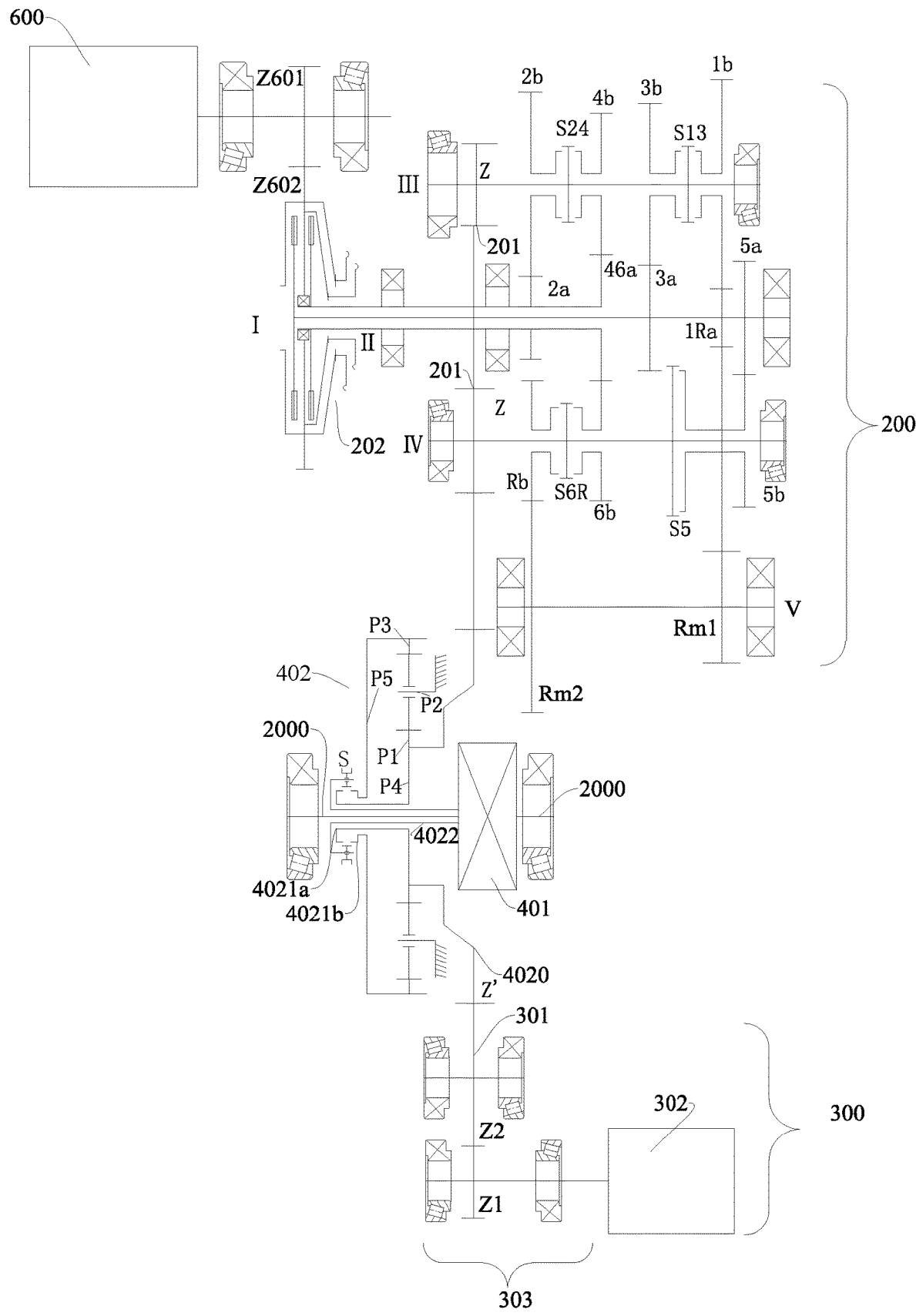
Figure 63:
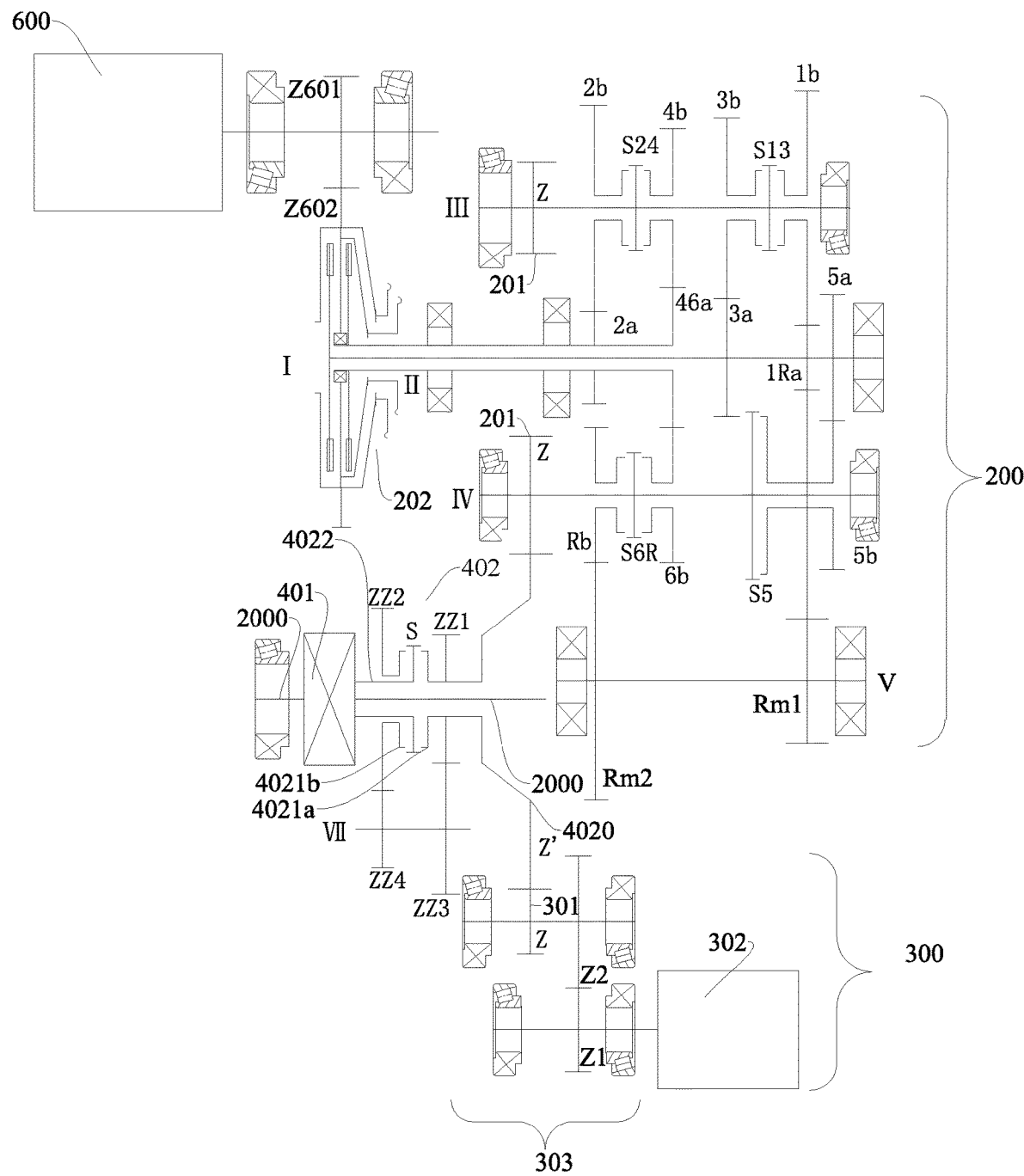
Figure 64:
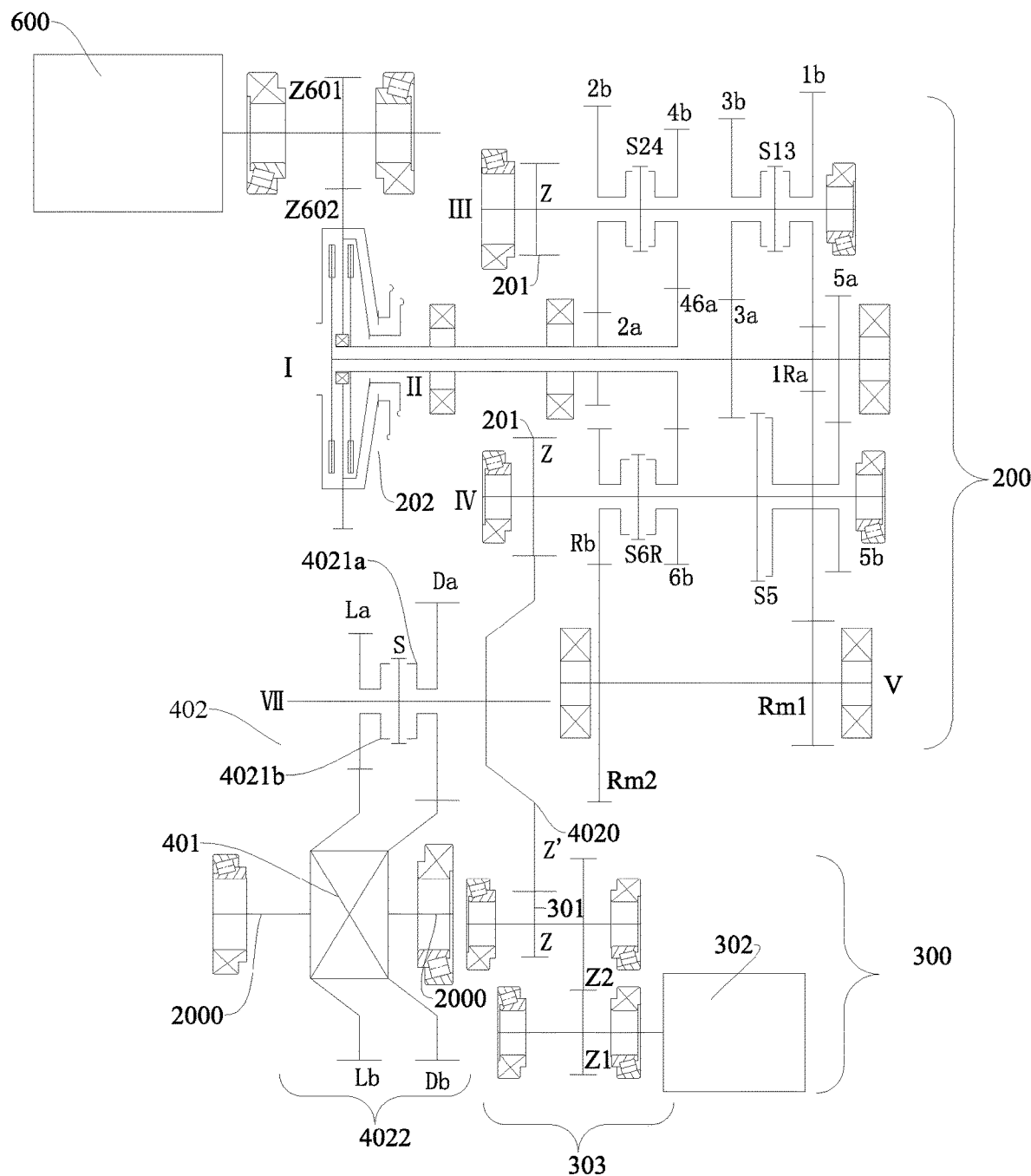

For still another example, there is a plurality of arrangement forms of the second motor generator 600. As shown in FIG. 34, the second motor generator 600 may be coaxially connected to the power source 100. For another example, as shown in FIG. 51, the second motor generator 600 may be connected to an input end of a double clutch, and the foregoing two arrangement forms of the second motor generator 600 may be replaced with each other.

For still another example, there is a plurality of arrangement forms of the speed change unit 200 of the power transmission system 1000, the speed change unit 200 in the power transmission system 1000 shown in FIG. 7 is completely different from the speed change unit 200 of the power transmission system 1000 shown in FIG. 33 in structure, and the two speed change units may be replaced with each other.

For still another example, the mode conversion devices 402 of the power transmission systems 1000 shown in FIG. 7 to FIG. 20 are different from each other, and any two of the foregoing mode conversion devices 402 may be replaced with each other.

A vehicle according to an embodiment of the present invention includes the power transmission system 1000 of the foregoing embodiment.

In the description of the present invention, it should be understood that, orientations or position relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present invention and simplifying the description, rather than indicating or implying that the apparatus or element should have a particular orientation or be constructed and operated in a particular orientation, and therefore, should not be construed as a limitation on the present invention.

In addition, terms "first" and "second" are used only for description objectives, and shall not be construed as indicating or implying relative importance or implying a quantity of indicated technical features. Therefore, a feature restricted by "first" or "second" may explicitly indicate or implicitly include at least one such feature. In the description of the present invention, unless otherwise specifically limited, "multiple" means at least two, for example, two or three.

In the present invention, unless explicitly specified or limited otherwise, the terms "mounted," "connected," "connection", and "fixed" should be understood broadly, for example, which may be fixed connections, detachable connections or integral connections; may be mechanical connections or electrical connections or communication with each other; may be direct connections, indirectly connected with each other through an intermediate medium, or communications inside two elements or an interaction relationship of two elements, unless otherwise specifically limited. Those of ordinary skill in the art can understand specific meanings of the terms in the present invention according to specific situations.

In the present invention, unless explicitly specified or limited otherwise, a first characteristic "on" or "under" a second characteristic may be the first characteristic in direct contact with the second characteristic, or the first characteristic in indirect contact with the second characteristic through an intermediate medium. Moreover, the first characteristic "on", "above" and "over" the second characteristic may be the first characteristic right above or obliquely above the second characteristic, or only indicates that a horizontal height of the first characteristic is greater than that of the second characteristic. The first characteristic "under", "below" and "beneath" the second characteristic may be the first characteristic right below or obliquely below the second characteristic, or only indicates that a horizontal height of the first characteristic is less than that of the second characteristic.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of the present invention. In this specification, exemplary descriptions of the foregoing terms do not necessarily refer to a same embodiment or example. In addition, the described specific feature, structure, material, or characteristic may be combined in a proper manner in any one or more embodiments or examples. In addition, with no conflict, a person skilled in the art can integrate and combine different embodiments or examples and features of the different embodiments and examples described in this specification.

Although the embodiments of the present invention are shown and described above, it can be understood that the foregoing embodiments are exemplary, and should not be construed as limitations to the present invention. A person of ordinary skill in the art can make changes, modifications, replacements, and variations to the foregoing embodiments within the scope of the present invention.

What is claimed is:

1. A power transmission system for a vehicle, comprising:
a power source;
a first motor generator unit;
a system power output portion; and
a mode conversion device, wherein the mode conversion device comprises: a conversion device input portion, a first conversion portion, a second conversion portion, and a conversion device output portion, the conversion device output portion is connected to an input end of the system power output portion, the conversion device input portion is configured to output power from at least one of the power source and the first motor generator unit, the conversion device input portion is selectively connected to one of the first conversion portion and the second conversion portion, and each of the first conversion portion and the second conversion portion cooperates with the conversion device output portion to perform transmission; and
when the conversion device input portion is connected to the second conversion portion, a rotational speed output by the conversion device input portion is reduced and then output to the input end of the system power output portion.

2. The power transmission system for a vehicle according to claim 1, wherein the conversion device input portion is connected to the first conversion portion, so that the rotational speed output by the conversion device input portion is the same as a rotational speed of the input end of the system power output portion.

3. The power transmission system for a vehicle according to claim 1, wherein when the conversion device input portion is disconnected from each of the first conversion portion and the second conversion portion, and power output by the power source is suitable for driving the first motor generator unit to perform power generation.

4. The power transmission system for a vehicle according to claim 1, wherein the mode conversion device comprises:
   a main reducer driven gear, wherein the main reducer driven gear is the conversion device input portion;
   a conversion device shaft, wherein the main reducer driven gear is fixedly disposed on the conversion device shaft, a direct-gear driving gear and a low-gear driving gear are freely sleeved on the conversion device shaft, and the conversion device shaft is parallel to a half shaft of the vehicle;
   the direct-gear driving gear is the first conversion portion, and the low-gear driving gear is the second conversion portion; and
   the conversion device output portion comprises a direct-gear driven gear and a low-gear driven gear, the direct-gear driven gear is meshed with the direct-gear driving gear, the low-gear driven gear is meshed with the low-gear driving gear, and each of the direct-gear driven gear and the low-gear driven gear is fixedly connected to the input end of the system power output portion.

5. The power transmission system for a vehicle according to claim 4, wherein the mode conversion device further comprises a conversion device connector, and the conversion device output portion is selectively connected to the first conversion portion or the second conversion portion through the conversion device connector, and the conversion device connector is fixed on the conversion device shaft.

6. The power transmission system for a vehicle according to claim 5, wherein the conversion device connector is a conversion device synchronizer, and the conversion device connector is located between the direct-gear driving gear and the low-gear driving gear.

7. The power transmission system for a vehicle according to claim 4, further comprising: a speed change unit, wherein the speed change unit is selectively power-coupled to the power source, and the speed change unit is power-coupled to the conversion device input portion, to output the power from the power source to the conversion device input portion through the speed change unit; and the speed change unit comprises a speed change unit output portion, the first motor generator unit comprises a first motor generator unit coupling portion, each of the speed change unit output portion and the first motor generator unit coupling portion is a main reducer driving gear, and the main reducer driving gear is meshed with the main reducer driven gear.

8. The power transmission system for a vehicle according to claim 1, further comprising: a speed change unit, wherein the speed change unit is selectively power-coupled to the power source, and the speed change unit is power-coupled to the conversion device input portion, to output the power from the power source to the conversion device input portion through the speed change unit.

9. The power transmission system for a vehicle according to claim 8, wherein the speed change unit comprises:
   a speed change power input portion, wherein the speed change power input portion is selectively connected to the power source, to transmit the power generated by the power source;
   a speed change power output portion; and
   a speed change unit output portion, wherein the speed change power output portion is configured to output the power from the speed change power input portion to the speed change unit output portion through synchronization of a speed change unit synchronizer, and the speed change unit output portion is power-coupled to the conversion device input portion.

10. The power transmission system for a vehicle according to claim 9, wherein the speed change power input portion comprises at least one input shaft, the input shaft is selectively connected to the power source, and at least one driving gear is disposed on the input shaft; and
   the speed change power output portion comprises: at least one output shaft, at least one driven gear is disposed on the output shaft, the driven gear is meshed with the corresponding driving gear, the speed change unit output portion is at least one main reducer driving gear, and the at least one main reducer driving gear is fixed on the at least one output shaft in a one-to-one correspondence.

11. The power transmission system for a vehicle according to claim 10, wherein there is a plurality of input shafts that is sequentially coaxially nested, and when the power source transfers power to the input shafts, the power source is selectively connected to one of the plurality of input shafts.

12. The power transmission system for a vehicle according to claim 11, wherein the speed change unit synchronizer is disposed on the output shaft, and selectively synchronizes the driven gear with the output shaft, so that the driven gear rotates in synchronization with the output shaft.

13. The power transmission system for a vehicle according to claim 1, wherein the first motor generator unit comprises a first motor generator and a first motor generator unit coupling portion, the first motor generator is power-coupled to the first motor generator unit coupling portion, and the first motor generator unit coupling portion is power-coupled to the conversion device input portion, and the first motor generator unit further comprises a speed reduction chain, and the first motor generator is power-coupled to the first motor generator unit coupling portion through the speed reduction chain.

14. The power transmission system for a vehicle according to claim 13, wherein the power transmission system for the vehicle has a first pure electric driving mode, and when the power transmission system for the vehicle is in the first pure electric driving mode, the power source does not work, the first conversion portion is connected to the conversion device input portion, a switching module is power-coupled to the first motor generator and the first motor generator unit coupling portion, and the power output by the first motor generator is output to the system power output portion sequentially through the switching module, the first motor generator unit coupling portion, the conversion device input portion, the first conversion portion, and the conversion device output portion; or
   the power transmission system for the vehicle has a second pure electric driving mode, and when the power transmission system for the vehicle is in the second pure electric driving mode, the power source does not work, the second conversion portion is connected to the conversion device input portion, and the power output by the first motor generator unit is output to the input end of the system power output portion sequentially through the conversion device input portion, the second conversion portion, and the conversion device output portion.

15. The power transmission system for a vehicle according to claim 13, wherein the power transmission system for the vehicle has a first braking energy recycling mode, and when the power transmission system for the vehicle is in the first braking energy recycling mode, the first conversion portion is connected to the conversion device input portion, and power from wheels of the vehicle drives the first motor generator sequentially through the system power output portion, the conversion device output portion, the first conversion portion, the conversion device input portion, the first motor generator unit coupling portion, and the switching module to perform power generation; or the power transmission system for the vehicle has a second braking energy recycling mode, and when the power transmission system for the vehicle is in the second braking energy recycling mode, the second conversion portion is connected to the conversion device input portion, and power from wheels of the vehicle drives the first motor generator unit sequentially through the system power output portion, the conversion device output portion, the second conversion portion, and the conversion device input portion to perform power generation.

16. The power transmission system for a vehicle according to claim 1, wherein the power transmission system for the vehicle has a first power source driving mode, and when the power transmission system for the vehicle is in the first power source driving mode, the first motor generator unit does not work, the first conversion portion is connected to the conversion device input portion, and the power output by the power source is output to the system power output portion sequentially through the conversion device input portion, the first conversion portion, and the conversion device output portion; or the power transmission system for the vehicle has a second power source driving mode, and when the power transmission system for the vehicle is in the second power source driving mode, the first motor generator unit does not work, the second conversion portion is connected to the conversion device input portion, and the power output by the power source is output to the input end of the system power output portion sequentially through the conversion device input portion, the second conversion portion, and the conversion device output portion.

17. The power transmission system for a vehicle according to claim 1, wherein the power transmission system for the vehicle has a reverse-drive starting mode, and when the power transmission system for the vehicle is in the reverse-drive starting mode, the power output by the first motor generator unit is output to the power source sequentially through the conversion device input portion, to drive the power source to start.

18. The power transmission system for a vehicle according to claim 1, wherein the power transmission system for the vehicle has a first hybrid driving mode, and when the power transmission system for the vehicle is in the first hybrid driving mode, each of the power source and the first motor generator unit works, the first conversion portion is connected to the conversion device input portion, the power output by the power source is output to the system power output portion sequentially through the conversion device input portion, the first conversion portion, and the conversion device output portion, the power output by the first motor generator unit is output to the system power output portion sequentially through the conversion device input portion, the first conversion portion and the conversion device output portion, and the power output by the power source and the power output by the first motor generator are coupled and then output to the conversion device input portion; or the power transmission system for the vehicle has a second hybrid driving mode, and when the power transmission system for the vehicle is in the second hybrid driving mode, each of the power source and the first motor generator unit works, the second conversion portion is connected to the conversion device input portion, the power output by the power source is output to the system power output portion sequentially through the conversion device input portion, the second conversion portion, and the conversion device output portion, the power output by the first motor generator unit is output to the system power output portion sequentially through the conversion device input portion, the second conversion portion, and the conversion device output portion, and a rotational speed output by the power source and a rotational speed output by the first motor generator are coupled and then output to the conversion device input portion.

19. The power transmission system for a vehicle according to claim 1, wherein the power transmission system for the vehicle has a first driving power generation mode, and when the power transmission system for the vehicle is in the first driving power generation mode, the power source works, and the first conversion portion is connected to the conversion device input portion; and a part of the power output by the power source is output to the system power output portion sequentially through the conversion device input portion, the first conversion portion, and the conversion device output portion, and another part of the power output by the power source is output to the first motor generator unit sequentially through the conversion device input portion, to drive the first motor generator unit to perform power generation; or the power transmission system for the vehicle has a second driving power generation mode, and when the power transmission system for the vehicle is in the second driving power generation mode, the power source works, and the second conversion portion is connected to the conversion device input portion; and a part of the power output by the power source is output to the system power output portion sequentially through the conversion device input portion, the second conversion portion, and the conversion device output portion, and another part of the power output by the power source is output to the first motor generator unit sequentially through the conversion device input portion, to drive the first motor generator unit to perform power generation.

20. A vehicle, comprising the power transmission system for a vehicle according to claim 1.

* * * * *